United States Patent
Chien

(10) Patent No.: US 10,574,069 B2
(45) Date of Patent: Feb. 25, 2020

(54) QUICKLY CHARGER HAS USB CHARGING-PORTS FOR DESKTOP POWER STATION OR LIGHTING DEVICE

(71) Applicant: Tseng-Lu Chien, Walnut, CA (US)

(72) Inventor: Tseng-Lu Chien, Walnut, CA (US)

( * ) Notice: Subject to any disclaimer, the term of this patent is extended or adjusted under 35 U.S.C. 154(b) by 809 days.

(21) Appl. No.: 14/834,613

(22) Filed: Nov. 10, 2015

(65) Prior Publication Data

US 2017/0054315 A1   Feb. 23, 2017

Related U.S. Application Data

(63) Continuation-in-part of application No. 14/827,810, filed on Aug. 17, 2015, which is a continuation of
(Continued)

(51) Int. Cl.
*H02J 7/00* (2006.01)
*F21S 8/00* (2006.01)
(Continued)

(52) U.S. Cl.
CPC ............. *H02J 7/0052* (2013.01); *F21S 6/003* (2013.01); *F21S 8/035* (2013.01); *F21V 15/01* (2013.01);
(Continued)

(58) Field of Classification Search
CPC .................................................. H02J 7/0052
See application file for complete search history.

(56) References Cited

U.S. PATENT DOCUMENTS 6,474,823 B1  11/2002  Agata et al.
7,736,033 B2   6/2010  Patel
(Continued)

*Primary Examiner* — Richard V Muralidar
(74) *Attorney, Agent, or Firm* — Bacon & Thomas, PLLC

(57) ABSTRACT

Quickly USB Charging ports for power station or lighting related device has plurality of or combination of outlet or USB-hubs or digital-data delivery assembly, wireless device or adaptor or Video or audio or other electric device's receiving-port(s) has USB charging-ports which meet 2007 released specification has minimum 1.0 Amp to 5 Amp at DC 5 Volt range to safety and no overheat charging capacity to quickly charge DC current into energy-storage unit or assembly inside the other electric or digital product(s) and, optionally, additional outlet-units, to supply AC current to other electric or digital devices including smart phone, computer, communication, consumer electric products, people cosmetic kits or tools or others equipment. The USB-unit(s) or USB-Module(s) or Outlet-unit(s) fit within or install on anywhere of the device's housing including anywhere of the base, housing, walls. The said USB charging-port(s) only has charging function no any data transmit and only have one input power source not more than one and charging capacity minimum 1.0 Amp up for quickly charge from USB-Charging-ports by 2 male USB-plugs' USB-wire to the device's female USB-ports. The AC outlets for hair drier up to 1,850 Watt or 1,650 Watt or others watt. The said AC outlets has optional surge protection, leakage circuit, overheat circuit and device has add functions. Device has $2^{nd}$ or more circuit-inside to get enough current for other function besides USB Charging-ports which need big Amperange for Plurality of LEDs for different color, Other light source, IP Cam and related IR photo diode, wireless communication, APP, Remote contontroller, motion sensor, Dimmer, PIR sensor, Motion sensors.

34 Claims, 15 Drawing Sheets

Related U.S. Application Data application No. 14/643,026, filed on Mar. 10, 2015, which is a continuation of application No. 14/144,703, filed on Dec. 31, 2013, which is a continuation of application No. 13/161,643, filed on Jun. 16, 2011, now Pat. No. 8,783,936.

(51) Int. Cl.

| | | |
|---|---|---|
| *F21V 8/00* | (2006.01) | |
| *G09F 23/00* | (2006.01) | |
| *H01R 13/66* | (2006.01) | |
| *H01R 25/00* | (2006.01) | |
| *H02G 3/14* | (2006.01) | |
| *F21V 23/02* | (2006.01) | |
| *F21V 33/00* | (2006.01) | |
| *F21V 15/01* | (2006.01) | |
| *G04B 19/30* | (2006.01) | |
| *H02J 4/00* | (2006.01) | |
| *G06F 1/26* | (2006.01) | |
| *F21S 6/00* | (2006.01) | |
| *F21V 23/06* | (2006.01) | |
| *F21V 23/04* | (2006.01) | |
| *F21W 121/00* | (2006.01) | |
| *H01H 9/18* | (2006.01) | |
| *H01R 13/713* | (2006.01) | |
| *H01R 24/76* | (2011.01) | |
| *H01R 103/00* | (2006.01) | |

(52) U.S. Cl.
CPC ............ *F21V 23/02* (2013.01); *F21V 23/023* (2013.01); *F21V 23/06* (2013.01); *F21V 33/00* (2013.01); *F21V 33/0004* (2013.01); *F21V 33/0024* (2013.01); *F21V 33/0048* (2013.01); *F21V 33/0056* (2013.01); *G02B 6/0045* (2013.01); *G04B 19/30* (2013.01); *G06F 1/266* (2013.01); *G09F 23/00* (2013.01); *H01R 13/6691* (2013.01); *H01R 25/006* (2013.01); *H02G 3/14* (2013.01); *H02J 4/00* (2013.01); *H02J 7/007* (2013.01); *H02J 7/0042* (2013.01); *H02J 7/0047* (2013.01); *F21V 23/0442* (2013.01); *F21V 33/006* (2013.01); *F21W 2121/00* (2013.01); *G02B 6/0021* (2013.01); *H01H 2009/186* (2013.01); *H01R 13/713* (2013.01); *H01R 24/76* (2013.01); *H01R 2103/00* (2013.01); *H02J 2007/0059* (2013.01); *H02J 2007/0062* (2013.01); *Y10T 307/406* (2015.04)

(56) References Cited

U.S. PATENT DOCUMENTS

| | | |
|---|---|---|
| 7,742,293 B2 | 6/2010 | Strauser |
| 7,897,277 B2 | 3/2011 | Meyer et al. |
| 8,116,077 B1 | 2/2012 | Strauser |
| 8,432,667 B2 | 4/2013 | Strauser |
| 8,545,039 B2 | 10/2013 | Patel |
| 8,562,187 B2 | 10/2013 | Smed |
| 8,758,031 B2 | 6/2014 | Cheng et al. |
| 8,899,797 B2 | 12/2014 | Schaak |
| 2006/0209530 A1 | 9/2006 | Schaak |
| 2008/0258642 A1* | 10/2008 | Patel ............... F21S 6/002 315/246 |
| 2009/0067161 A1 | 3/2009 | Nagata |
| 2009/0154148 A1* | 6/2009 | Meyer ............. F21L 2/00 362/157 |
| 2011/0084660 A1* | 4/2011 | McSweyn ......... H01R 13/6675 320/111 |
| 2011/0177703 A1 | 7/2011 | Lin |

\* cited by examiner

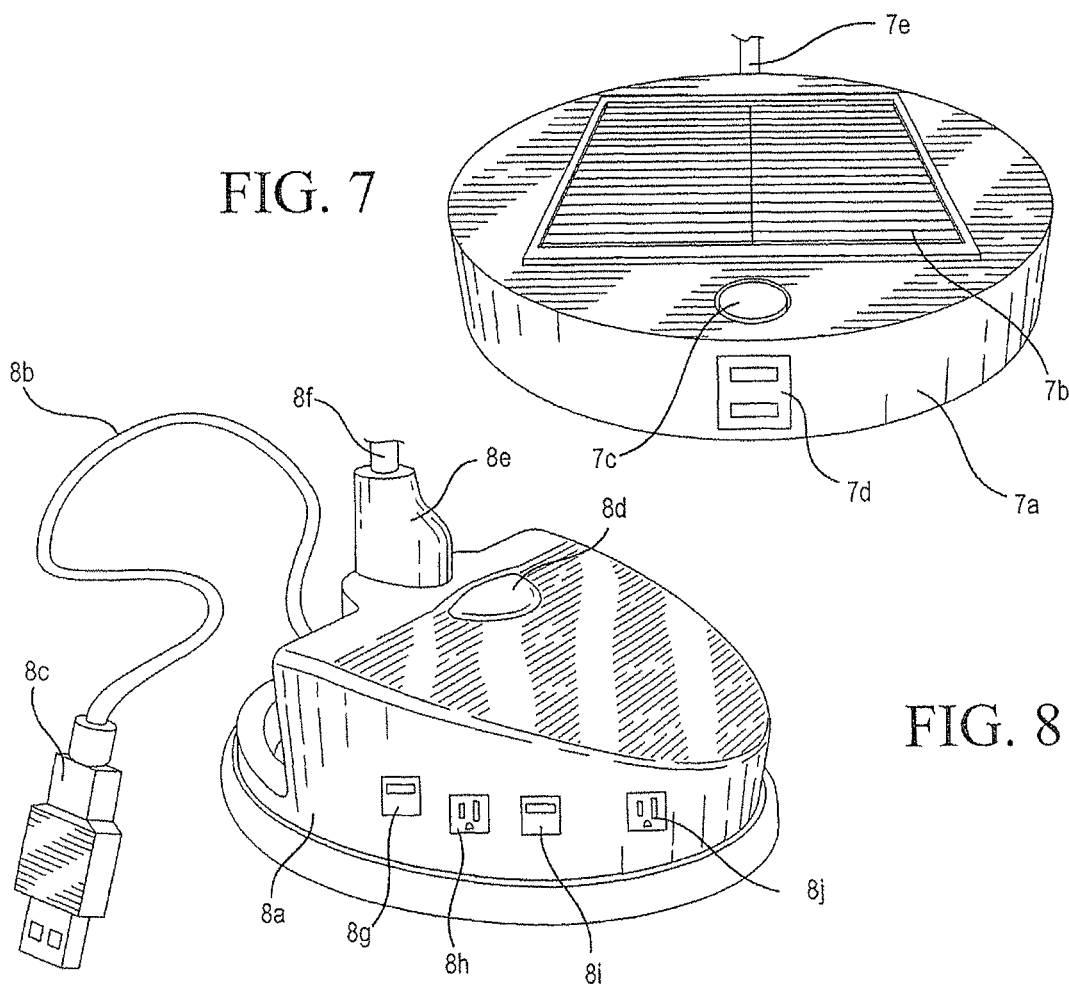
FIG. 7
FIG. 8
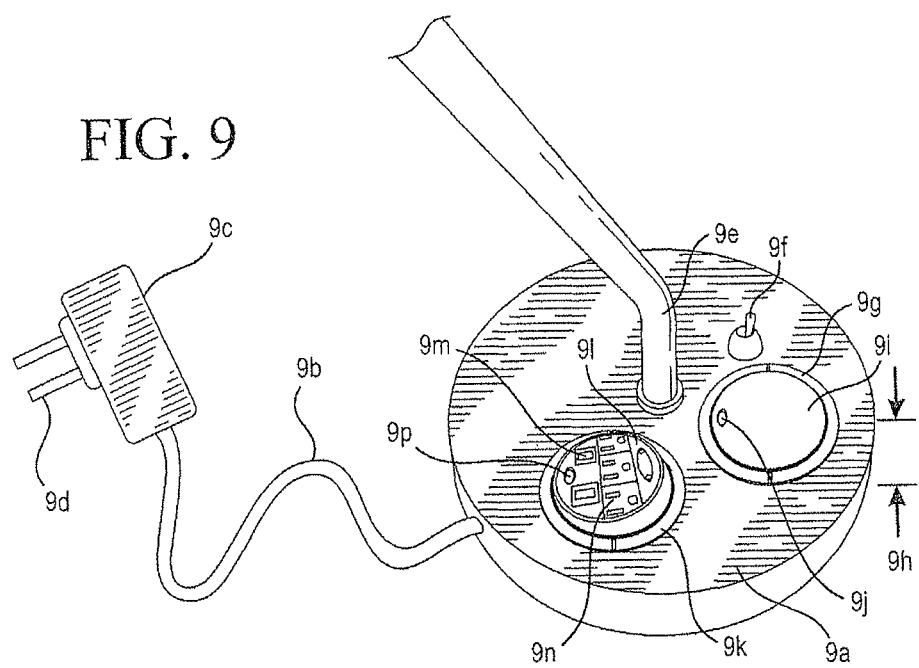
FIG. 9

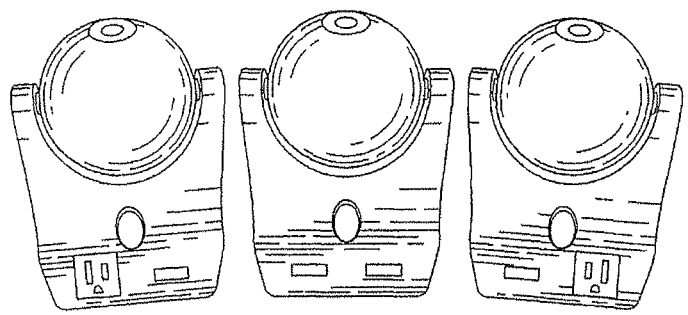
FIG. 24
FIG. 27
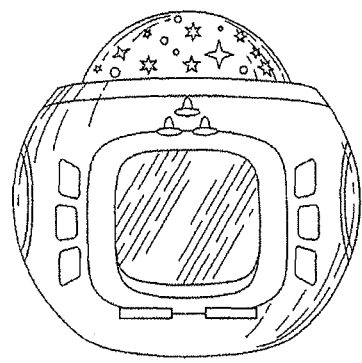
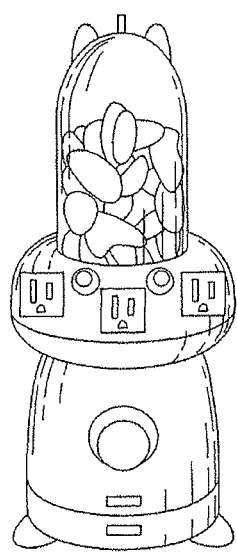
FIG. 28
FIG. 29
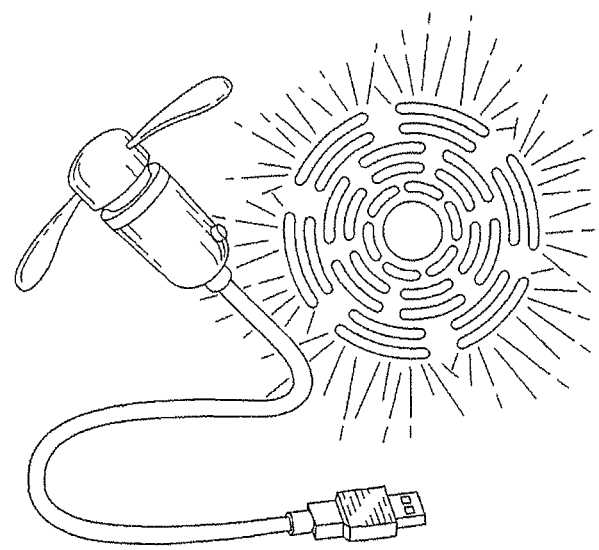

(1) USB-unit: No housing, Not sealed and install within the housing has one or more than one PCB arrangement.

(2) USB Modul:
More than one USB and optional outlet-unit (s) to fit within the said one housing to install within desk-top item housing

(3) Outlet-Unit & Outlet-Module:

Outlet-unit is one unit which can be 2 or 3 prongs receiving unit to supply AC power to device.

Outlet Module:
has more than one of Outlet-unit(s) and desired other USB-unit(s) or LED(s) inside its housing or PCB(s) to fit into desk top housing.

inside of Outlet-module

(4) Sealed unit:

Unit sealed has safety certification, Can fit within the desk Top items (with right electric connector for soldering or contactor ) or moveable to use for itself for outlets (prong means)

(5) Universal Unit or Module =

QUICKLY CHARGER HAS USB CHARGING-PORTS FOR DESKTOP POWER STATION OR LIGHTING DEVICE

CROSS-REFERENCE TO RELATED APPLICATIONS

This application is a continuation of (#GG-4C) U.S. patent application Ser. No. 14/827,810 filed on Aug. 17, 2015 which is Continuation of (#GG-3C) U.S. patent application Ser. No. 14/643,026 filed on Mar. 10, 2015 which is Continuation of (#GGG-2C) U.S. patent application Ser. No. 14/548,620 filed on Nov. 20, 2014 now is U.S. Pat. No. 9,182,111 which is Continuation of (#GGG-1C) U.S. patent application Ser. No. 14/540,561 filed on Nov. 20, 2014 which is Continuation of (#GGG-4) U.S. patent application Ser. No. 14/189,162 filed on Feb. 25, 2014 now is U.S. Pat. No. 8,931,947 which is continuation of (#GGG-3) U.S. patent application Ser. No. 14/144,703, filed Dec. 31, 2013, which is continuation of (#GGG-2) U.S. patent application Ser. No. 14/105,737 filed Dec. 13, 2013 now is U.S. Pat. No. 8,911,137 which is continuation of (#GGG-1) U.S. patent application Ser. No. 14/105,607 filed on Dec. 13, 2013 now is U.S. Pat. No. 8,915,608 which is continuation of (#GGG-2011) U.S. patent application Ser. No. 13/161,643 filed on Jun. 16, 2011 now is U.S. Pat. No. 8,783,936.

The current invention is continuously filed case of (#CCC-2) Ser. No. 14/793,262 filed on Jul. 7, 2015 which is Continuation filed case of (# CCC-1) U.S. Ser. No. 14/642,169 Filed on Mar. 9, 2015 which is continuation filed case of (#CCC-2010) U.S. Ser. No. 12/950,017 filed on Nov. 19, 2010, Public on May 24, 2012 Publication Number US 2012/0127708 A1 and now is U.S. Pat. No. 8,998,462 issued on Apr. 7, 2015.

BACKGROUND OF THE INVENTION

This application has subject matter in common with the inventor's U.S. patent application Ser. No. 13/117,227, filed on May 30, 2011, Now is U.S. Pat. No. 8,783,936 and entitled "Universal module of USB-unit or Outlet-units for electric or digital data device(s)."

This application also has subject matter in common with the inventor's U.S. patent application Ser. Nos. 12/502,661, 12/292,580, 12/566,322, 11/498,874, 11/527,629, 12/622,000, 12/624,621, which disclose a sealed-unit with uniform dimensions and shape to fit into the same uniformly dimensioned compartment so that the universal sealed-unit can fit into a variety of LED light devices. The sealed unit(s) disclosed in these applications share the following features:

a. The sealed-unit(s) has uniform dimensions to fit into the uniform compartment of any kind of LED light device.

b. The sealed-unit(s) has passed all related safety standards and received a laboratory's safety certification so that it can be used with other LED light device's parts and accessories which may or may not meet the safety standard passed by the said sealed-unit(s).

c. The sealed-unit(s) can be any individually salable unit because it has passed all related safety requirements and standards. The other parts or accessories may or may not be just decorative or have other functions to make the LED light device more valuable.

The current invention utilizes the sealed-unit concept in the following manner:

(1) The current invention utilizes the concept disclosed in the above-cited applications of providing a sealed-unit that has passed all the relevant safety standards but applies the concept to other electric device(s) which are not limited to an LED light device. It The concept may be applied to an LED light device, power strip device, wall outlet device, surge protection device, wall adaptor device, charging device(s), smart phone related device(s), computer related device(s), and other consumer electric device(s).

(2) The USB-unit or outlet-unit may be in the form sealed-unit of a rather than the previously disclosed LED-Unit, battery-pack, or prong and the said Sealed unit may just (2a) a charging circuit board assembly for USB-unit to charge (not supply) the energy storage unit which built-inside of the said other device only, (2b) maybe is a conductive-piece assembly for Outlet-unit to deliver or supply the input AC current to the other device (2c) USB-unit maybe just a USB-receiving device to get power from the outside transformer, adaptor, invertor which already change outlet's AC current to DC current so can just pass though the said USB-Unit to charge (Not supply) the current to the said energy storage unit inside the said other electric or digital device.

(3) The USB-unit or outlet-unit are arranged to charge or supply power from these units to a variety of electric devices to keep the electric device(s) in good power condition for people to use but USB-Unit is to charge the energy-storage unit and preferred is rechargeable battery and not directly supply power to the said electric device such as said mobile phone. The Outlet-unit which simple just is conductive-piece assembly to deliver the AC current to the said other device power input end such as prongs directly and optional have surge protection or wireless controller.

(4) The USB-unit or outlet-unit may each include its own related circuit, conductive piece, contact-piece, custom-pins, receiving-ends, output-ends, input-ends, electric parts and accessories to get the electric power from:

(4-a) AC power by a prong-cable from out-lets; or (4-b) DC power from USB-cable to get power from outside power bank/energy storage unit or assembly which has multiple Amperage current storage capacity not from the computer export-ends which only limited 500 ma too slow for charging; or (4-c) DC power from outside housing transformer, adaptor, invertor unit which already has circuit built-in and already change the AC current to DC current, and through a receiving-wire or delivery-wire or USB-wire has at least 2 male USB-plugs to insert into above USB-Unit or USB-Module female receiving-port (USB Charging-ports) for supplying DC power to a variety of electric device's female receiving-port which has desire contact or connector or Custom-Pin ports for the other device USB receiving port which depend on the other device's design so it is variable. The USB Charging-ports prefer to use Type A which is most common for the desktop items so can fit for all kind of the USB-wires at least one-plug of the said 2 plugs on each USB-Wire or jump wire or bridge wire at this time. On later time maybe will prefer to use Type C because more compact and majority of the other electric device will have this type of Type C USB-unit from now device so can make the other device has smaller new Type C USB-unit to make the overall size become more compact and thinner. Anyway, the one end of the USB-wire can be any type such as Type C, or any kind of Custom-Pin contact depend on market design and requirement.

The said USB port type may in Type A, Type B, Type C each of these has Female receiving-end and male plug so can build the electric power delivery. It also has digital data delivery but at this invention do not use and do not need to use the electric data or digital data delivery functions and the current invention only for Charging purpose only so can prevent slow charging or overheat issue happened.

The desktop items USB port (USB Charging-pots) do not use special of custom-pin to fit the other electric device's USB receiving-pots because this will become only can charge one of other electric or digital device. The current invention's USB charging-port preferred to use Type A which is most popular same as all laptop computer USB receiving ports because this can easily built-in on the Desktop items which is no need to have super compact size like the be charged items such as mobile phone, iPad™ which need as slim as possible so these communication or consumer electric products need use special custom-pin such as mini USB, Micro USB, or even type C for the USB receiving port so can allow the mail-plug of mini USB or micro USB can insert into so can make the communication or hand-held iPad™ as slim and thin as possible. For Desk top still use the Type A will be more popular and can fit almost every USB-wire, jump-wire, bridge wire so can charge any kind of other electric or digital device. As for special USB Charging-pots allow to charge minimum 1.0 Amp to 5 Amp specification release on 2007 and update on 2010 which is for quickly charging capacity this is what the current invention specify for charging capacity minimum from 1.0 Amp and has details discuss on hereafter.

(5) The current invention offers USB-unit or Outlet-unit is a universal module design with the most compact size to enable each of the USB-unit and outlet-unit or any combination of USB-units and/or outlet-units to form a desired module that fits into all kinds of electric device(s), including an LED light device, wall outlet, wall outlet adaptor, power strips, surge protector, communication device, computer device, consumer electric device, smart phone device, panel computer device, etc. The universal module design means can fit into more than one of the other devices and no need to change its electric circuit, PCB, trace with current invention use quickly charging USB Charging-ports has 2007 & 2010 definition and has minimum 1.0 Amp up charging capacity.

(6) Once the USB-unit or outlet-unit in circuit board assembly, in sealed unit assembly, in a universal module assembly and has passed all related safety standards and has its own issued certification, the finished electric device in which it is used does not need to get an additional safety certification related to USB-units or outlet-units. This means can save a lot of time and resource to apply each finish product's USB-unit or Outlet-unit meet the local safety standard and no fire, no electric shock, no electric shortage hazard. Plus, the current invention uses the quickly charging USB Charging-ports which has 2007 & 2010 definition and has minimum 1.0 Amp up charging capacity.

(7) The modules of the current invention can utilize any combination of suitable USB-unit or outlet-unit parts, such as a conductive wire, conductive plate, conductive piece, contact-kit, prong-cable kits, USB-cable, prongs, resilient conductive kit, printed circuit, flexible circuit board, related electric parts and accessories, fixing, positioning kit, and/or installation device to enable the module, outlet-unit, or USB-unit to pass the safety standard and get the relevant safety certification and be added onto more than one or a lot of others electric device.

(8) The modules of the current invention may have different specifications, such as:
  1 module has 1 USB-unit+1 USB-port,
  1 module has 2 USB-ports+1 outlet-unit,
  1 module has 2 USB-ports+2 outlet-units,
  1 module has only had 1 USB-unit, or 1 Outlet or, any combination of USB-units and outlet-units that still permits a standard module to fit into many of different electric device(s) as needed with current invention has quickly charging USB Charging-ports which has 2007 & 2010 definition and has minimum 1.0 Amp up charging capacity.

(9) The module can also have the following different specifications: 2 USB ports having different current outputs including; 1 Amp, 1.1 Amp, and/or 2.2 Amps to enable the 2 USB-ports to charge different electric devices such as an iPhone™ which need 1 Amp, and an iPad™, which requires 2.1 Amps.

If people want to charge 1 iPhone™+1 iPad™ at the same time, at least 3.1 Amps will be needed, which will be very expensive. Or more high-speed charge for 4.2 Amp for 2 pcs of 2.1 Amp, or for higher charge capacity for 4.8 Amp for 2 pcs of 2.4 Amp. from data the current invention preferred for USB Charging-port basing on 2007 released for USB2.0 standard and 2010 upgrade for charging-port. However, as the current invention all desktop has no any digital data delivery and only charging function, so the current invention can have bigger current charging than out of date (Before 2007) for limited 500 ma or less charging with overheat issues as the wiki reported on below text for cross reference!

If people want to charge the 1 iPhone™ or 1 iPad™ at different times, the standard module can be 1 port 1 Amp+1 port 1.1 Amp=2.1 Amps total, and the cost will be cheaper.

If people want to charge only 1 iPhone™, only need 1 USB-unit with 1 port which has only 1 Amp is needed for the most economical product. Hence, the module of the invention should not be limited to only one specification. But the current invention has quickly charging USB Charging-ports application which meet 2007 & 2010 released definition and has minimum 1.0 Amp up charging capacity.

The current invention specify the Charging capability start from 1.0 Amp up to hundreds of Amp and the old date before 2007 has limited for 500 ma charging capacity for out of date USB construction and also has overheat or burn problem for bigger than 500 ma so from 2007 has update USB charging port so market can have a lot of USB-charging device coming from 2010 for Big charging current such as the current invention. USB charging specifications can be found, for example in Wikipedia, The Free Encyclopedia.

The USB Battery Charging Specification Revision 1.1 (released in 2007) defines a new type of USB port, called the charging port. Contrary to the standard downstream port, for which current draw by a connected portable device can exceed 100 mA only after digital negotiation with the host or hub, a charging port can supply currents between 500 mA and 1.5 A without the digital negotiation. A charging port supplies up to 500 mA at 5 V, up to the rated current at 3.6 V or more and drops its output voltage if the portable device attempts to draw more than the rated current. The charger port may shut down if the load is too high.[92]

Two types of charging port exist: the charging downstream port (CDP), supporting data transfers as well, and the dedicated charging port (DCP), without data support. A portable device can recognize the type of USB port; on a dedicated charging port, the D+ and D− pins are shorted with a resistance not exceeding 200 ohms, while charging downstream ports provide additional detection logic so their presence can be determined by attached devices.[92]

With charging downstream ports, current passing through the thin ground wire may interfere with high-speed data signals; therefore, current draw may not exceed 900 mA during high-speed data transfer. A dedicated charge port may have a rated current between 500 and 1,500 mA. For all charging ports, there is maximum current of 5 A, as long as the connector can handle the current (standard USB 2.0 A-connectors are rated at 1.5 A).[92]

Before the battery charging specification was defined, there was no standardized way for the portable device to inquire how much current was available. For example, Apple's iPod and iPhone chargers indicate the available current by voltages on the D− and D+ lines. When D+=D−=2.0 V, the device may pull up to 500 mA. When D+=2.0 V and D−=2.8 V, the device may pull up to 1 A of current.[93] When D+=2.8 V and D−=2.0 V, the device may pull up to 2 A of current.[94]

Dedicated charging ports can be found on USB power adapters that convert utility power or another power source (e.g. a car's electrical system) to run attached devices and battery packs. On a host (such as a laptop computer) with both standard and charging USB ports, the charging ports should be labeled as such.[92]

To support simultaneous charge and data communication, even if the communication port does not support charging a demanding device, so-called accessory charging adapters (ACA) are introduced. By using an accessory charging adapter, a device providing a single USB port can be attached to both a charger, and another USB device at the same time.[92]

The USB Battery Charging Specification Revision 1.2 (released in 2010) makes clear that there are safety limits to the rated current at 5 A coming from USB 2.0. On the other hand, several changes are made, and limits are increasing including allowing 1.5 A on charging downstream ports for unconfigured devices, allowing high speed communication while having a current up to 1.5 A, and allowing a maximum current of 5 A. Also, revision 1.2 removes support for USB ports type detection via resistive detection mechanisms

(10) If the (10-1) module, or (10-2) a sealed-unit or (10-3) USB-Unit, or (10-4) USB-unit in a circuit board form, or (10-5) Outlet-unit, or (10-6) Outlet-unit is a conductive-piece assembly has its own issued safety certification and that can fit into the any compartment of any other electric device, there is no need to file, for each different electric devices, a UL, ETL, or CSA safety certification, which saves a lot of time for tooling, development, and safety testing for each different electric device. This will reduce a lot of R&D, development, tooling, safety certification time and fees.

However, Some cases, it no need get pre-certification for the all (10-1) to (10-6) because factory may only make 1 model of the products or other reason for limited products productions, so no need get pre-certification is also fall within the current invention has built-in USB related parts & accessories to Charging the DC current into the built-in energy storage unit of other device or Deliver the AC power though conductive assembly to the other device. To get pre-certification good only for factory has a lot of desktop items so need to do pre-certification to save each time test the USB-Charger or Outlet-unit or the items listed on above (10-1) to (10-6).

The co-pending application entitled "Universal module of USB-unit or Outlet-unit for electric or digital data device," U.S. Ser. No. 13/117,227, (#FFF-11) discloses a simple arrangement for enabling "Desk Top items with LED means having USB-unit(s) or USB-module(s) to charge a variety of electric or digital data device(s)," which does not require a universal module because some of the desk top items have plenty of room/space to accommodate a larger size of USB-unit(s) or USB-module(s) or above discussed (10-1) to (10-6) and reduce the cost for related electric components, parts, or accessories to make the items more cost attractive to the consumer.

The USB-unit(s) and all above discussed (10-1) to (10-4) is an electric USB-charging unit which has a USB-female receiving means (hereafter as USB-Charging port as wiki release on 2007 has minimum 1.0 Amp charging capability) to receive a wire's USB-male plug (hereafter as USB-plug) to deliver electric power from the USB-female receiving means (USB-Charging port release on 2007 as wiki disclosure) to the other wire device's USB-male plug (USB-Plug).

The preferred USB-female receiving means (USB Charging-Ports) gets power from a power source and uses circuit to convert the in-put AC electric power to an out-put power has desired waveform, voltage, and current flow or amperage (A or ma) by circuit which may (AA-1) circuit install inside the desk top housing has at least one of transformer, adaptor, invertor, converter to change AC current to DC current.

(AA-1) circuit install within outside housing's and has at least one of transformer or adaptor or invertor or converter to change AC current to DC current
to enable the wire device 1st USB-male plug (USB-Plug) to supply power from wire's $1^{st}$ input-end USB-plug to $2^{nd}$ wire-output end's USB-plug which has desire connector type selected from (T-1) Type A, (T-2) Type B, (T-3) Type C or (T-4) mini-USB, (T-5) micro-USB or (T-6) custom-pin USB while the $2^{nd}$ end's USB-Plug of USB-Wire to insert into the USB-receiving port of the other electric or digital device(s). The current invention all the related USB Charging-Port has min. 1.0 Amp up to 5 Amp and meet the USB 2.0 and USB 3.0 and has NO electric data or digital data delivery functions as co-inventor's plurality issued and co-pending filing case including parent filing case U.S. Pat. No. 8,783,936 filed on Jun. 16, 2011 and issued on Jul. 22, 2014 of inventor's reference series number (#GGG-2011), and child-Filed U.S. Pat. No. 8,911,137 (#GGG-2), U.S. Pat. No. 8,915,608 (#GGG-1), U.S. Pat. No. 8,931,947 (#GGG-4) and co-pending filing cases. Also, all the current invention only accepts ONLY ONE input current not allow more than one input current such as normal time is AC power and change to DC power while power fail which will had a lot of controller or additional circuit need to do which may have more risk for fire case happened.

The USB-module(s) described in the co-pending application is an electric charging module which has at least one (aa) USB-female charging receiving means (USB Charging-Port as wiki release on 2007) but also has several receiving means selected from (bb) an outlet-female receiving means (hereafter as Outlet-ports), (cc) USB-female Charging receiving means (hereafter as be charged device's USB Ports), (dd) USB-female Hub receiving means for digital or electric data delivery (hereafter as USB-HUB Ports)

(ee) an adaptor's female receiving means (hereafter as Adaptor-ports), or (ff) any conventional female receiving means (hereafter as Any-Other-ports)

to form a single body which has more than one (aa) USB-female Charging receiving means (USB Charging-port) to offer the same or different electric power though the different female receiving means (hereafter as different ports) within the one body.

The USB-module connects with an input power source and circuit to offer a desired waveform, voltage, and current (Amperage or mini-amperage) as output power to charge energy-storage unit or assembly inside of the said other device(s) when the female receiving means (USB ports) is connected with other device's the male plug (USB-Plug) of desire style of the connect, style, size, construction or custom-pin for connection for be charged device(s).

Hereof, also attached the USB history charter for different years for the USB generation;

Version history[edit]

| Version history overview[edit] | | | |
|---|---|---|---|
| Release name | Release date | Speed and max signalling rate | Note |
| USB 0.8 | December 1994 | | |
| USB 0.9 | April 1995 | | |
| USB 0.99 | August 1995 | | |
| USB 1.0 Candidate | Release November 1995 | | |
| USB 1.0 | January 1996 | Low Speed (1.5 Mbit/s), Full Speed (12 Mbit/s) | |
| USB 1.1 | August 1998 | | |
| USB 2.0 | April 2000 | High Speed (480 Mbit/s) | |
| USB 3.0 | November 2008 | SuperSpeed (5 Gbit/s) | Also called USB 3.1 Gen 1[19] |
| USB 3.1 | July 2013 | SuperSpeed + (10 Gbit/s)[20] | Also called USB 3.1 Gen 2[21] |

So, the current invention offers a quick USB charging-port to offer the min. 1.0 Amp and the current invention only for Charring function from the charging circuit connected with power source from (4-a) AC power by a prong-cable from the AC outlets from wall or extension cord, power strips and has circuit inside of Desktop item's housing has at least one of transformer, adaptor, invertor unit to change AC current to DC current or (4-b) DC power from USB-cable to get power from outside housing's power bank or/energy storage unit directly do not have other circuit or controller which has multiple amperage current storage so can offer minimum charging capacity from 1.0 A up to 5 Amp range or higher, or (4-c) DC power from circuit inside of outside housing has at least one of transformer, adaptor, invertor unit which already change the AC current to DC current, And though a receiving-wire or delivery-wire has at least 2 male USB-plugs to insert into above USB-Unit or Outlet-unit female receiving USB charging-port for supplying power to a variety of electric device's female receiving-port to charge the inside energy-storage unit or assembly DC current so can make other electric or digital device can work or operation.

To enable people to easily reach, touch, operate, or manage the desk top items, the USB-unit(s) or USB-module(s) are installed on or within the item/housing or a substrate(s). The items may be positioned at a location where people will stay for a period, such as a desk, table, bed, chair, land, grass, or wherever else people work, rest, or take a nap. For example, people use a computer, laptop computer, iPhone™, iPad™, or iCloud™ on a substrate(s), location, or place such as a table, desk, bed, laptop stand, laptop supporter, laptop cushion or any similar surface(s) which allows people to work, sleep, or lay down for a period of time while charging other electric or digital data device(s).

In all such places where people will stay for period, the nearby desk top items has built-in USB-units easily offer electric power to all other electric or digital data device(s), so people do not need to bend the body to find a power source under the table, which normally is farther away than the desk top items having LED means. Hence, this arrangement offers good convenience for people while they work, rest, or even take a nap, so that they can easily use the USB-unit(s) or USB-module of the desk top items to charge their small phone, computer, iPad™, or any other electric or digital data device(s) while they work, rest, sleep or take a nap.

It is desirable for the universal module of the USB-unit(s) or outlet-unit(s) described in the co-pending application to be made as small as possible so that it can fit into as many applications' limited housing size as possible and therefore really meet the goal of universal applicability. On the other hand, the smallest, slimmest, or most compact size of the USB-unit(s), outlet-unit(s), or USB-module is too expensive. For example, the APPLE™ iPhone™ or iPad™ USB-unit, which is very small in size, needs to use a very high cost compact transformer or inverter with super big power output to achieve a very short time to fully charge the other electric or digital data device(s). This problem can be resolved if, in order to get the USB-2.0 or new standard 2.1 amp output from the USB-unit(s), the size of some electric components, parts, or accessories such as transformer or inverter, or other same-function electric parts, or accessories can be increased by placing it in a desk top item with sufficient space, thereby obtaining the same big power output at a substantially lower cost to let the consumer save pocket money. Suitable desk top items to which a universal module, USB-unit, or outlet-unit can be added include a desk lamp, desktop lighted mirror, desk top clock, desk top radio, desk top fan, desk top lighting, reading light, wall reading light, head lighting, book light, electric picture display, night light with AC to DC power source or adaptor with prong and wire, projection light with AC to DC power source or adaptors with prong and wire, electric candle set with AC to DC power source or adaptors with prong and wire, or any LED device that can serve as a desk top item as described herein and that can accommodate a USB-unit or USB-ports designed only for charging purposes rather than delivery of digital data. The desk top items can provide function(s), performance, and effects(s) including, by way of example, generation of light beams and projection of images such as time images, as well as serving as a source of illumination, music, power, electric signals, photos, and digital signals for sound, light, music, smell or any conventional market-available devices that people will STAY there for a period of time sufficient to also enable charging of other electric or digital data device(s).

Wherein the definition for Desktop Item which have desired parts and accessories to make desktop item can stay on desktop surface including:
1. From FIGS. 1, 2, 3, 4, 5, 6, The said One of Desktop items is LED desk top lighting have large size of the LED light or From FIGS. 1, 2, 3, 4, 5, 6 LED desktop light device have its big base with or without weight-unit(s) inside so prevent from the heavy wires or people hit the light to fall down from desktop surface, and/or
2. From FIG. 1, 2, 3, 4, 5, 6, The said desktop item including the LED light device with LED illumination or added other functions which enables the LED device to serve as a non-portable desk top" as FIGS. 1, 2, 3, 4, 5, 6 have big size base, and FIGS. 7, 8, 9, 10, 11, 12 have thicker or more bigger size with or without heavy-unit(s) inside.
3. From FIGS. 1, 2, 3, 4, 5, 6, 7, 8, 9, 10, 11, 12, 13, 14, The said desktop items have USB-charging port or USB-unit has USB-pot(s) to supply DC current to other products.
4. From FIGS. 1, 2, 3, 4, 5, 6, 7, 8, 9, 10, 11, 12, 13, 14, one of Desktop items including at least one of USB Charging-port(s) or the said USB-unit, or USB-module has USB-port and/or outlet-port. Or USB-charging pot(s) inside the sealed-unit or universal-unit which install on desktop items
5. From FIGS. 23,24,25, 26,27,28, The said desktop item shows some of the desktop items people use on desktop and all these functions can add into the said Desk top LED lighting.
6. From FIG. 24 show one of desktop items or added function into said LED light device which is other one of the desktop items or added function into said LED light device which is the project lighting to project the desired LED light-beam, lighted-pattern, lighted-image, and/or
7.
8. From FIG. 27 show one of desktop items or added function into said LED light device which is alarm clock, LED digital clock to offer time, date, week, month, year, weather related information including temperatures basing on current invention and all above listed co-pending and earlier filed case drawing. Or the added function is offering the multiple color LED light beam or changeable color LED lighting. and/or combination with color selection and function selection and desired market available LED light effects, performance, and/or
9. From FIG. 28 show one of desktop items or added function into said LED light device which is offer food FIG. 28 or offer show one of desktop items or From FIG. 25 show one of desktop items or added function into said LED light device which is added function into said LED light device which offer the coffee or water or soup or liquid device. And/or
10. From FIG. 29 show one of desktop items or added function into said LED light device which is a multiple functions air-flow device which also offer LED lighted patterns lighted image for desired color and brightness for light-beam, lighted patterns, lighted image or any
11. The said semi-permanent device except people replace or move out to use anymore such as
    (a) From FIG. 1, 2, 3, 4, 5, 6, 7, 8, 9, 10, 11, 23,24,25, 26,27,28 is some of desktop items which is desktop non-movable LED light as FIG. 1,2, 3, 4, 5, 6, 7, 8, 9, 10, 11 because too big size and too heavy, or These desktop item or added function into LED desktop lighting device is too heavy and no any consumer will carry it for a portable device, so this is means semi permanently installed on a desktop except people do not use anymore. This called semi-permanently.

The common sense from people or market traditional concept and acknowledgement the said desktop items which has big size or big-base or base with weight-unit inside so can solid to arrange on desktop and these big-size base or add heavy-unit(s) to prevent the LED from falling off the desktop until removed by a user despite a cord of the LED light hanging over an edge of the desktop are common sense against the portable-items which like US prior art Quirky can put into backpack and carry all the time and use for anywhere.

(b) From FIG. 23,24,25,26,27,28,29 with at least LED light to supply illumination and USB-port and/or added other functions selected from the (b-1) FIG. 23 is LED lava light which sold anywhere in USA and it have the glitter or reflector or wax inside with chemical compound or salt water or motor to make the inner miniatures, reflector, liquid to move with color changing, brightness changing or setting or selection as all market available items for LED light beam for multiple color or single color or low brightness or high brightness with sensor, switch, motion sensor, power fail, RF or wireless controller as market existing items functions, (b-2) FIG. 24 for project light to project lighted image, lighted patterns or light beam. The said project is including the said project inner image-forming-unit or project outside object shape so can project the said lighted-image, lighted-pattern, light-beam.

(b-3) FIG. 24 LED is project light-beam or lighted-pattern or lighted-image which desired round top-piece which has built-in project lighted image or patterns or light-beam from the ball or half ball surface while have reflector on half-ball surface to project the lighted-image. It also has the project optic-lens on full ball to project inner image-forming-unit for far-away distance surface.

(b-4) FIG. 25 is liquid machine with LED light(s) same as all market items with LED for operation status which is same as current invention said is one of desktop items with LED light.

(b-5) FIG. 26 for air-freshener, air-purifier, air-sprayer, moisture sprayer device as all market items which install on desktop to offer fresh air or smell air to people with LED light to offer colorful or desired accent light for this kind of device as market available items.

(b-6) FIG. 27 LED alarm clock which is LED 8 segments to form the time or LCD display unit which has LED light-source light-beam to passing through the light passable LCD to show the time or weather related data, or FIG. 27 is LED weather station or time piece which has the LED light-source to offer the light-beam or back light to glow the front LCD display for many time and weather data or (b-7) FIG. 28 candie machine has LED light as market and playground exiting items to let people can try their luck while people put into coin.

(b-8) FIG. 29 LED air-flow device which create the desired temperature air-flow including air-flow or cold-air or hot-air or air with moisture, air-with frequent device with built-in LEDs to emit the desired LED light-beam for colorful and brightness which can have all LED light-effects, light-functions for change or setting or select the color and brightness, From FIG. 29, shown one of market available air-flow device to offer air-flow, or other airflow including heat, moisture, air-freshener, and/or (c) From FIG. 1, 2, 3, 4, 5, 6 show the said Desktop LED light device which has angle adjustable bar, pole, tube which can be adjustable as common sense or market all models as FIG. 1, 2, 3, 4, 5, 6 shown the tube, bar, pole has not seen the inner snake-hose or angle-adjustable-knit inner construction, but all marketing items which none-of the desk lighting without the angle adjustable arm, tube, bar so this means all the ugly snake-hose or adjust-angle-kit is inside the said coating, sleeve, envelope, soft-sealing. So, each bar or tube or pipe or pole for angle adjust purpose is "The adjustable arm has inner bendable parts sealed within an outer plastic material or tube, a coating or a metal material that is comfortable to touch"

(d) From FIG. 23, 24, 25, 26, 27, 28, 29 each of the Existing market products as (d-1) FIG. 23 is market available LED laser light offer area-illumination and have built-in USB-Charging port(s) and Outlet-ports and the moving liquid by motor or liquid-compound by heat-means to show the desktop items have built-in (i) offer the area-illumination, and (ii) USB-charging ports and (iii) added outlet-port to supply AC current to other products, and (iv) desired color and brightness with desired setting or adjustable or selection of color and brightness This is FACT to prove the said Desktop items had "At least one added function".

(d-2) Same as other FIG. 27 here is the LED digital alarm clock has the (i) LED for area illumination and (ii) project light from top-cover have design or arts to emit desired color light-beam or lighted-pattern or lighted-image or combination, and (iii) offer the time, date, week, monthly, year and weather including temperature, and (iv) built in speaker on two sides, and (v) has the setting, selection, adjustable total 8 switch on surrounding the LCD or 8 LEDs segments LED light-source, and (v) the said built-in USB and outlet to match the claim "At least one added function".

(d-3) Same as FIG. 29 show the Air-flow device has the (i) LED offer area illumination including light-beam or lighted-patterns or lighted-image or any combination as drawing show and also have (ii) air-flow which can be air, cool air, hot-air, air with humility, air with smell including freshener, or air-fragrance, and have (iii) USB-port and (iv) Outlet ports which have 4 functions inside the LED desktop items have LED for offer the illumination and have the other added functions to meet the claim "At least one added function".

Same as FIG. 24 for LED project light device which have (i) LED to offer area illumination and (ii) project light-beam or lighted-image or lighted-pattern from internal image-forming-unit or outside object shape through the built-in optics-piece including refractive and/or reflective lens so can show the projected light-beam and/or lighted-image and/or light-beam to be seen at the LED project device or areas away from the project device to match the claim said "At least one added function".

The current invention is different with the $3^{rd}$ group of US prior art including:

1. U.S. Pat. Nos. 7,736,033 and 8,545,039 Patel.

The Lamp Base with Electric device recharge receptacle & means. The Bhart's disclosure the Outlets device and the Cigar lighter build on the lamp base. The Lamp Base make the input AC current transfer to output current to automobile current (12 Volt), then the Automobile cigarette make the input current from (12 VDC) to USB end current (5 Volt). This means the Bhart's device at least need 2 expensive circuit/Transformer to get the USB Charger's output current from (120 VAC wall outlets) to (USB Current 5 VDC). This is not economical and none of people need 12 Volt DC for house use at all.

The current invention direct installs the USB Charger unit which transfers the input-end 120 VAC to output-end 5 VDC so this is practically.

2. US Prior Public 2011-017703 Rotatable & concealable device which only has the outlets device with manual switch. This is directly for 120 VAC outlets power source directly though metal piece and delivery 120 VAC to the rotatable & concealable device's receptacles to offer 120 VAC current while the other device's plug means connect with the said receptacle.

'703 patent fail to disclosure the any USB charger concept, circuit, design and application so not have any related with the current invention for USB charger and the current invention device use overlay to sit on existing lamp base to offer multiple power type power station with a lot of features.

3. US prior art: U.S. Pat. No. 7,897,277 Meyer et al, disclosure the reversible battery cartridge which are use the AC batteries cartridge as the backup power for the all kind of lamp which mainly for power fail application. This is nothing to do with USB ports and USB charger application. So, there is totally different with current invention related to (1) USB ports+(2) USB Charging+(3) Outlet supply power source+(4) LED light and Universal lamp base to fit for all kind of existing lamp base so not occupy any new desk top space because (5) the Universal Desk base is overlay top of the existing lamp base.

Furthermore, the current invention has (6) LED light incorporate with the above listed (1) (2) (3) (4) (5) so it become a unique practical Universal Power station because (7) the current invention is not only supply one kind of power to charger different electric or digital-data device(s).

4. US prior art—U.S. Pat. No. 6,474,823 Disclosure the laptop computer with top illumination light which is not for the AC power source into USB related circuit to transfer to the DC current to charge DC 5 Volt electric device. The Computer input-end current is 120 VAC but it passes though the computer its transformer already transfers to output-end current at 5 VDC and then there is no any USB Charger circuit inside the computer so the computer's external transformer which directly to delivery 5 VDC current to the to the USB Port so the computer system which is not same as current inventions the input-end current is 120 VAC though USB Charger inside circuit to get the output-end for 5 VDC.

The total circuit and concept are different because computer prior art use the EXTERNAL Transformer which not belong to computer itself parts to transfer the 120V Outlet power. Through external transformer get 5 VDC current (Outside the computer). The computer itself input-end current is 5 VDC and output-end current of USB ports also is 5 VDC so its proof, computer itself is no any USB Charger circuit inside.

5. US Prior art: U.S. Pat. No. 8,562,187 Smed disclosure FIG. 2 function for outlet-module has the PCBA to transfer the input AC current to 15 Volt 2 A to turn on the said LED or to change the input AC current to US power outlet or Other country outlet. This is different with the current invention for AC outlet-unit which is directly to deliver the AC current from input-end directly to the AC current output-end. Also, The Smed other output for 15 Volt DC which is not same as the current invention for DC5V with market available USB-port type to connect with all communication, computer, mobile phone wire's specifications so it is not replaceable. The SMED teach use power cord 36 has connector 7 to outlet connector 5. These is totally different for current invention's outlet-unit which no need any power cord 36 to build the electric delivery from desk top lighting device to the other electric device. The current invention outlet-unit has all outlet-receiving ends and can directly plug-into the other electric device male-prong to get electricity. The current invention also has major difference with '187 SMED for below details.

5-1. Transformer change AC to DC to 15 Volt 2 Amp DC current to power LED or other and USB port.

This is not workable for the Ivan's because 15 Volt DC is too high and will damage the be-charged items or create the over heat. The current invention transformer is 5 Volt DC with. So, the '187 SMED 15 Volt DC just to supply power to the Plurality of LEDs and do not charged other be-charged 5V batteries.

5-2. The Smed '187 SMED not teach the USB ports is Quickly Charging-port min. has 1.0 Amp Charging capacity at the DC 5 Volt.

5-3. The Smed '187 SMED not teach any Quickly charging capacity and details to delivery from USB port to Be-charged items.

5-4. The '187 SMED not teach the 2nd circuit-inside which incorporate with the Transformer's circuit-kits or Transformer's circuit-inner inside the outside Transformer housing or inside the lighting housing.

5-5. The Smed '187 SMED not discuss USB charging-port at DC 5 Volt and Connection for Be-Charged items. The USB-port 30 distribution the current to what purpose for 15 Volt DC current this too dangerously to use super high voltage 15 Volt DC to charge 5 Volt batteries of the said be-charged items which is not meet US safety regulation by the USB-Charging port requirements including UL or ETL or another test lab. not like current invention details describe all USB Charging-port at DC 5 Volt with Min. 1 Amp to 5 Amp has safety authority certifications to charge the Be-charged device Energy storage unit or assembly so can let be-charged item can operate.

5-6. The '187 SMED transfer 15 Volt 2 Amp DC current which SUPPLY power to LEDs or others, this is not a current invention discussed to charge be-Charged items such as the APPLE™ iPhone™ or iPad™ which need 2.1 Amp or higher to charge properly. SMED 15 Volt not only too risk for Too high voltage to charge the Be-charged inside batteries but also has too few current to charge single one-piece APPLE™ iPhone™ or iPad™, it is impossible to charge APPLE™ iPhone™ or iPad™ at same time which current invention did teach for any combination for more higher amperage needed such as 2.1 Amp, 3.1 Amp, 4.2 Amp. 2.4 Amp, 4.8 Amp and all meet the safety standard for USB Charging-port has 5.0 Volt DC range for output voltage and not harm to other be-charged device which inside battery is 5.0 Volt range.

5-7 The '187 SMED lack of the $2^{nd}$ or more circuit-inside inside the Device as current invention. The $2^{nd}$ or more circuit-unit which may has $2^{nd}$ transformer because if need to SUPPLY ANY LIGHT SOURCE, it may need one Big Power output such as 5 VOLT 5 Amp for Plurality of LEDs Including color changing LEDs (White LED 20 pcs plug Warm white 20 pcs) so need one transfer as the '187 SMED needed. But also need to have current to the said USB Charging-port(s) which may need 5 Volt 4.8 Amp so one transformer is not enough and not good to supply 2 applications. So the current invention needs $2^{nd}$ or more circuit so can have $1^{st}$ Circuit-inner to supply the USB Charging-ports and $2^{nd}$ or more circuit-inside to supply current to other application including plurality of LED, Super Big power consumer CFL, Energy saving bulb, LED bulbs, time display (May use separated batteries), or Controller need such as IP cam, motion sensor, IR for dim light help IP cam, wireless communication, motion sensor all these other added functions.

6. US Prior art: U.S. Pat. No. 8,758,031 Cheng et. teach the inside wall USB charger device which is not same as the current invention. Also, Cheng's filed date is Jul. 23, 2012 which is too late than current inventions. Also, this is for the Power Box inside wall has USB charger. Not same as current invention.

7. 8, 9, US prior art: U.S. Pat. Nos. 7,742,293, 8,116,007, 8,432,667 Strauser teach the music player has pedestal support or foot to put ground the exemplary audio device (system) 10 has a system console 24 supported by a pedestal 20. The system console 24 typically has controls (e.g. volume, play, stop, etc.), displays and indicators. In this exemplary system 10, music or karaoke content comes from a digital music player 80 that is inserted into a cradle 81 (see FIG. 8) and connected to audio inputs 99 of the exemplary system 10.

Even Strauser teach the USB plug to power the music-player as below content;

In a preferred embodiment, the cradle 81 is stepped as disclosed in the parent application, "DIGITAL MUSIC PLAYER CRADLE ATTACHMENT," Which is included by reference. Thereby, the cradle 81 supports a large variety of music players 80 of varying sizes and shapes. In such, the music player 80 sits in a cradle 81. Power is provided from a power port (e.g. USB port) 21, into which the power cable plugs 82 (e.g. USB plug) is connected to provide power to the music player 80. But it is different with current invention for (1) not desktop items because pedestal 20 for ground installation (2) not people hand reachable distance to charge the other electric device furthermore need to walk to far distance which more trouble than bend body to get power from power strips or outlets (3) No any light source to offer indicator light or any illumination (4) the music player (80) it's do not supply the power to other device which is different with current invention is music device has built-in circuit and transfer input current to DC 5 Volt to charge the other electric device. So, this is not same as current invention for desktop definition and people will stay for a period to charge the other device.

10. U.S. Pat. No. 8,899,797 which for has USB port install on the movable (Movable parts & accessories or Organizer, Or Addable parts & Accessories).

(The alternative may add the USB-unit or USB-Module or Outlet-unit or Outlet-Module on the MOVEABLE or ADDED parts of Desk lamp)

The '797 who is filed on Aug. 26, 2012 after Co-inventor's U.S. Pat. No. 8,783,936 (# GGG-2011) Public on Dec. 15, 2011. and '797 patent has one prior filed and abandonment as below because it adaptor the phone's custom-pin plug to connect with phone female custom-pin end to build the electric and audio signal delivery, so this is not like the current invention has all USB-port which is female USB receiving ends on the desktop item and though the male-plug kits to of USB wire which has male-plug ends on 2 ends and one end connect with Desktop female USB port and other male plug end inert into the be-Charged device.

Hereof, The comparison for the
11. US Prior art 2006-020-9530 as below:
1. '9530 has bulb-socket so it is not the Built-in LED lamp. This maximum can add LED bulb Lamp device.
   Fact Column (0005) Line 10
   A terminal housing is disposed relative to the neck second portion, a bulb socket including a seat portion is attached to the terminal housing, and a shell portion of the terminal housing is shaped to receive the base of a light bulb.
2. '9530 The Transformer and Bulb-socket in parallel connection. So, the light source is getting 120 Volt current which is not built-in LED lamp device
   Fact Column (0006) The lamp support may also house a transformer
   electrically coupled to the power cord in parallel to the bulb socket.
3. '9530 The $2^{nd}$ socket on the edge of the support or base is Custom Pin-Out, not regular USB-Port so only can charge 1 model of phone as Contact (44) both all for Customer Pin-Out design. This is limited for one and ONLY ONE item can be charged.
   FACT [0007]
   Alternatively, the lamp may include a second socket disposed on the support, the socket having a first end directed internally of the support and coupled to the speaker and a second end positioned externally on the support for connecting to a media device compatible cable.
4. '9530 No any wire from charging contact (44) or outside socket (50) needed while charging the phone. Because the contact (44) or Outside socket (50) both is custom pin-out construction and the phone just directly plug into this Custom Pin-Out can directly charger . . . . This is only limited one and ONLY ONE phone can be charged. Not like Ivan's use common USB-female-receiving end and Charging wire's USB insert male-plug to deliver the current and the though charging wire's other ends to connect with the electric or digital device.
   The audio output cable (17) though Round Plug (17a) to transmit the data to speaker (15) (15a), Audio Output cable (17) one end to Music media device (100) and another end to Speaker (15a) (15b)
   FACT [0019]
   As illustrated in FIGS. 1 and 2, an audio output cable 17 is electrically connected via a plug 1711 at one end to each of speakers 15a and 15b. As illustrated in FIGS. 2 and 4, the other end of audio cable 17 may be fed through an orifice 19 in support 12 and be operable to connect, for example, to the headset jack or other audio output terminal of media player 100 as indicated. Alternatively, as illustrated in FIGS. 1 and 3, the orifice 19 may house a connector (not shown) for plug connecting to a plug 17b of output cable 17
5. '9530 do not has built-in LED light source, only can install the LED bulb at the bulb-base. Not like the co-inventor's (3) issued patents or co-pending case has LED built-in as light source, No Bulb-Base at all.
   FACT (0021) line 10
   The light source 24 (e.g. incandescent bulb, halogen lamp, Fluorescent bulb, or one or more LEDs) is mounted in the bulb socket 20 and positioned in a plurality of positions relative to the support 12 by arrangement of the Flexible neck 14.
6. '9530 The contact (44) is Custom Pin-Out type which only can charge one and ONLY one model of the phone. Also, the Recess Slot which also become Big limited to fit one and ONLY one phone.
   FACT (0025)
   As illustrated in FIG. 2, the recess 42 is provided on the top surface of the support 12 for receiving the media player 100. A plurality of contacts 44 are formed at the base or on a Wall of the recess 42.
7. '9530 Only can charge one and ONLY ONE phone because (A) Recess (42) size is fixed (B) The contact (44) need align precisely to the phone contact so can charge one and Only One. Not like Ivan the charging port is common USB-Port!!
   FACT (0026)
   Recess 42 is shaped to snugly receive a lower portion of media device 100 to align or Mattingly couple electrical contacts 46 on the media device 100 with contacts 44 of support 12, and thereby act as a socket for media device 100. Contact between contacts 44 of support 12 and contacts on media device 100 (not shown) for example may permit a rechargeable battery housed Wholly Within media device 100 to charge. Contacts 44 and media device 100 contacts are adapted to Mattingly couple with each other so that DC voltage can be supplied to the rechargeable battery of media device 100 for charging through the coupled contacts 44 and media device 100 contacts. In addition, if the media player 100 includes audio output contacts in proximity to the charging contacts, ones of coupled contacts 44 may be connected to speakers 15a and 15b via an internal cable (not shown) as an alternative to audio output cable 17.
8. '9530 The LEE unit only can charge one and ONLY One phone and the charge contact all is Custom Pin-Out type. The current invention's items have USB-Port which can work with any USB-Port charging wires to connect with the Other electric device and digital device.
   FACT [0027]
   In accordance with an alternative arrangement of the present invention and with reference to FIG. 4, a charging circuit is excluded from lighting apparatus 10, and contacts 44 are electrically connected to a socket 50 disposed on an exterior surface of support 12. Connection between contacts 44 and socket 50 are provided through internally disposed cable 51.
9. '9530 LEE use custom Pin-Out construction on the contact (44) and Outer socket (50) which same as LEE Example iPod© wires for custom pin-out so can fit and charge one and only One phone . . . . Not like the other end on the computer as USB-port which Ivan patent claimed.
   FACT (0027) Line 2
   Socket 50 is adapted to inter face with the charging and/or data cable associated with media player 100. For example, an iPod media player sold by Apple Inc. typically employs a cable to connect the iPod to a computer via the computer's USB port. This cable has a custom pinout on one end which connects to the iPod device and a USB connection on the other end Which mates With the USB port on a computer.
10. '9530 LEE device can transmit BOTH DATA and CHARGING. This is not happening at Ivan item because Ivan item only has the CHARGING FUNCTION. This is not same on basic CHARGING of CHARGER DEVICE!! So, this is totally different with Ivan's CHARGER patent.

Fact (0027) Line 14 to 19

The cable allows both transmission of data between the computer and the iPod and charging of the iPod's internal battery through the USB port on the computer.

11. '9530 LEE device cable is associated audio media device & get power from the inner charging-circuit and get power from CUSTOM PIN-OUT contact (44) or Outer socket (50). This is totally different with Ivan's can charge and ONLY CHARGE many different electric or digital device. Not one and ONLY one as LEE claimed and details description for AUDIO MEDIA DEVICE (100).

FACT (0027) Line 2

Socket 50 is adapted to inter face with the charging and/or data cable associated with media player 100.

Also, US (2006-020-9530) for contact (44) and Outer socket (50) has below text;

The said USB receiving end (USB port) is one end of USB-Charging cable which same as all laptop computer USB receiving end, not USB custom pin-out, not USB mini, Not USB compact, Not USB other name which is the other end of the said USB-Charging cable which only fit for limited number of the electric or digital device.

12. US abandonment public prior art US 2009-006-7161
The Foldable mirror set is not Desktop installation. That is travel unit not let people to install on desktop surface always.

The Power from the Computer and which is not quickly charger and has very limited current less than 500 ma not like current invention has minimum 1.0 Amp up to 5 Amp for definition of the USB Charging-Ports release on 2007 and update on 2010.

Also, the computer USB is not charger into the Foldable mirror into foldable mirrors' internal rechargeable battery. The Computer is SUPPLY the current to the foldable mirror while the USB Male plug into the computer ports and has power. Not charging into rechargeable battery and storage inside the rechargeable ready to use.

The foldable mirror had no any internal transformer to change incoming AC current to DC current.

The foldable mirror had no outside transformer get power from outlet AC power source.

So, this prior art is nothing to do with current invention.

SO, From Above (12) $3^{rd}$ lot US prior arts points different with LEE (2006-020-9530), The current invention any issued or co-pending filing no any same or similar with LEE's '9530. Furthermore, the '9530 on 2006 is no charging capability over 1.0 Amp as wiki report shown all the history and data so the charring capability and Not allowed the Digital or electric data to delivery on old date 2006, so that is not like current invention for quickly charge USB Charging-Port as above discussion and wiki data!

Furthermore, the other two US and China Prior and more discussed for all related US prior arts for 2" time discussion as below;

To make clearer for the current invention has big improvement than all US prior arts which mainly not same categories with current invention as bellow list is $2^{nd}$ times for more detail's comparison for (15) US and China prior arts as below:

1. Daniel, Quirky Ember "Portable study lamp with USB port and power outlets, Jan. 28, 2011.
   US Quirky device is a portable study lamp with USB port and power outlet And as the Sep. 15, 2015 Third party page 45 show very clear "Quirky confession the device is "PORTABLE STUDY LAMP and POWER STRAP➔ WANT A LAMP INTEGRATED BOTH OF FUNCTION", and the page 45 show apply the power-strap on wall-outlet and light is hanging on the wall . . . (This is totally different the definition of current invention for DESK-TOP ITEM, No need dictionary to explain the meaning for "Desktop items" vs. "Portable POWER-STRAP & PORTABLE Study Light".

This is strong-evidence for (Quirky "Quirky confession the device is "PORTABLE STUDY LAMP and POWER STRAP➔ WANT A LAMP INTEGRATED BOTH OF FUNCTION" is not for the permanently installation on desk top items. This is totally different categories for (Portable device) vs. (Current invention for only for permanently desktop items except people not use or replace it.

However, the different for both as below discussion, including:

The current invention is;

a. Non-portable device, and never can put into backpack to carry anywhere often (supported by FIG. 1, 2, 3, 4, 5,6, 7,8, 9,10,11).

b. Permanently install on desktop which will not move evenly because always put on desktop surface and it is big and heavy and impossible to fit into backpack. (supported by FIG. 1, 2, 3, 4, 5,6, 7,8, 9,10,11).

c. Has Big size or big base or too heavy stop fall out from desk top surface (supported by FIG. 1, 2, 3, 4, 5,6, 7,8, 9,10,11).

d. Has the bendable arms which is sealed by plastic or chemical coated to form soft touch surface (Supported by FIG. 11 and FIG. 13 and FIG. 14)

e. Current invention has adjustable arm or bar or rod which has base which is 90 degree install on the LED desktop base (Supported by FIG. 8,9,11,12)

f. The USB port install base wherein the base and base of flexible arms is on vertical or around 90-degree relation and not can changeable angle (Supported by FIG. 8, 9, 11, 12)

g. All USB-port is face outside install on the base contour side wall to prevent water or ash get into the USB-Charging port(s) to make the electric shortage or over-heat because accumulated dust or ash to reduce the electric contact-surface. (Support by FIG. 7, 8, 11, 12 and FIG. 1, 2, 3, 4, 5, 6)

h. Quirkily not use Transformer for outside AC-to-DC power source which is AC-wired because Quirky is one of extension cord and add snake-house arms LED for light. (Supported by FIG. 3➔3C) (FIG. 5=>5C) (FIG. 9➔9c)

i. Quirkily has no any the added functions such as 1. FIG. 23 Lava light with moving reflector, miniature moving effects, or FIG. 24 project built-in image forming-piece or outside object lighted-image or lighted-patterns or light-beam, or FIG. 25 liquid supplier, or FIG. 26 air-freshener or air-fragrances or moisture functions, or FIG. 27 digital LED clock, or LCD alarm clock offer time, date, weather, sound, 8 switch for adjust, setting, selection for colorful and desired brightness, or FIG. 29 offer Air-flow, lighted patterns, lighted-image or light-beam, or FIG. 28 lighted candy or food supplier or vending machine all have the said LED light-source building to supply area-illumination (Support by Ivan FIG. 22, 24, 25, 26, 27, 28, 29).

j. Added function need different DC working voltage such as super brightness LED Or COB LED (Chip-on-board LED which is same as dice LED have to install on the Pronged circuit board, this is not new, Just Nick-Name of Chip-on-board same as Dice-on-Board—DOB) need to use 6V or higher which is not same as LED light or USB port 3/5 Volt. Quirky did not have this kind of other DC-to-DC current to offer other added-function because Quirky do not have other added-functions for extension cord with LED light, No Air-flow, No cosmetic mirror, No Clock or alarm clock, No air-sprayer, No music, No speaker, No project the object or built-in image-forming-unit lighted-patterns or lighted-image or light-beam. The current invention had this. (supported by FIG. 15+16+18 LED matrix, array, circle+FIG. 23, 24, 25, 26, 27, 28, 29 for added-functions into LED light-device and meet the current invention Claim add limitation)

k. The LED light device of one of Desktop items, the said adjustable arm or bar or tube or pole must have longer length which need higher than people waist to shoulder and need width must from base location to people at least one eye this width, so people can use while reading or working. The current invention LED lighting is Big-size or Big-base or heavy unit, so it is not able to move like Quirky extension-cord very light so can put base in any movable location(s) for each time carry out to new place so Quirky just need short arms or bar or tube. The current invention because different concept, construction, application so must be much longer than cross section length of LED Desktop light Cross section! This means the current invention from FIG. 1 to FIG. 6 the arm/bar/pole/tube (Y-axis) or height need close from people waist to shoulder. The (X-axis) or aid width need to from base-location to people eyes position (Normally people will put big and heavy bas away from right or left arms, so the width needs min. have 1 foot or more.==>this is not happening on Quirky (Refer to Third-party submission date on Sep. 18, 2015) Page 45 and 46➔ Show it is not for Desktop items, Page 25 show the light use on the wall outlet and on the bed. Page 46 show on the Floor.➔ This because quirky is use Power strip as base and add one snake house and put a single LED on top,)

Furthermore, Quirky copy co-inventor earlier filed cases (#BB-2008) U.S. Ser. No. 12/232,035 Filed on Sep. 10, 2008 Public Jan. 9, 2009, now is U.S. Pat. No. 7,824,185 issued date Nov. 2, 2010) . . . . As for the LED-unit has Flexible-arms is same as FIG. 6 of PARENT Case of (#AA-2008 Filed May 12, 2008). These 2 (# BB-2008) and (#AA-2008=Mar. 5, 2009 Public=May 12, 2008 Filed) so therefore Quirky did not filed USA patent because it is combining both Ivan 2 concept.

So, the Quirky Jan. 28, 2011 is 2 years later after check Ivan the (# AA-2008) and (# BB-2008) to combine to make the said Quirky Jan. 28, 2011 announcement instead of filed the USA patent filing.

➔ These limitations should be covering the Quirky whatever he said the PORTABLE Lighting!!

2. China patent 2007-2015 3487 Miss Lin Wa0Yeh filed on Jun. 11, 2007 issued Jun. 25, 2008

From the electric drawing can see that patent disclosure the light source is connect with AC current and the said AC/DC transformer only supply the 3/5V current into the USB ports, Not link to the (Light source) so that is the typical AC power light source. Even at the text said light source can use LED but at 2007 Jun. 11 did not had super bright white LED has market available can use for desk-lamp further said as current invention use a Plurality number of LEDs or recently COB LED-unit at that time before the 2007 June.

The current invention listed the major difference at:

a. The LED is Plurality LEDs arrangement for geometric positions to get desired area illumination.
  (Reason: On 2007 it is impossible for white color super bright LEDs+Cost issues) Even do not have COB for built-in plurality of the LED dice into one piece including square, rectangular, even 2017 came out for circle type.

b. The current invention details listed the current get from:
  b-1: outside AC-to-DC transformer so can get $1^{st}$ DC. Also, the current invention had $2^{nd}$ added functions, so may incorporate with built-in at least one of DC-to-DC circuit to make more than one or only one DC to fit for LED light source or-and added function or IC or USB export ports for same or different Current. (This is not even existing and mentioned by China 2007 filed patent for concept, application for use Outside transformer)➔ So this claim should be granted allowance!

b-2: Inside AC-to-DC transformer to get $1^{st}$ DC. The same incorporated with inner one or more than one DC-to-DC circuit to get $2^{nd}/3^{rd}/4^{th}$ DC circuit to let different LEDs or added functions to use which may use same or many different voltages. Such as LED array may need 6 Volt operation voltage which is not all same within 3/5 Volt.

Especially the COB or the High brightness output LED. (This is not happening on the 2007 for the more LEDs==Because update technical for different LED especially for super brightness or super power saving energy, assembly cost need use different working voltage with USB export 5 Volt current).

b-3: Inside AC-to-DC transformer to supply same current to LED or-and another added device. (This is other features no shown on quirky or China 2007 patent to disclose at all) . . . .

These (3) Specialized my filing feature has these Big Difference for LED desktop light. Which power by AC-wired Is different by (Outside AD-to-DC transformer) because all inner electric parts is different at all!

3. U.S. Pat. No. 7,736,033 Patel

Patel teach one lamp has the cigarette lighter round output receptacle and to receiving the (210) screw in by thread round transformer which transfer from 12 Volt to USB output voltage 5 Volt which is not same as the current invention has the UBS-receiving port which directly offer the 5 Volt current to another electric device.

This prior art been argued so many times. Not know why examiner cannot find one of prior art is similar with current application to let us know has real prior art existing. Not use this old prior art.

4. U.S. Pat. No. 8,687,392 (1) and U.S. Pat. No. 8,687,392 (2) Sims et al

This is other application which said the device itself need has the (50 of FIG. 1) capacitor or other energy storage element while the power converter is operating in the standby mode beside the AC-DC power convertor circuit (122 of FIG. 1) and plus other monitor system (54 of FIG. 1) This is not same as current invention for non-itself energy storage device or capacitor to make this expensive circuit for the current invention. So, this is nothing to do with current invention because from AC power source is unlimited power no need to waste money for power saving.

5. U.S. Pat. No. 8,853,884 Genannt berghegger et al

Teach the how to save power while the current is not operation. This kind of circuit is not use for Outlet which is only get power from AC power source only through the inner conductive receptacles to supply the current to inserted into male AC plug no matter when the male AC plug into or not into the receptacle, no any switch to control it. Same as USB ports output current, the current USB-port always relates to AC power source and through AC-to-DC transformer or at least one of DC-to-DC circuit so can get the preferred DC current volt to the said USB-port or other added functions again no any controller to make power less consumption or become big current to supply the current. That is fixed Amperage and voltage for each USB port.

So, this is nothing to do with current invention because from AC power source is unlimited power no need to waste money for power saving 6. U.S. Pat. No. 8,783,936 Chien This is the co-inventor parent filing case which has all same drawing with current invention. So, it is not the any prior art vs. tis continuously filing case.

The current invention earlier co-pending filed case including:

1. (#BB-2008) U.S. Ser. No. 12/232,035 Filed on Sep. 10, 2008 Public Jan. 9, 2009, now is patent U.S. Pat. No. 7,824,185 issued date Nov. 2, 2010) . . . . As for the LED-unit has Flexible-arms is same as FIG. 6 of PARENT Case of (#AA-2008 Filed May 12, 2008). These 2 (#BB-2008) and (#AA-2008=Mar. 5, 2009 Public=May 12, 2008 Filed) so therefore Quirky did not filed USA patent because it is combining both Ivan 2 concept.

So, the Quirky Jan. 28, 2011 is 2 years later after check Ivan the (# AA-2008) and (# BB-2008) to combine to make the said Quirky Jan. 28, 2011 announcement instead of filed the USA patent filing.

From (A-1) and (A-2) Both is enough to argue with Anabel for Quirky Is not the inventor for these (Power strip) and Outlet+USB+LED . . . . As above 3 Evidence.

A-3: From Quirky photos show, everyone know the Main-unit is (Power strip with USB and Outlet). There is No one will use the Quirky items for desk top lamp for reading.

A-3-1: Quirky items for short arms which not higher than people sited-shoulder height or not has horizon-axis for min. half-chest length . . . . The shorter arms not have vertical-height, it only can be treated for PROTABLE or WORKING TOURCH . . . . Meaning from Desk Lamp . . . . This should be having enough height above people shoulder or front arms height and has horizon-axis min. ½ chest width, so can let people have good desk lamp.

A-3-2: Quirky base is 100% can recognized is (Power strip) . . .

A-3-3: Quirky main-unit is (Power strip) so easily can carry, but same time, while it is power-strip for main-housing➔ Then it is very easily to portable or put into Backpack . . . . However, All Market Desk Lamp is very difficult to put into backpack and carry. Because Desk top lamp must very good installation on desk top surface because need to overcome 3 kind of Force at any time . . .

(Desk top Lamp) must overcome below 3 force including:

(A-3-3-1) Super Heavy 14 gauge-wire (US safety standard) if has outlets-unit for min. 6 feet long. Quirky power strip is not way to overcome this heavy 14 gauge 6 feet long wire weight . . . . So, is there any market power strip is there any one Can put on desktop and no fall from desktop?? The answer is NO!!

(A-3-3-2) The weight from Top LED-unit has LEDs and housing or another optics-lens, PCB.

(A-3-3-3) Arms or LED-Box/housing weight on horizon-axis so can let LED desk lamp not fall down or These 3 Weight can overcome only while the Desk Lamp has (1) Bigger Main-Base so can let all Top LED-unit housing or/and horizon arms center-of-gravity can fall within the Bigg-main base range. Or (2) The main-base must add weight-unit to overcome the center-of-gravity of top LED-unit housing and horizon arms weight So, this is not possible to add on the Quirky shown photos for (Power strips because inside is full of the metal piece for outlets and USB circuit!!

Hence, these are all arguments with Anabel. The Quirky is Not the $1^{st}$ one inventor for his photos because Ivan already show on parent filed case (# AA) and (#BB) and (#CCC) all these 3 cases drawing show very clear Quirky cannot filed USA patens so use publication on some medium.

(2) China patent=2007 Filed, this is very earlier date. Almost same year of Steve Jobs (Apply) came out $1^{st}$ iPhone on 2007.

The difference with current invention:

1. From China patents show the circuitry for incandescent radiation light source (105)

2. From the Chien patent the circuity show the Incandescent or other light source is work under the AC current while the Input AC power (100) from outside AC wire (101) and the AC current will go through the conductive-trace or wire to the incandescent bulb (105) and has one on-off switch (103) to turn on or turn off the AC current into the AC power light source.

From whole China patent background, brief drawing, details description did not discuss anything for the LED light source at all only show on the Claim 5 said all kind of light source(s) but lack of support from the anywhere of the whole patent for how to get work for DC-Operated LED can use shown circuitry which is AC current deliver to the light source (105).

Basing on the $2^{nd}$ times discussion of the top 2 Prior art for (A) Quirky and (B) China patent, both is invalid US prior art not only for above list discussion, but also current inventor had earlier than Quirky filed date Jan. 22, 2011 as below evidences;

Evidence A;

FIG. 1+2+3+8+9=U.S. Pat. No. 7,824,185 (#BB-05)12-232, 035-9-22-10F (extension cord has outlet and LED and 3 contact-points.

Evidence B.

FIG. 6=U.S. Pat. No. 07,722,230 (#41) (#AA-08) Filed on 2008

Evidence C;

Column 1 Line 44 (USB port)+FIG. 10C=U.S. Pat. No. 8,998,462 (#CCC-10) Multiple Surface LED Light filed on Nov. 19, 2010, U.S. Ser. No. 12/950,017 Public date on May 24, 2012 Public Number 2012-012-7708 now is US Patent and issued on Apr. 7, 2015.

Evidence D; (Child Filed patent of # CCC-2010)

FIG. 3+4+6+7+8+9=(# FFF) U.S. Ser. No. 13/117,227 for the PUB PDF File.

Evidence E:

(#UU-2010) filed on Nov. 3, 2010 U.S. Ser. No. 12/938, 628 on PUB PDF

The current invention is different with the $3^{rd}$ group of US prior art including:

1. U.S. Pat. Nos. 7,736,033 and 8,545,039 Patel. The Lamp Base with Electric device recharge receptacle & means. The Bhart's disclosure the Outlets device and the Cigar lighter build on the lamp base. The Lamp Base make the input AC current transfer to output current to automobile current (12 Volt), then the Automobile Cigarette make the input current from (12 VDC) to USB end current (5 Volt). This means the Bhart's device at least need 2 expensive circuit/Transformer to get the USB Charger's output current from (120 VAC wall outlets) to (USB Current 5 VDC). This is not economical and none of people need 12 Volt DC for house use at all.

The current invention direct installs the USB Charger unit which transfer the input-end 120 VAC to output-end 5 VDC so this is practically.

2. US Prior Public 2011-017703 Rotatable & concealable device which only has the outlets device with manual switch. This is directly for 120 VAC outlets power source directly though metal piece and delivery 120 VAC to the rotatable & concealable device's receptacles to offer 120 VAC current while the other device's plug means connect with the said receptacle.

'703 patent fail to disclosure the any USB charger concept, circuit, design and application so not have any related with the current invention for USB charger and the current invention device use Overlay to sit on existing lamp base to offer multiple power type power station with a lot of features.

3. US prior art: U.S. Pat. No. 7,897,277 Meyer et al, disclosure the Reversible battery cartridge which are use the AC batteries cartridge as the backup power for the all kind of lamp which mainly for power fail application. This is nothing to do with USB ports and USB charger application. So, there is totally different with current invention related to (1) USB ports+(2) USB Charging+(3) Outlet supply power source+(4) LED light and Universal lamp base to fit for all kind of existing lamp base so not occupy any new desk top space because (5) the Universal Desk base is overlay top of the existing lamp base.

Furthermore, the current invention has (6) LED light incorporate with the above listed (1) (2) (3) (4) (5) so it become a unique practical Universal Power station because (7) the current invention is not only supply one kind of power to charger different electric or digital-data device(s).

4. US prior art—U.S. Pat. No. 6,474,823 Disclosure the laptop computer with top illumination light which is not for the AC power source into USB related circuit to transfer to the DC current to charge DC 5 Volt electric device. The Computer input-end current is 120 VAC but it passes though the computer its transformer already transfers to output-end current at 5 VDC and then there is no any USB Charger circuit inside the computer so the computer's external transformer which directly to delivery 5 VDC current to the to the USB Port so the computer system which is not same as current inventions the input-end current is 120 VAC though USB Charger inside circuit to get the output-end for 5 VDC.

The total circuit and concept are different because computer prior art use the EXTERNAL Transformer which not belong to computer itself parts to transfer the 120V Outlet power. Though EXTERNAL transformer gets 5 VDC current (Outside the computer). The Computer itself input-end current is 5 VDC and output-end current of USB ports also is 5 VDC so its proof, Computer itself is no any USB Charger circuit inside.

5. US Prior art: U.S. Pat. No. 8,562,187 Smed disclosure FIG. 2 function for outlet-module has the PCBA to transfer the input AC current to 15 Volt 2 A to turn on the said LED or to change the input AC current to US power outlet or Other country outlet. This is different with the current invention for AC outlet-unit which is directly to deliver the AC current from input-end directly to the AC current output-end. Also, The Smed other output for 15 Volt DC which is not same as the current invention for DC5V with market available USB-port type to connect with all communication, computer, mobile phone wire's specifications so it is not replaceable. The SMED teach use power cord 36 has connector 7 to outlet connector 5. These is totally different for current invention's outlet-unit which no need any power cord 36 to build the electric delivery from desk top lighting device to the other electric device. The current invention outlet-unit has all outlet-receiving ends and can directly plug-into the other electric device male-prong to get electricity.

The current invention also has major difference with '187 SMED for below details.

5-1. Transformer change AC to DC to 15 Volt 2 Amp DC current to power LED or other and USB port.

This is not workable for the Ivan's because 15 Volt DC is too high and will damage the be-charged items or create the Overheat. The Ivan transformer must be 5 Volt DC with.

So, the '187 SMED 15 Volt DC just to supply power to the Plurality of LEDs and cannot charged other be-charged 5V batteries.

5-2. The '187 SMED not teach the USB ports is Quickly Charging-port min. has 1.0 Amp Charging capacity at the DC 5 Volt.

5-3. The '187 SMED not teach any Quickly charging capacity and details to delivery from USB port to Be-charged items.

5-4. The '187 SMED not teach the 2nd circuit-inside which incorporate with the Transformer's circuit-kits or Transformer's circuit-inner inside the Outside Transformer housing or inside the lighting housing.

5-5. The '187 SMED not discuss USB charging-port at DC 5 Volt and Connection for Be-Charged items. The USB-port 30 distribution the current to what purpose for 15 Volt DC current this too dangerously to use super high voltage 15 Volt DC to charge 5 Volt batteries of the said be-charged items which is not meet US safety regulation by the USB-Charging port requirements including UL or ETL or another test lab. not like current invention details describe all USB Charging-port at DC 5 Volt with Min. 1 Amp to 5 Amp has safety authority certifications to charge the Be-charged device Energy storage unit or assembly so can let be-charged item can operate.

5-6. The '187 SMED transfer 15 Volt 2 Amp DC current which SUPPLY power to LEDs or others, this is not a current invention discussed to charge be-Charged items such as the iPad which need 2.1 Amp or higher to charge properly. SMED 15 Volt not only too risk for Too high voltage to charge the Be-charged inside batteries but also has too few current to charge single one-piece iPad, it is impossible to charge iPad or iPhone at same time which current invention did teach for any combination for more higher amperage needed such as 2.1 Amp, 3.1 Amp, 4.2 Amp. 2.4 Amp, 4.8 Amp and all meet the safety standard for USB Charging-port has 5.0 Volt DC range for output voltage and not harm to other be-charged device which inside battery is 5.0 Volt range.

5-7 The '187 SMED lack of the $2^{nd}$ or more circuit-inside inside the Device as current invention. The $2^{nd}$ or more circuit-unit which may has $2^{nd}$ transformer because if need to SUPPLY ANY LIGHT SOURCE, it may need one Big Power output such as 5 VOLT 5 Amp for Plurality of LEDs Including color changing LEDs (White LED 20 pcs plug Warm white 20 pcs) so need one transfer as the '187 SMED needed. But also need to have current to the said USB Charging-port(s) which may need 5 Volt 4.8 Amp so one transformer is not enough and not good to supply 2 applications. So the current invention needs $2^{nd}$ or more circuit so can have $1^{st}$ Circuit-inner to supply the USB Charging-ports and $2^{nd}$ or more circuit-inside to supply current to other application including plurality of LED, Super Big power consumer CFL, Energy saving bulb, LED bulbs, time display (May use separated batteries), or Controller need such as IP cam, motion sensor, IR for dim light help IP cam, wireless communication, motion sensor all these other added functions.

6. US Prior art: U.S. Pat. No. 8,758,031 Cheng et. teaches the inside wall USB charger device which is not same as the current invention. Also, Cheng's filed date is Jul. 23, 2012 which is too late than current inventions. Also, this is for the Power Box inside wall has USB charger. Not same as current invention.

7. 8, 9, US prior art: U.S. Pat. Nos. 7,742,293, 8,116,007, 8,432,667 Strauser teach the music player has pedestal support or foot to put ground the exemplary audio device (system) 10 has a system console 24 supported by a pedestal 20. The system console 24 typically has controls (e.g. volume, play, stop, etc.), displays and indicators. In this exemplary system 10, music or karaoke content comes from a digital music player 80 that is inserted into a cradle 81 (see FIG. 8) and connected to audio inputs 99 of the exemplary system 10.

Even Strauser had teach the USB plug to power the music-player as below content;

In a preferred embodiment, the cradle 81 is stepped as disclosed in the parent application, "DIGITAL MUSIC PLAYER CRADLE ATTACHMENT," Which is included by reference. Thereby, the cradle 81 supports a large variety of music players 80 of varying sizes and shapes. In such, the music player 80 sits in a cradle 81. Power is provided from a power port (e.g. USB port) 21, into Which the power cable plugs 82 (e.g., USB plug) is connected to provide power to the music player 80. But it is different with current invention for (1) not desktop items because pedestal 20 for ground installation (2) not people hand reachable distance to charge the other electric device furthermore need to walk to far distance which more trouble than bend body to get power from power strips or outlets (3) No any light source to offer indicator light or any illumination (4) the music player (80) it does not supply the power to other device which is different with current invention is music device has built-in circuit and transfer input current to DC 5 Volt to charge the other electric device. So, this is not same as current invention for desktop definition and people will stay for a while to charge the other device.

10. U.S. Pat. No. 8,899,797 which for has USB port install on the movable (Movable parts & accessories or Organizer, Or Addable parts & Accessories).

(may add the USB-unit or USB-Module or Outlet-unit or Outlet-Module on the MOVEABLE or ADDED parts of Desk lamp).

The '797 who is filed on Aug. 26, 2012 after Co-inventor's U.S. Pat. No. 8,783,936 (# GGG-2011) Public on Dec. 15, 2011. and '797 patent has one prior filed and abandonment as below because it adaptor the phone's custom-pin plug to connect with phone female custom-pin end to build the electric and audio signal delivery, so this is not like the current invention has all USB-port which is female USB receiving ends on the desktop item and though the male-plug kits to of USB wire which has male-plug ends on 2 ends and one end connect with Desktop female USB port and other male plug end inert into the be-Charged device.

11. US Prior art 2006-020-9530 as below:
1. '9530☐ has bulb-socket so it is not the Built-in LED lamp. This maximum can add LED bulb Lamp device.
  Fact☐ Column (0005) Line 10
  A terminal housing is disposed relative to the neck second portion, a bulb socket including a seat portion is attached to the terminal housing, and a shell portion of the terminal housing is shaped to receive the base of a light bulb.
2. '9530☐ The Transformer and Bulb-socket in parallel connection. So, the light source is getting 120 Volt current which is not built-in LED lamp device
  Fact☐ Column (0006)
The lamp support may also house a transformer electrically coupled to the power cord in parallel to the bulb socket.
3. '9530☐ The $2^{nd}$ socket on the edge of the support or base is Custom Pin-Out, not regular USB-Port so only can charge 1 model of phone as Contact (44) both all for Customer Pin-Out design. This is limited for one and ONLY ONE item can be charged!!
  FACT [0007] Alternatively, the lamp may include a second socket disposed on the support, the socket having a first end directed internally of the support and coupled to the speaker and a second end positioned externally on the support for connecting to a media device compatible cable.
4. '9530☐ No any wire from charging contact (44) or outside socket (50) needed while charging the phone. Because the contact (44) or Outside socket (50) both is custom pin-out construction and the phone just directly plug into this Custom Pin-Out can directly charger . . . . This is only limited one and ONLY ONE phone can be charged.
  Not like Ivan's use common USB-Female-receiving end and Charging wire's USB insert male-plug to deliver the current and the though charging wire's other ends to connect with the electric or digital device.
  The audio output cable (17) though Round Plug (17a) to transmit the data to speaker (15) (15a), Audio Output cable (17) one end to Music media device (100) and another end to Speaker (15a) (15b)
  FACT [0019] As illustrated in FIGS. 1 and 2, an audio output cable 17 is electrically connected via a plug 1711 at one end to each of speakers 15a and 15b. As illustrated in FIGS. 2 and 4, the other end of audio cable 17 may be fed through an orifice 19 in support 12 and be operable to connect, for example, to the headset jack or other audio output terminal of media player 100 as indicated. Alternatively, as illustrated in FIGS. 1 and 3, the orifice 19 may house a connector (not shown) for plug connecting to a plug 17b of output cable 17
5. '9530 ☐ do not has built-in LED light source, only can install the LED bulb at the bulb-base. Not like the co-inventor's (3) issued patents or co-pending case has LED built-in as light source, No Bulb-Base at all.
  FACT☐ (0021) line 10 The light source 24 (e.g. incandescent bulb, halogen lamp, Fluorescent bulb, or one or more LEDs) is mounted in the bulb socket 20 and positioned in a plurality of positions relative to the support 12 by arrangement of the Flexible neck 14.

6. '9530☐ The contact (44) is Custom Pin-Out type which only can charge one and ONLY one model of the phone. Also, the Recess Slot which also become Big limited to fit one and ONLY one phone.

FATC☐ (0025) As illustrated in FIG. 2, the recess 42 is provided on the top surface of the support 12 for receiving the media player 100. A plurality of contacts 44 are formed at the base or on a Wall of the recess 42.

7. '9530☐ Only can charge one and ONLY ONE phone because (A) Recess (42) size is fixed (B) The contact (44) need align precisely to the phone contact so can charge one and Only One. Not like Ivan the charging port is common USB-Port!!

FACT☐ (0026) Recess 42 is shaped to snugly receive a lower portion of media device 100 to align or Mattingly couple electrical contacts 46 on the media device 100 with contacts 44 of support 12, and thereby act as a socket for media device 100. Contact between contacts 44 of support 12 and contacts on media device 100 (not shown) for example may permit a rechargeable battery housed Wholly Within media device 100 to charge. Contacts 44 and media device 100 contacts are adapted to Mattingly couple with each other so that DC voltage can be supplied to the rechargeable battery of media device 100 for charging through the coupled contacts 44 and media device 100 contacts. In addition, if the media player 100 includes audio output contacts in proximity to the charging contacts, ones of coupled contacts 44 may be connected to speakers 15a and 15b via an internal cable (not shown) as an alternative to audio output cable 17.

8. '9530☐ The LEE unit only can charge one and ONLY One phone and the charge contact all is Custom Pin-Out type. The current invention's items have USB-Port which can work with any USB-Port charging wires to connect with the Other electric device and digital device.

FACT [0027] In accordance with an alternative arrangement of the present invention and with reference to FIG. 4, a charging circuit is excluded from lighting apparatus 10, and contacts 44 are electrically connected to a socket 50 disposed on an exterior surface of support 12. Connection between contacts 44 and socket 50 are provided through internally disposed cable 51.

9. '9530☐ LEE use custom Pin-Out construction on the contact (44) and Outer socket (50) which same as LEE Example iPod© wires for custom pin-out so can fit and charge one and only One phone . . . . Not like the other end on the computer as USB-port which Ivan patent claimed.

FACT☐ (0027) Line 2 Socket 50 is adapted to inter face with the charging and/or data cable associated with media player 100. For example, an iPod media player sold by Apple Inc. typically employs a cable to connect the iPod to a computer via the computer's USB port. This cable has a custom pinout on one end which connects to the iPod device and a USB connection on the other end Which mates With the USB port on a computer.

10. '9530☐ LEE device can transmit BOTH DATA and CHARGING. This is not happening at Ivan item because Ivan item only has the CHARGING FUNC-TION. This is not same on basic CHARGING of CHARGER DEVICE!! So, this is totally different with Ivan's CHARGER patent.

Fact (0027) Line 14 to 19 The cable allows both transmission of data between the computer and the iPod and charging of the iPod's internal battery through the USB port on the computer.

11. '9530☐ LEE device cable is associated audio media device & get power from the inner charging-circuit and get power from CUSTOM PIN-OUT contact (44) or Outer socket (50)☐ This is totally different with Ivan's can charge and ONLY CHARGE many different electric or digital device. Not one and ONLY one as LEE claimed and details description for AUDIO MEDIA DEVICE (100).

FACT (0027) Line 2 Socket 50 is adapted to inter face with the charging and/or data cable associated with media player 100.

Also, US (2006-020-9530) for contact (44) and Outer socket (50) has below text;

The said USB receiving end (USB port) is one end of USB-Charging cable which same as all laptop computer USB receiving end, not USB custom pin-out, not USB mini, Not USB compact, Not USB other name which is the other end of the said USB-Charging cable which only fit for limited number of the electric or digital device.

12. US abandonment public prior art US 2009-006-7161

The Foldable mirror set is not Desktop installation. That is travel unit not let people to install on desktop surface always.

The Power from the Computer and which is not quickly charger and has very limited current less than 500 ma not like current invention has minimum 1.0 Amp up to 5 Amp for definition of the USB Charging-Ports release on 2007 and update on 2010.

Also, the computer USB is not charger into the Foldable mirror into foldable mirrors' internal rechargeable battery. The Computer is SUPPLY the current to the foldable mirror while the USB Male plug into the computer ports and has power. Not charging into rechargeable battery and storage inside the rechargeable ready to use.

The foldable mirror had no any internal transformer to change incoming AC current to DC current.

The foldable mirror had no outside transformer get power from outlet AC power source.

So, this prior art is nothing to do with current invention.

SO, From Above (12) 3$^{rd}$ lot US prior arts points different with LEE (2006-020-9530), The current invention any issued or co-pending filing no any same or similar with LEE's '9530. Furthermore, the '9530 on 2006 is no charging capability over 1.0 Amp as wiki report shown all the history and data so the charring capability and Not allowed the Digital or electric data to delivery on old date 2006, so that is not like current invention for quickly charge USB Charging-Port as above discussion and wiki data!

13. US Prior Art US 2010/0296298 Martin, JR. U.S. Ser. No. 12/761,514 Filed on Apr. 16, 2010

The '298 teach one Rea-Beveled Mirror (12a) of Rear-Beveled cut edge (12) of FIG. 4 and FIG. 5 or the Rear-Beveled Mirror (14a) of mirror (14) of FIG. 7 shown the special made mirror which is out-of-date mirror design.

Further, from FIG. 7 and FIG. 8 shown the light-strip (14) and LED light source (14-2) which is light strips (14) to fit within the beveled-edge (12a) which is out-of-date because update LED arrangement is dice or chip for Surface mounted on rigid-piece printed-circuit-board and which is just inward to emit light to the curved magnify-mirror to let the curved-mirror-surface work as reflector to emit all light to front which is diffusion light effect emit out to form plurality of the parallel light-beam so not dark and bright area on be-lighted object. The current invention cosmetic mirror is one of magnify have N-time magnify for vanity mirror or cosmetic mirror. Not the focus light effects like '298 get focus as FIG. 6 for all '298 concepts and construction and details.

Furthermore, the said current invention for the other side may is N-time magnify which the N-number is 1 (×1 times), the Surround light on the periphery is from the vertical position flexible printed-circuit-board (which is not available on 2010 because the chip-on-board or dice-on-board not available at market because too expensive and too difficult to make reasonable cost for application yet).

From the '298 for beveled edge mirror (12) (14) with the beveled-edge (12a) (14a) to arrange LED light-beam to form focus on front which will cause the center is Big brighter lighted spots and hurt people eyes for '298 design. The current invention apply for cosmetic is for diffusion light-beams to front for plurality of parallel light-beam to make front panel or area for even brightness without the super-bright focus light-beam.

So, the '298 is not same and not right for the optics-design and concept so not same as current invention spirit and construction and optics-theory (diffusion vs. focus).

Furthermore, the current invention mirror device have other construction for (1) magnify the image from 2 to N-time (N is any number) so it will be curved lens (2) The LED(s) is vertically or horizon offer illumination to the said object or mirror surface directly without the troublesome beveled-edge mirror-area(s) which will reflected (18 side walls of the light chamber 46 may include a reflective material to reflect light from the LED light strips 14 through the rea-side bevel 12a) or refracted light beams to make bad light-performance. Also, the (3) '298 need install the J-chamber (20) which is not practical for current invention for installation the mirror with beveled-aged (12a). and (4) the current invention preferred $2^{nd}$ side of LED lighted-mirror with normal non-magnify mirror also illumination so this is not existing for the said '298 for single side mirrors for '298 device.==>So this is nothing to do with '298 patent for concept, application, feature, installation, optics-theory, mirror type, optic-focus vs. diffusion, light-beam emit out directly without go through the beveled-ages, two mirrors with rotating features.

14. US 2012-0294015 (SMED) as earlier discussion for all difference.
15. US 2008-0091250 (Powell) therapy LED desk lamp
    '250 Powell teach a portable DC power source [0012 line 5 to 8] for easily carry to patient room or do therapy.
    '250 power teach a controller (126) which is (0017)
    (Line 2 to 3) line [selecting the operating mode of the desk lamp 140], or
    (line 4 to line 5] [electronic communication with the LED array 108], or
    [line 6 to line] include a display and user to select a broad-spectrum light for general uses such as reading,
    ➔ These are common LED light device from market place and not a patentable on 2007 when the iPhone came out year!
    Powell same as current invention to have this basic LED desk lamp to add power its features to add a. "Therapy treatment light wave light-beam including infra-red, blue, red light beam➔ (The current invention for reading or working is not use this light color)
  +
b. Portable device➔ (not same as current invention is non-portable device and big-size or weight bas permanently install on desktop before replacing it).
c. [Column 1 (0014) Line 5] The '250 for brightness is very bright for 1,000 to 2,000 lux➔ (This high brightness same as jail-torch light is not use for people reading or working indoor and this brightness will hurt people eyes while long time reading for student, '250 also did not have any anti-glare optic-piece to protect eye, or
d. [Column 1 (0016) line 6} for 15-30 inch around 1 to 2.5 feet has 450 lux (This is too bright for people reading ➔ (this is not same as current invention for reading or working or accent light which not allow so bright to heart people eyes especially without the anti-glare protection at all.
e. [Column 2 line 10] include a controller 226 which can include a display and user inputs
  ➔ Which means this is not like current invention for simple switch or sensor for lower cost desk lamp.
f. [Column 1 (0011) line 5 to 8] for battery power easily carry to patient room or do therapy.
  [Column 2 (0018) line 10] The desk lamp 240 may be powered by an internal or external portable power source such as battery. The battery power source may provide the desk lamp 240 with power such that AC power is not required."
  For both embodiment all had the same portable power source is batteries.
  ➔ This is different with current invention for LED and added functions need more power and batteries do not supply this kind of other added function for power consumptions.
g. [Column 2 (0018) line 15] The batteries may be stored within or proximate to the base 242 or within the LED module 246. The LED module 246 may include one or more LEDs 208, like LED array 108 as described previously.==>Different with current invention the plurality is not powered by batteries at all.
So➔ The said '250 is not same as LED light of the current invention describe for (a) DC battery power source vs. AC plug-wire (b) portable LED light vs. permanent install on desk top (c) LED light beam for infra-red or blue vs. white light beam only (d) controller is variety functions and memory vs. simple switch or sensor (e) therapy treatment LED desktop light vs. reading or working only without therapy function. (f) movable LED light-module with built-in batteries power source and control vs. non-movable LED light source.
Basing on US Patent office have much more the LED desktop light including above discussed LED desktop light of SEMD or others still can get US patents basing on (1) basic LED desktop light with ADDED features so can grant US patents as many of prior arts.
[line 7 to line] allow the user to activate desired therapeutic wave-length so light such as red, yellow, blue, green or infra-red wavelengths or a combinations thereof to treat various conditions.
which had a very complicated data-storage
16. Re: US Prior art US 2011=0228449 (KEEBLER et al) Filed on Mar. 18, 2010 Public Sep. 22, 2011

=➔ [0026] Regarding FIG. 3, a plurality of direct current powered devices 305,310,315 which may be powered by a universal power supply system 100 in accordance with an example embodiment are depicted. In one example a common network router 305 is depicted which receives DC power from the second Plug 300A. in second examples, a multiple media player (i-pod) 310 is depicted which receives DC power from the second plug 300B. In the third examples, a cellular telephone 315 receives DC power from the second plug 300B. In each of these examples, the second plug 300A, 300B, 300C are different in physical dimensions (i.e., device specific) and may operate at different direct current voltages as is shown in FIG. 1➔ so '449 teach all be charge item➔ Device i-pod or others is not USB female receiving port(s) and the device have different direct current voltage as in shown in FIG. 1.

Also, '449 The said universal power supply system 100, That is lack of
(1) No any USB ports with only 1 output current around 5V+/−20% and min. 1 Amp current up or more Amp.
(2) No any LED light to offer the area illumination for reading or work or accent light Amp current up or more Amp.
(3) Most important offer many different voltage DC currents not like current invention only export the 5 Volt+/−20% to charge be-charged products.

17. US 2010-0046249 (Mai) for Diffusion film
'249 Mai teach a film with diffusion and need use plurality of substrates made of different material to get the (light incidence surface) and (light emission surface) for different surface of plurality of layer. ➔ This is too complicated than market available for much better optics-lens to make the narrow LED light beam as back light and make the said light diffusion to even brightness.

From Co-inventor co-pending case (#K) U.S. Ser. No. 11/498,874 which also had the optics-piece (5') (5") for incidence and (5") emission surface and back LED light to get even brightness filed on Aug. 4, 2006 which is CIP of 10-954,189 filed on Oct. 1, 2004. Also, the both (5') and (5") is made by injection resin, Not even need to make plurality of layers of the film.

From current invention (#K) U.S. Ser. No. 11/498,874 has other many US prior art which is easier than the filed date Aug. 4, 2006 including U.S. Pat. No. 2,779,630 Clausen, U.S. Pat. No. 5,964,516 Lai, U.S. Pat. No. 6,669,468 Pesu, U.S. Pat. No. 6,709,126 Leen, U.S. Pat. No. 6,846,0098 Bourdelais, U.S. Pat. No. 7,538,832 Hong, US 2006-0062019 Young, US 2007-0076437 all related for the Optics-piece for make light-beam arrangement.

➔ So, Mai teach totally nothing to do with the current invention because current invention will not use this kind of plurality of layer of optic-film etc.

➔ Basing on the above listed 3 group discussion for all (17) US and China prior arts it is no any proper prior art for current invention. Hereafter for more discussion for current invention features.

Hereof, To clear make definition for the above discussed many type of the Chargers and each type has its own USB or Outlet specification such as USB-1.0, USB-2.0, or new standard for USB-3.0 or Outlet for 1,850 Watt, 1,650 Watt as convention market available type which all fall within the current invention scope and claims but these specification is well known and not related to the current invention's parts-name definition as below:

1. (#U-1)=USB-unit Charger: The Unit means it is an individual charger has only charger purpose to have one input-current and passing though inner own circuit to make input current change to one output current to charger other device from its own USB charging-port(s). This unit can be housed or without any hosing and install within the said desk-top housing and all live-wired or electric-carried parts & accessories not touchable by people except the USB-port(s). Here said CHARGING purpose is to has higher electric voltage from circuit and overcome the be-charged energy storage unit such as the rechargeable batteries so the energy storage unit can be charged and supply the power to the be-charged device's circuit to use. NOT directly from USB Charging port to SUPPLY the other device DIRECCTLY to the Circuit (lack of Energy storage unit) so can supply power for other device has electricity to make operation. The current USB Charging-port is to Charge only the Energy Storage means, not directly to SUPPLY POWER to other device (lack of energy storage unit).

Also, the current invention's USB-Charging port only take 1 and only 1 of the input power or current and passing through inner circuit to come out the DC current on desired voltage and amperage. It does not have more than one different input current such as AC or DC current as input current or it will be destroying the output current because inner circuit is fixed for one and only one current specification.

Some applications the USB-Unit is just a USB receiving port which connect with the outside housing's transformer, adaptor, inventor, converter which has its built-in circuit to change from AC power source to DC current and from outside housing into the USB conductive receiving-end allow the inserting USB male-prong to insert to deliver the DC current.=>This kind of USB receiving port also is a USB-Unit.

2. (#U-2)=Outlet-unit charger: The unit it is an individual POWER SUPPLIER device and only supply power not CHARGE device which has outlet-receptacle(s) which can receive the other device's prongs to deliver or supply the AC current from the OUTSIDE Housing's outlet-unit power source though the outlet-unit's port(s) conductive piece assembly to another device's prong to get into other device's circuit to power other device.

This unit can be housed or without any hosing and install within the said desk-top housing and all live-wired or electric-carried parts & accessories not touchable by people except the Outlet no electric carried outside parts (s).

3. (#U-3)=USB-Module Charger: This module is not a single USB-Unit Charger. It will be any combination for any number of the (aaa) USB-Unit(s) or/and (bbb) Outlet-unit(s) has its own number of the USB-port(s) or/and Outlet-port(s) to connect with other electric wires or USB charge cable and by the said wire or cable plugs to plug into electric or digital data device's female receiving-port which may has all kind of custom-pin construction in Type A, Type B, Type C so can charge by USB charging port(s) for supplying the DC or/and by the Outlet-unit(s) for supplying the AC current to other devices(s).

This unit can be housed or without any hosing and install within the said desk-top housing and all live-wired or electric-carried parts & accessories not touchable by people except the non-carry electric parts of the said USB-port(s) and/or Outlet-unit(s).

4. (#U-4)=Sealed-unit: This is a unit which has desired combination for any number of USB-unit(s) or/and outlet-unit(s) arrangement or combination and sealed or LED light housing into one piece of the housing, compartment, space, container and the related circuit(s) and construction have to pass each country required related safety standard(s) and get test labs' certification for this sealed unit or construction for the desktop item. The sealed unit only also can pass the related safety standard and get safety certification by itself of USB or/and Outlet sealed unit which not including the other housing parts or accessories non-related to the USB or Outlet.

This sealed unit any live-wire or electric-carried parts & accessories must seal or housing or enclosure within the housing, desktop items, container, space so can pass the US Safety standard requirement(s).

5. (#U-5)=Universal Charger: This is charger which has finished housing and electric-contactor such as prong means, or wired, or quickly-connector(s) which not only can incorporate with the said desk-top items, but it also can use for other applications. One of preferred embodiment is market available USB-2.1 Amp Charger has 3 USB-ports with fixed or foldable traveling prongs. This can install within the current invention desk-items housing by wired or outlets or conductive piece assembly and it also can take apart from the desk-top item's housing and carry with people to plug-into Wall outlets anywhere to charger the computer, communication, consumer electric items or any electric or digital data devices while prong means plug-into outlet on wall or power strip's outlets. This is definition for universal charger for current desktop items.

6. (#U-6)=USB female receiving means on the desktop items=It equivalent to (USB-Charging-ports released on 2007 and upgrade on 2009) to receiving the USB male plugs from USB-wire, USB-cable which has 2 male plugs on 2 wire/cable ends. One is for Type A and one end may for Min-USB or Micro-USB or other custom-pin construction which are same as be-charged device's USB-Female receiving port so can though the USB wire or USB cable or Jump cable or Bridge cable to build the electric current delivery from the desktop USB Charging-ports to charge the other device's inner energy storage items which is rechargeable battery, recharge battery assembly or any type of energy storage device which offer the electricity to desktop item electricity.

The current invention USB Charging-port has big charging capacity min. over 1.0 Amp up 5 Amp or more which as above discussed USB Charging-port standard release on 2007 and upgrade on 2009. Most important is current invention USB Charging-port only for charging function and DO NOT has any electric data delivery. Or/This will slow down the charging speed or make overheat or whatever bad for the said current invention.

7. (#U-7)=Outlet female receiving piece=It equivalent to (Outlet port) to receiving the other electric or digital data device's prong means so can deliver the AC current from outlet-port(s) through the conductive piece or assembly to the other electric or digital data device inserting prongs directly without passing through any electric controller or circuit whenever the prongs insert into the said Outlet female receiving piece.

8. (#U-8)=Desk Top items has more than one functions: Which are a products has LED or other light source which the said LED or other light source including the LED as an indicator light to show charging or charging status, not only limited for LED(s) is a LED light source for supply LED light beam for illumination. The desktop has more than one electric function which means Not only for illumination but also has $2^{nd}$ functions which can make people eye, ear, nose, mouth, skin to see, hear, smell, eat, drink, feel or is a video or an audio or an image or a sound related things. The said $2^{nd}$ function is existing products which available at market for people to buy and put on desktop or any surface where people will stay, work, sleep as above discussed.

9. (#U-9)=Base of light device: The base including the adjacent pole, bar, stand, step, curved surface, edge, contour or all the surfaces for the base of the light device except the light source and the shade. The said USB-port, USB-unit, USB-module, or Outlet-port, Outlet-unit, Outlet-module, or Sealed-unit, or Universal-unit, or rotatable module can fit within or install or attached or overlay or underlay on anywhere of the said base of the Light device.

The current invention also including the Base of Light device has built-in USB-Charging ports and this base or base has built-in light source can sell individually at the market place.

These above (9) details description can clearer for some parts & accessories which use for current invention.

BRIEF DESCRIPTION OF THE DRAWINGS

FIG. 7 also shows the fourth preferred embodiment, which The big base of the Desk top item has sufficient space within so can install all kind of USB-unit(s), Outlet-unit(s), USB-module(s), Outlet-module(s), Sealed-unit has number of the said USB-unit(s) outlet(s) and/or Outlet-unit(s), Universal unit has number of the said USB-units outlet(s) and/or Outlet-unit(s) has relatively universal compartment, or space, or room to fit within, The said such big base of the desk top item can also be powered by wind power, chemical power, battery power, a generator, transformer, adaptor, inverter, inductor, etc.

FIG. 8 shows the first preferred embodiment incorporate with different light source application (Light source is not shown), which has a thicker or higher base to provide a bigger space to arrange bigger size electric parts and accessories to save the cost of super compact, slim, or cute electric parts and accessories, and which also can load rotating USB-unit(s) or a rotating USB-Module so that a first surface of the USB-module will look nice when the USB-unit(s) or USB-Module is not in use. Details of the rotating USB module are shown in FIGS. 18, 19, 20, 21, and 22

FIGS. 9, 10, 11, and 12 show fifth and sixth preferred embodiments in which desk top items with LED means also have a thicker or higher base, and which can add rotating USB-modules with a plurality of USB-unit(s) or/and Outlet-unit(s) or/and a plurality of other receiving means (hereafter as other-ports) to increase the number of function(s), feature(s), effect(s), and/or performance(s), the USB-module having more than 1 surface and the capability of changing the surface for different purposes.

From the FIG. 9 shown the any kind of light source desk lamp which has 2 rotatable Module and each of rotatable module has built-in desire number of the USB-Units or/and Outlet-unit or/and USB-Module or/and Outlet-module or/and sealed-unit or/and universal-unit to get desired functions. It also has switch means to turn-on or turn-off the said Light source for desk lamp. The base has LED indicator light on the rotatable module's surface to show the charging status.

Figure 10:
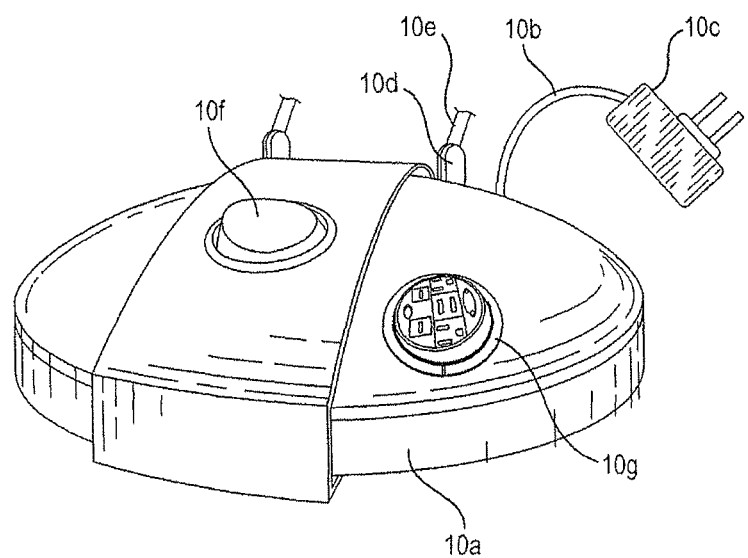

From the FIG. 10 shown the thicker and curved base for Desk lamp has desire light source for illumination. The desk lamp has wired plug to connect with wall-outlet and has AC current input into inner circuit to transfer the wall-outlet's 120V 60 Hz current into USB-unit(s) needed the DC current and supply the wall-outlet's 120V 60 hertz current to the Outlet-unit(s). The said bulb, incandescent light, florescent light or CFL light source is turn-on or turn-off by the switch or sensor or remote control, or wireless, or blue-tooth, or Wi-Fi controller with update APP software can download from internet or another network so receiver is installed means on the base surface.

Figure 11:
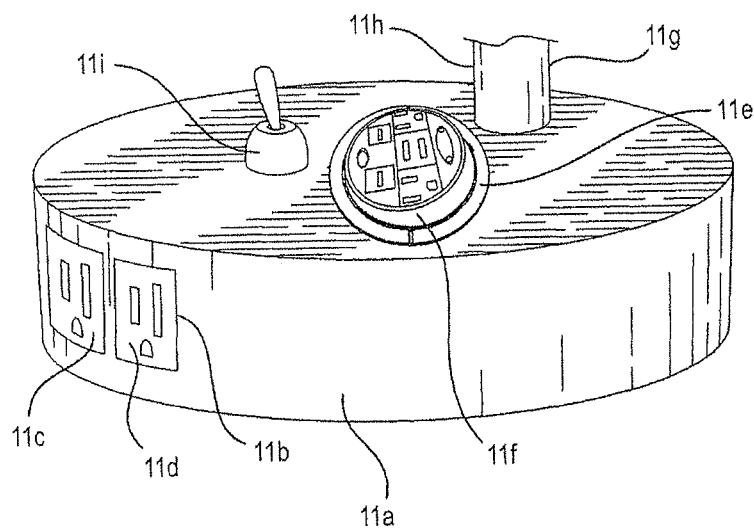

From the FIG. 11, shown the base of the said Desk top lighting which may has any type of the light source which has the Rotatable module which has desire number of USB-Unit(s) or/and outlet-unit(s) and optional LED means for charging status indicator lighting. The said base not only has rotatable module and but also has additional outlet-unit or outlet-module(s) to allow to charge or supply AC power to the other electric or digital device which need AC current input to make operation.

Figure 12:
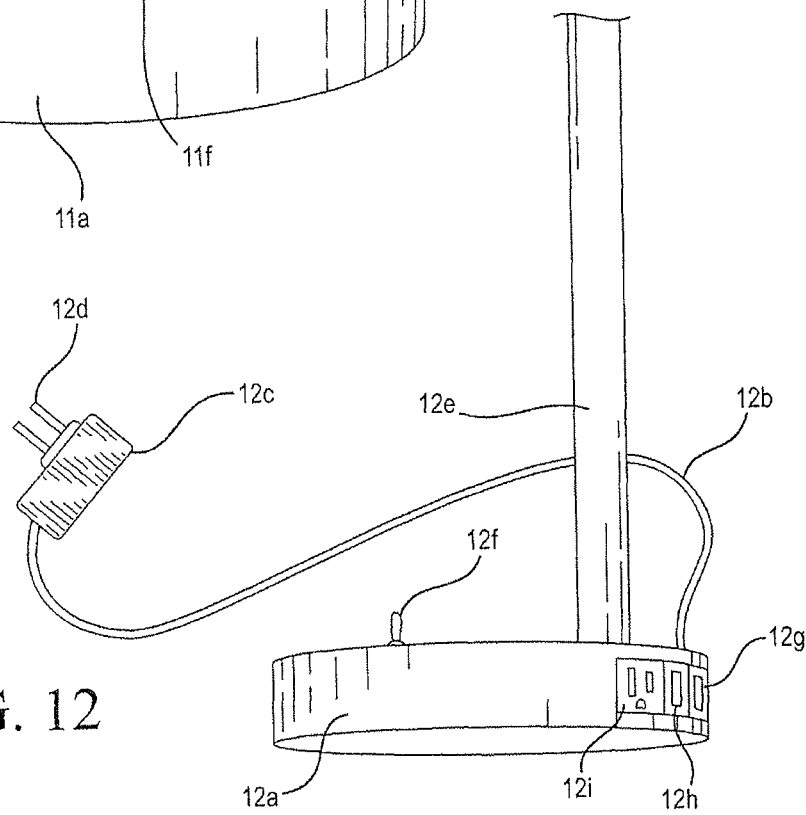

From the FIG. 12 also shown the preferred embodiment which the said Desk Top item for preferred light source may select from bulb, CFL, incandescent as light source which has big base and the rear-side has plurality of the outlet-unit(s) from Number 1 to any number, so it can connect with other electric or digital data devices to supply or charge the other devices. The transformer, adaptor, inverter not only supply the DC current to the USB-units but also supply AC current to the said plurality of the AC Outlet-unit(s) furthermore the plurality of the outlet-unit(s) or Outlet-Module(s) also can add the safety protection function such as surge protection like extension cord had. The same application can apply for all base of the lighting device so can have nice wires arrangement for plurality of outlet-unit(s) or Outlet-module (s) on the said base of all kind of lighting device.

Figure 13:
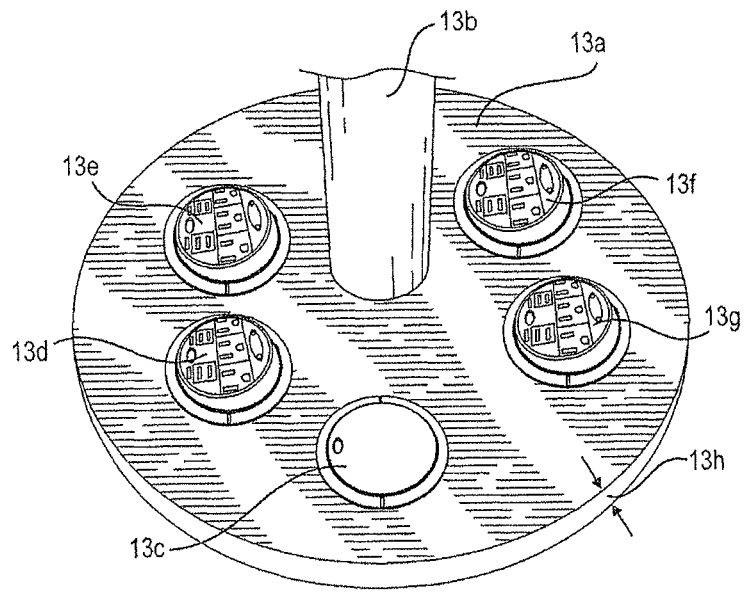

FIG. 13 shows a desk top item which has a super big base size so that a plurality of rotating USB-modules can be installed to enable a group of people to charge their electric or digital device(s) at the same time by the USB-unit(s) or USB-Module(s) or SUPPLY AC current by Outlet-Unit(s) or Outlet-Module(s), such as for use in a train station, bus station, airport, meeting room, hotel lobby . . . etc.

Figure 14:
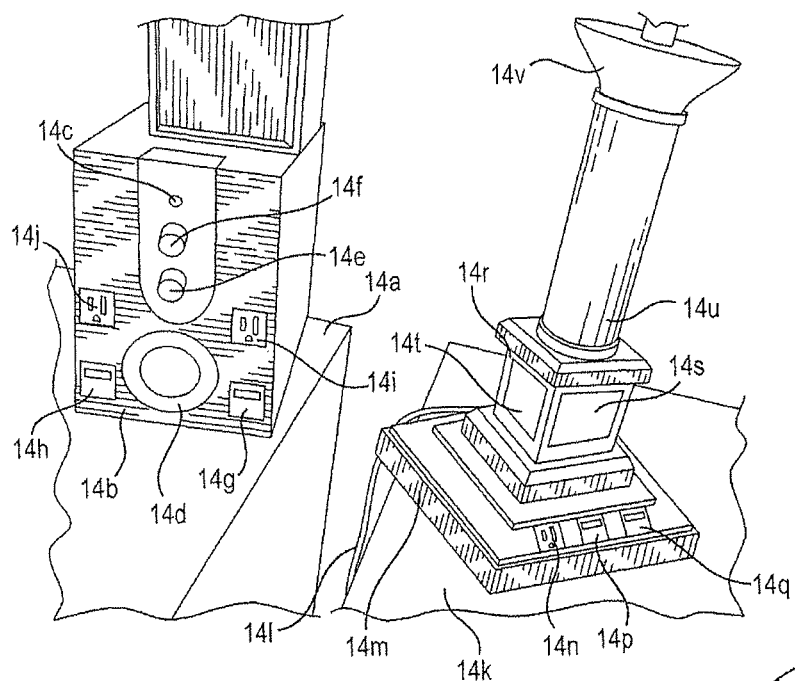

FIG. 14 shows desk top items with LED means having USB-unit(s), USB-module, or outlet-unit(s) to allow people to charge energy-storage unit or assembly inside the other electric or digital device(s) by USB-unit(s) or USB-Module(s), or supply the AC current to prong(s) device by outlet-unit(s) or outlet-module(s), the items including for example a radio, time piece, weather station display, fruit blender, food machine, liquid machine, LED lighting, light fixture, image projector, image, electric fan, heater or any conventional items with LED means built-in to offer the area illumination, or shown digital time, or shown image, or shown the charging status. The said other functions or the said USB-unit(s) or Outlet-unit(s) can install on the anywhere of the base, pole, steps, flat areas of the said Desk top items and not limited only on the base one surface.

Figure 15:
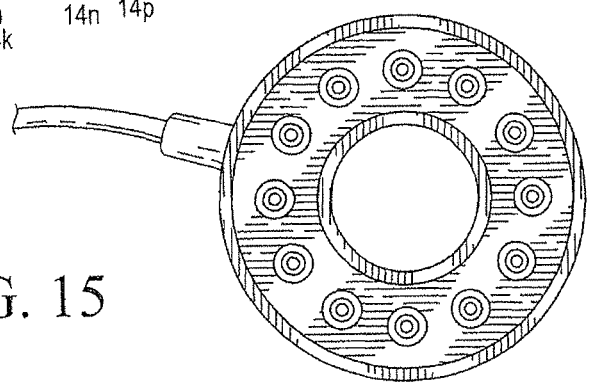
Figure 16:
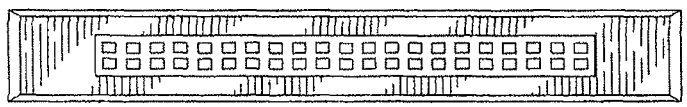
Figure 17:
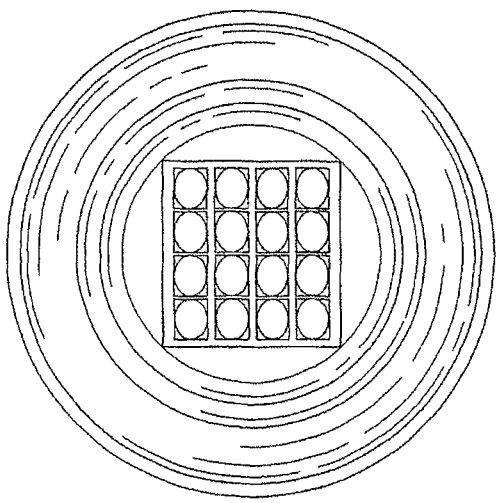
Figure 18:
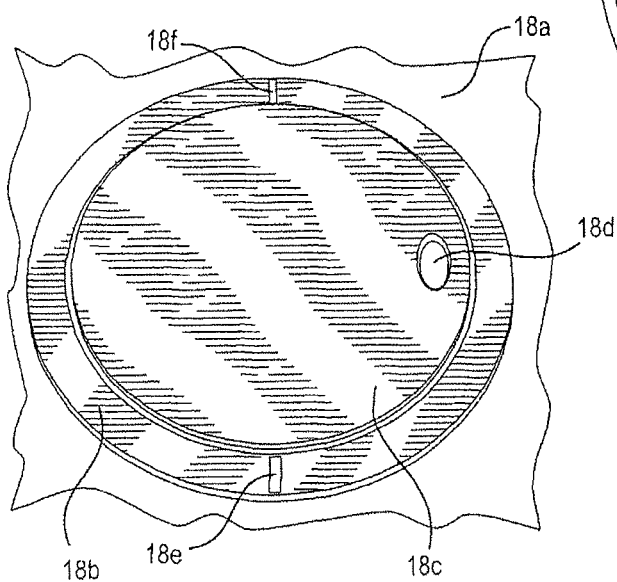
Figure 23:
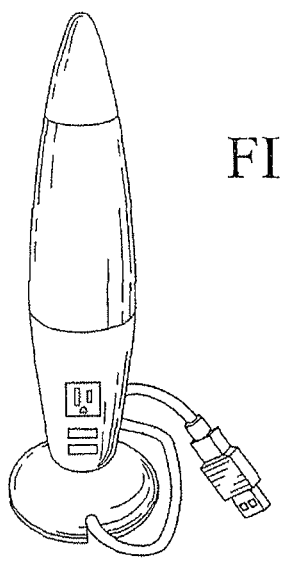
Figure 19:
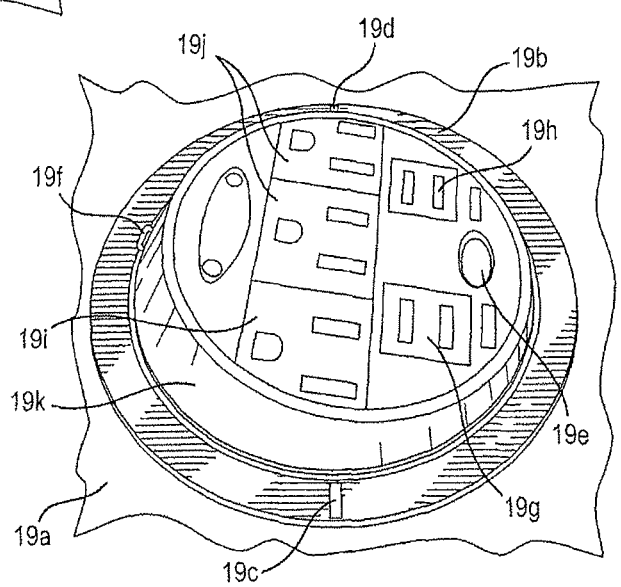
Figure 20:
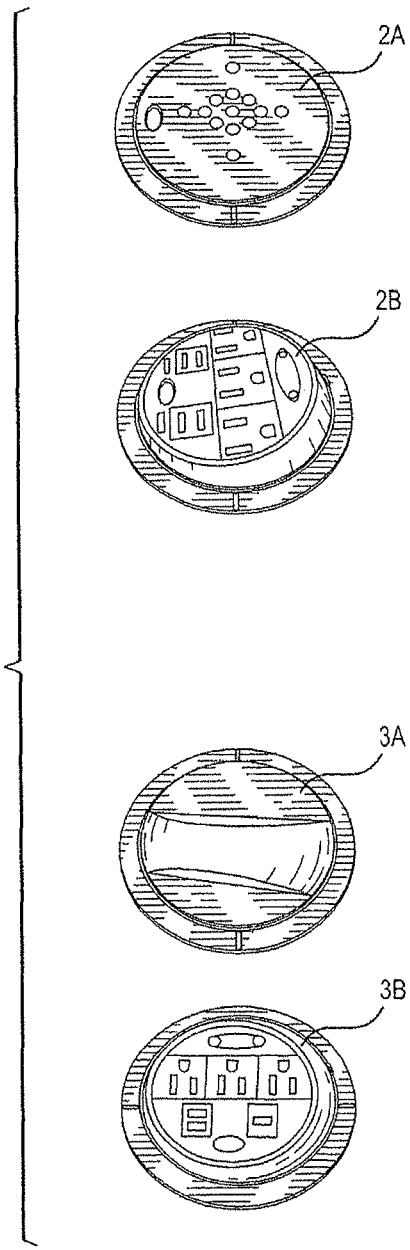
Figure 25:
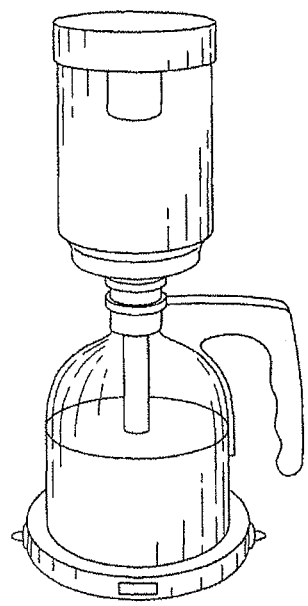
Figure 26:
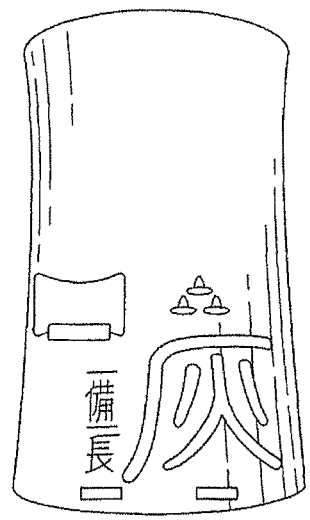
Figure 21:
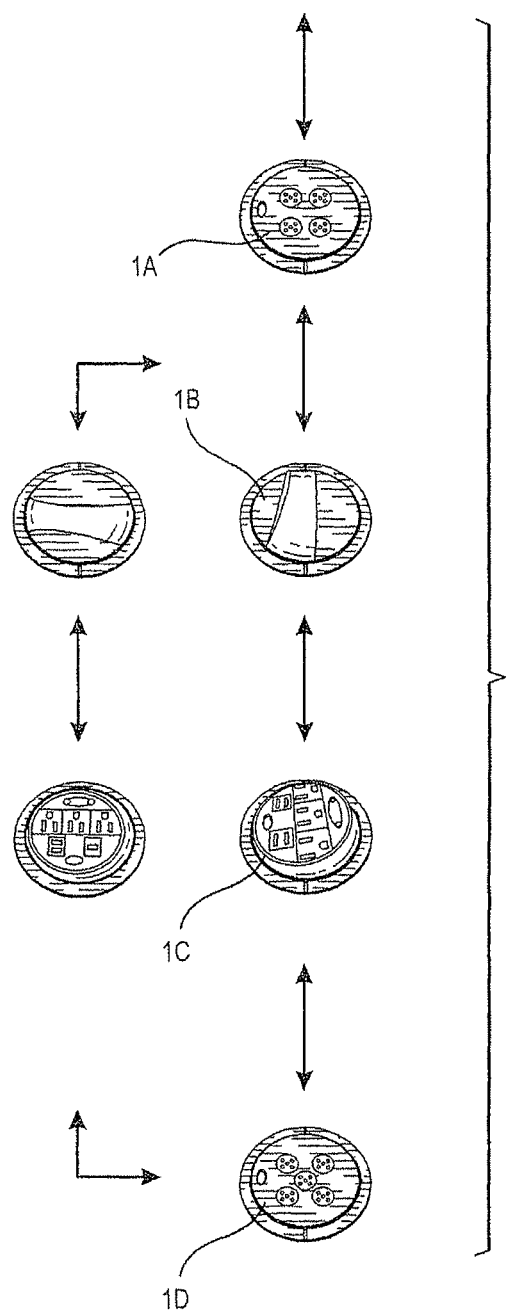
Figure 22:
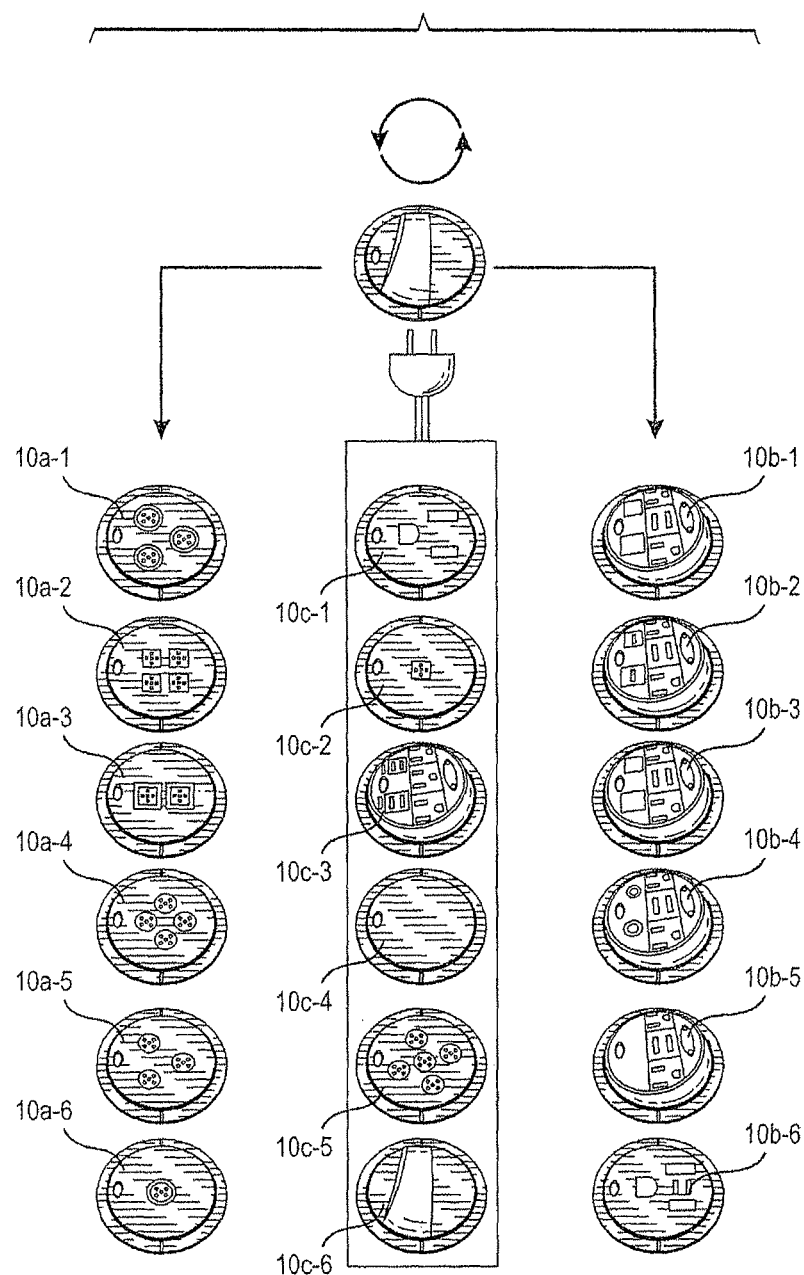

FIGS. 15, 16, and 17 show different LEDs means arrangement which used for LED lighting one of function(s) for offering the area illumination in the above-discussed preferred embodiments or other desk top items.

FIGS. 18, 19, 20, 21, and 22 show details of a USB-module with at least one USB-units and a plurality of additional receiving means (hereafter as Additional-ports) such as USB-unit(s), outlet-unit(s), Internet-unit(s), adaptor-unit(s), other light source means, or other light sources with appropriate parts and accessories.

FIGS. 23, 24, 25, 26, 27, 28, and 29 show all kinds of desk top items which offer function(s), effects(s), and/or performance(s) to people's eye, nose, mouth, and/or ears for a period while people are working, resting, sleeping, or standing.

Figure 30:
Figure 31:

FIGS. 30 and 31 show current/voltage read outs for a USB 3.0 charging port outputs of over 2.1A(>2.1A, 5V, 12 Watt).

FIGS. 32-35 show some preferred embodiments for the above discussed for parts as below listed.

Figure 32:
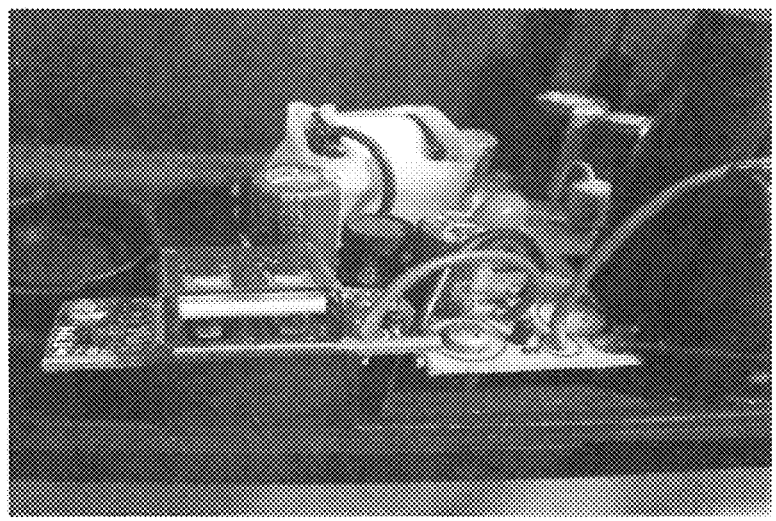
Figure 32:
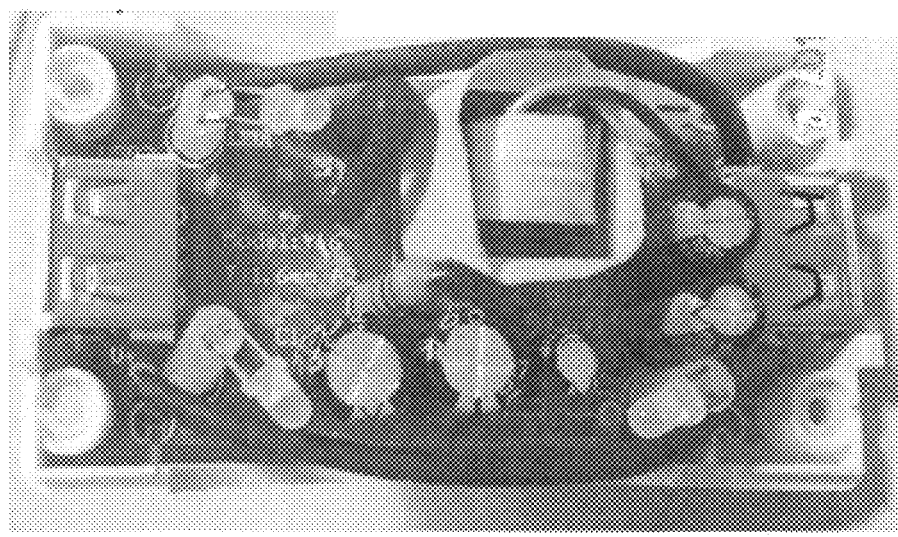

FIG. 32 (1) USB-unit: The Unit means it is an individual charger has only charger purpose to have one input-current and passing though inner own circuit to make input current change to one output current to charger other device from its own USB port(s). This unit can be housed or without any hosing and install within the said desk-top housing and all live-wired or electric-carried parts & accessories not touchable by people except the USB-port(s).

The Charger only take 1 and only 1 of the input power or current and passing through inner circuit to come out the DC current on desired voltage and amperage. It cannot have more than one different input current such as AC or DC current as input current or it will be destroying the output current because inner circuit is fixed for one and only one current specification.

FIG. 32 USB-Module: This module is not a single USB-Unit Charger. It will be any combination for any number of the USB-Unit(s) or/and Outlet-unit(s) has its own number of the USB-port(s) or/and Outlet-port(s) to connect with other electric or digital data device's mail prong(s) or Plug(s) to charging or supplying the DC or/and AC current to other devices(s). This unit can be housed or without any hosing and install within the said desk-top housing and all live-wired or electric-carried parts & accessories not touchable by people except the USB-port(s).

Figure 33:
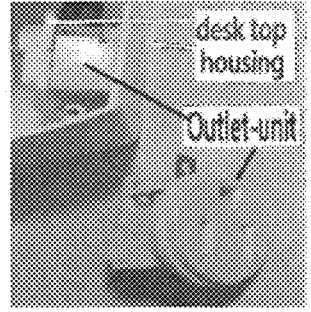
Figure 33:
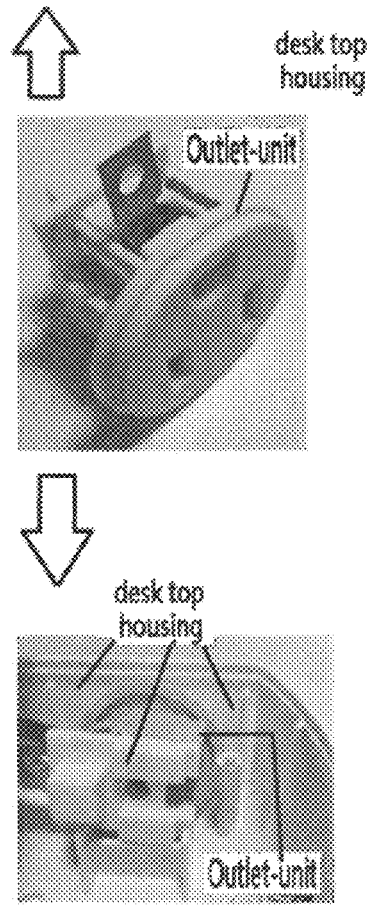
Figure 33:
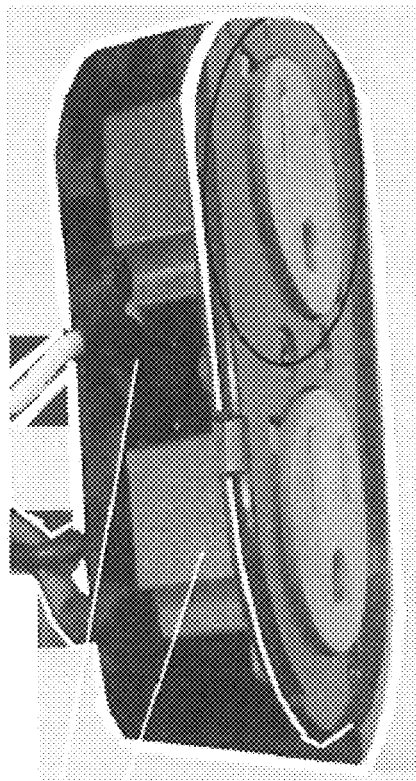

FIG. 33 (3) Outlet-unit and Outlet Module: The unit it is an individual POWER SUPPLIER device has outlet-receptacle which can receive the other device's prongs to deliver or supply the AC current from the outlet-unit's power source though the outlet-unit's port(s) to another device's prong to get into other device's circuit to power other device. This unit can be housed or without any hosing and install within the said desk-top housing and all live-wired or electric-carried parts & accessories not touchable by people except the USB-port(s).

Figure 34:
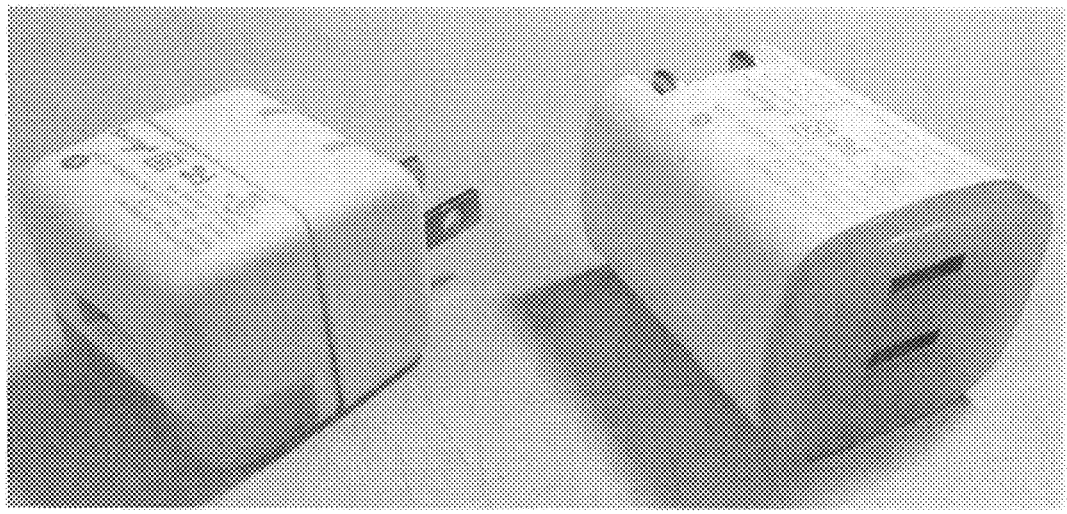
Figure 34:
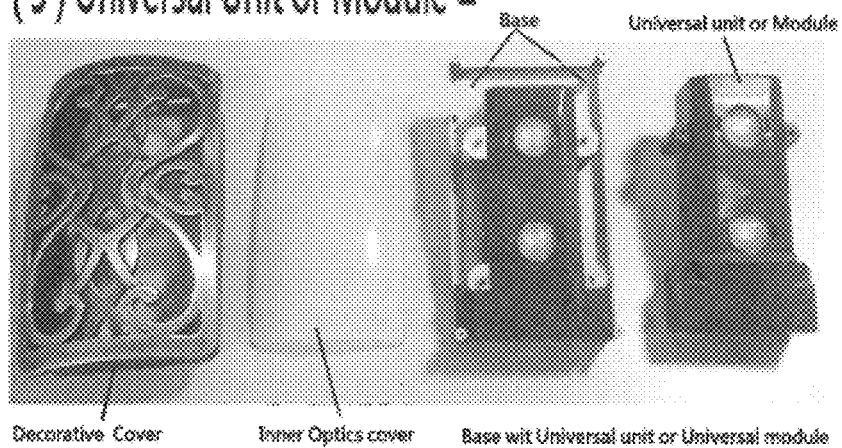
Figure 34:
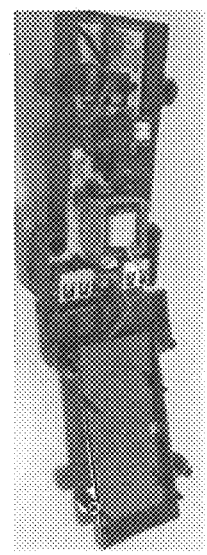
Figure 35:
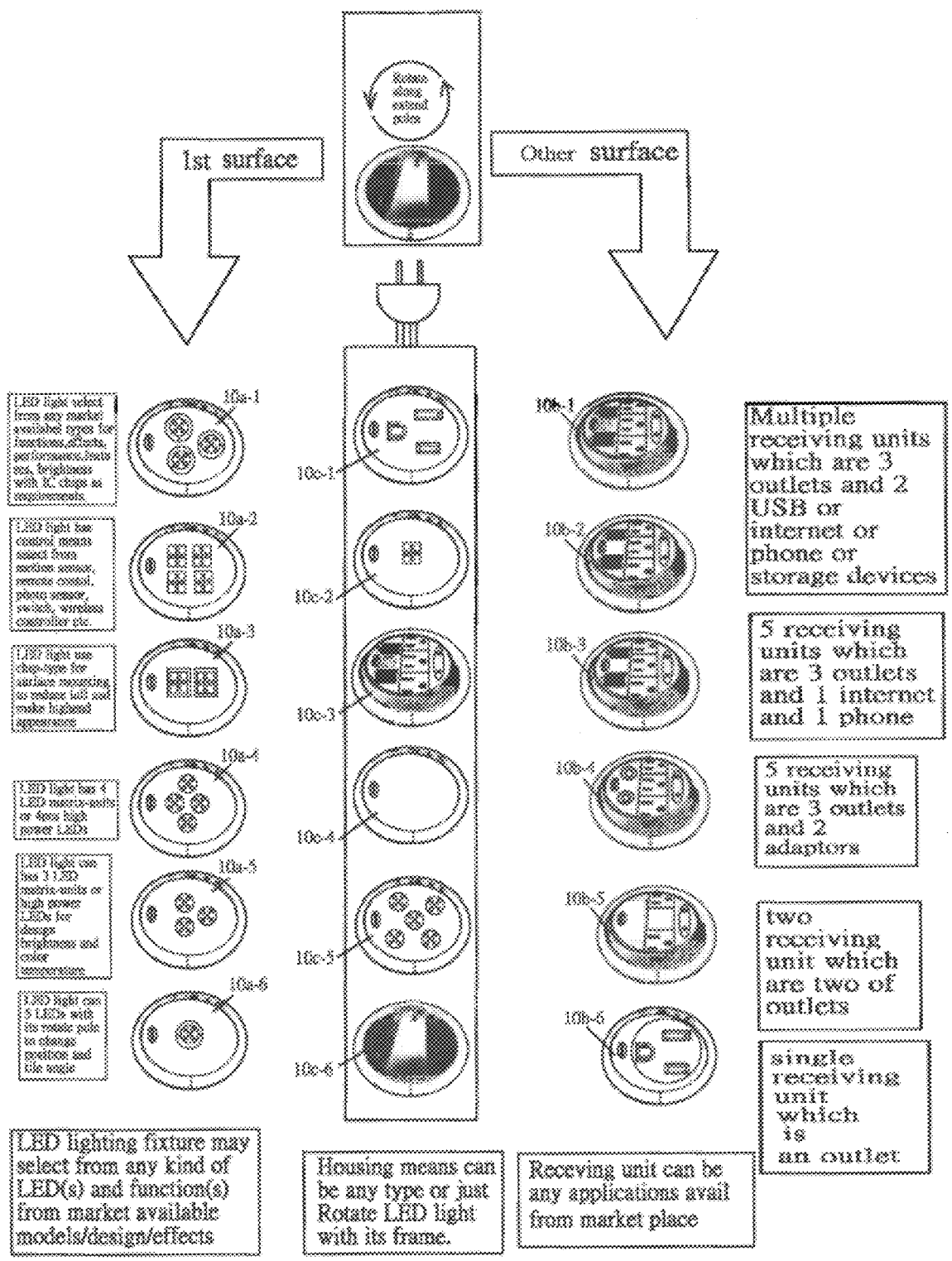

FIG. 34 (4) Sealed-unit: This is a unit which has desired combination for any number of USB-unit(s) or/and outlet-unit(s) arrangement or combination and sealed into one piece of the housing and passed all USA required related safety standard(s) and get test labs' certification for this sealed unit only which not including the other housing parts or accessories non-related to the USB or Outlet charger. This sealed unit any live-wire or electric-carried parts & accessories must seal so called sealed unit so can pass the US Safety standard requirement(s).

FIG. 34 Universal Charger: This is charger which has finished housing and electric-contactor such as prong means, or wired, or quickly-connector(s) which not only can incorporate with the said desk-top items, but it also can use for other applications. One of preferred embodiment is market available USB-2.1 Amp Charger has 3 USB-ports with prongs. This can install within the current invention desk-items housing by wired or outlets and it also can take apart from the desk-top item's housing and carry with people to plug-into Wall outlets to charger the computer, communication, consumer electric items or any electric or digital data devices while prong means plug-into outlet on wall or power strip's outlets. This is definition for universal charger for current desk-top items.

DETAILED DESCRIPTION OF THE PREFERRED EMBODIMENTS

The present invention provides improvements over the sealed-units disclosed in U.S. patent application Ser. Nos. 12/502,661, 12/292,580, 12/566,322, 11/498,874, 11/527, 629, 12/622,000, and 12/624,621, which have uniform dimensions and shapes to fit into the same uniformly dimensioned compartment and thereby enable the universal sealed-unit to fit into a variety of LED light devices. This invention has more features, functions, and effects to allow people to buy any electric device or digital data device with the additional convenience of including outlet-unit(s) to supply electric power to other device(s), or USB-unit(s) to supply different types of electric power to other device(s). The current invention uses a universal module which can have any combination of the following parts or accessories, including: circuit, conductive piece, contactor, receiving ends, output-ends, input-ends, electric parts and accessories, prong(s), rotating kits, cable with a plug, cable with USB-plug(s), printed circuit board, flexible printed circuit board, wires, a cable, a digital data cable, a conductive piece, or any related electric parts or accessories available from the marketplace to get electric power from a prong-cable, USB-cable has USB-plug(s), prong(s), or USB-receiving port has all kind of custom-Pins, outlet-unit's or USB-unit's receiving-end(s) (hereafter as outlet-ports or USB-ports) and supply power to a variety of electric devices.

The universal module has a same power-supplying function as the "sealed-unit" for the "LED light devices" described in the inventor's issued U.S. Pat. No. 8,342,732 (#I-1), U.S. Pat. No. 8,305,846 (#J-2), U.S. Pat. No. 8,231, 246 (#EE-1), U.S. Pat. No. 8,002,456 (#GG-08), U.S. Pat. No. 7,726,839 (#V-08), U.S. Pat. No. 7,726,841 (#W-08), U.S. Pat. No. 7,726,869 (#Y-08), U.S. Pat. No. 7,618,150 (#S-07), and U.S. Pat. No. 7,722,230 (#AA-08) and U.S. patent application Ser. No. 12/566,322 (#M-1), Ser. No. 12/073,889 (#X-08), Ser. No. 12/894,865 (#T-1), Ser. No.

12/003,809 (#V-08) or the "outlet device" of the inventor's U.S. Pat. No. 7,824,185 (#BB-08). Furthermore, the interchangeable "sealed-unit or battery-pack" of the inventor's U.S. patent application Ser. No. 12/622,000 (4-11-1-09), Ser. No. 12/295,562 (4-11-1-1) also utilizes concepts shared by the present invention.

Figure 1:
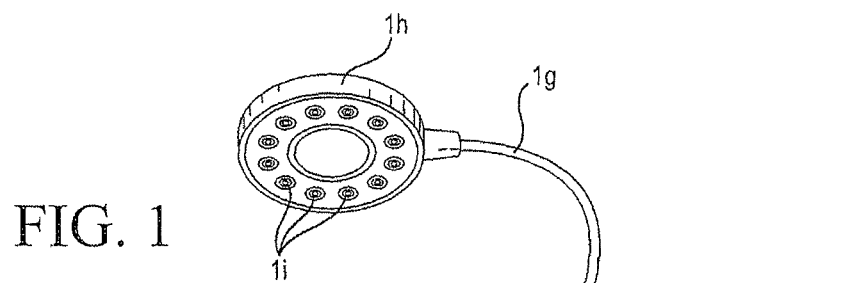
FIG. 1 is a front view of desk top items with LED light source having current invention definition for USB-unit(s) has USB charging-port(s) release spec which can charge energy storage unit or assembly up to 1.0 Amp or higher which USB Charging ports only can charge the energy storage unit or assembly without any digital data transmit functions. The $1^{st}$ embodiment can charge rechargeable batteries inside other electric or digital data device(s) minimum from 1.0 Amp or higher as definition of USB Charging-ports and, according to a first preferred embodiment of the invention, which has 2 USB-units and 1 outlet-unit, 12 LEDs, and is powered by a USB plug-wire means from the AC to DC outside housing transformer, or adaptor, or invertor, or converter which already change the AC current to DC current from AC outlets which can supply more higher than 1.0 Amp so can work with definition USB charging-port which has min. 1.0 A up to higher amperage after 2007 and reissue on 2010.

FIG. 1 is a front view of a desk top item (1 a) with LED (1 h) (1 i) and USB-unit(s) (1 d) (1 e) has USB Charging-port(s) as above discuss specification released on 2007 and upgrade on 2010 which can have charging capacity minimum 1.0 Amp up to 5 Amp or higher however The USB Charging-port(s) do not have digital data or electric data delivery while need such big and quickly charging speed. So, before 2007 all the charging from the out-of-date USB port is too small and less only 500 ma or lower charging capability and may have the overheating for fire risk. So, from 2007 to 2010 come out the current inventions said (USB charging-ports) has more strictly for USB Charging port(s) material and all details so can allow to quickly charge from minimum 1.0 A to 5.0 Amp and from 2007 to 2015 come out higher for 2.1 Amp or 2.4 Amp.

The current inventions disclosure the time table and USB development on the above discussion to make clear different for USB Charger limitation before 2007 and make big difference for any USB Charging-port preferred only has Charging-Function and not have the Digital/electric data delivery while for USB Charging ports if want to get safety and quickly Charging capacity as above reports shown evidence.

From FIG. 1, the USB-Unit(s) (1d) (1e) has USB Charging-ports for charging the energy-storage unit or assembly including the rechargeable batteries (not shown) inside the other electric or digital data device(s) according to a first preferred embodiment of the invention which has 2 USB-units (1 d) (1 e) and 1 outlet-unit (1 f) at the front of the base. The location for the USB-Unit(s) or Outlet-unit(s) preferred to arrange on front of the desktop items' front housing so people can easily to reach without move or turn direction of the items for every time to charge the other device(s). However, for Outlet-unit(s) or Outlet-Module(s) can put on back because it may SUPPLY power to the other electric device(s) such as printer, scanner, Fax machine which can just one time plug and not every day need to plug into the Outlet-unit or Outlet-Module. The laptop carry computer need every day repeat use Outlets-Unit or Outlet-Module so need to put on front or sides for easily operation.

The first preferred embodiment is a 12 LED USB light powered by a USB plug-wire means (1 b) (1 c) which can be an USB-plug (1c) or AC Plug (not shown) has wire from different power source.

$1^{st}$ type: The USB-Plug Wire can connect with the circuit which outside the desk lamp housing has at least one of the transformer, or adaptor, or invertor, or converter to change the outlet's AC current into DC current at outside circuit housing and outside circuit housing has the USB-receiving port(s) to accepted the USB-Plug-wires to build the DC current delivery from Outside circuit housing to the Desk Lamp housing. Or $2^{nd}$ type: The AC-Plug wire can connect with the AC outlets and get the AC current into the inside desktop housing's circuit which has at least one of the transformer, or adaptor, or invertor, or converter to make the input desktop housing AC current to change to DC current and has other electric parts & accessories to deliver the DC current to said USB Charging-port(s) or/and to LED light source.

The said $1^{st}$ type or $2^{nd}$ type of USB-Plug wire or AC-plug wire both has the said 2003 specification quickly charger USB charging-ports and includes an adjustment arm (1 g). Hereof, the 12 LEDs is offering the area illumination.

Figure 2:
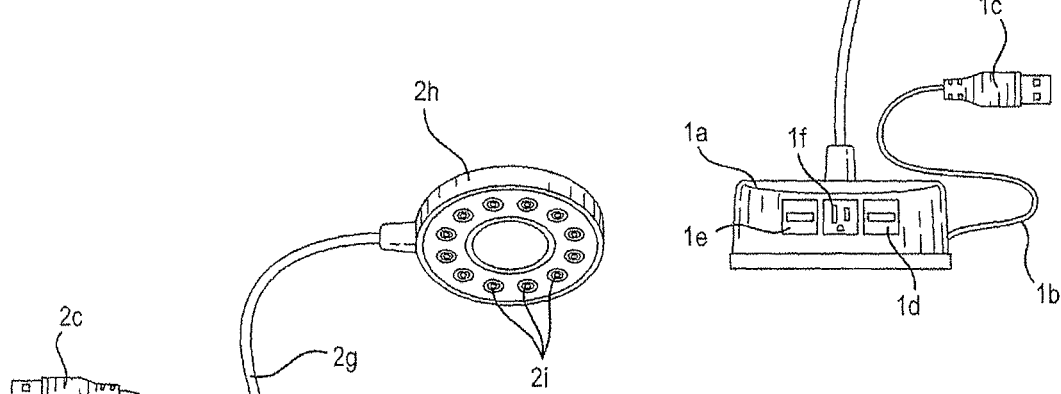
FIG. 2 is a side view of the desk top items of the first preferred embodiment, the inner side of the 12 LEDs is a mirror or magnify lens or magnify mirror which can show the image to let people to see or magnify lens make the lighted objects to become super big size to let people can easily read and use the flexible house to ben to fix distance against the tiny objects to let people not hold by hand for long time.

FIG. 2 is a side view of the first preferred embodiment of a desk top item (1 a) with LEDs (2 h) (2 i) showing 1 USB-unit (2 e) and 2 outlet-units (2 d) (2 f) on the side of the base. The LED means has 12 LEDs (2 l) in the USB-Plug-Wire as above discussed $1^{st}$ Type preferred model which is powered light (2 h) and is powered from the USB plug-wire mean (2 b) (2 c) and has USB Charging port(s) 2(e), 2(f) to quickly charge the energy storage unit or assembly including rechargeable batteries inside the other electric or digital device.

Figure 3:
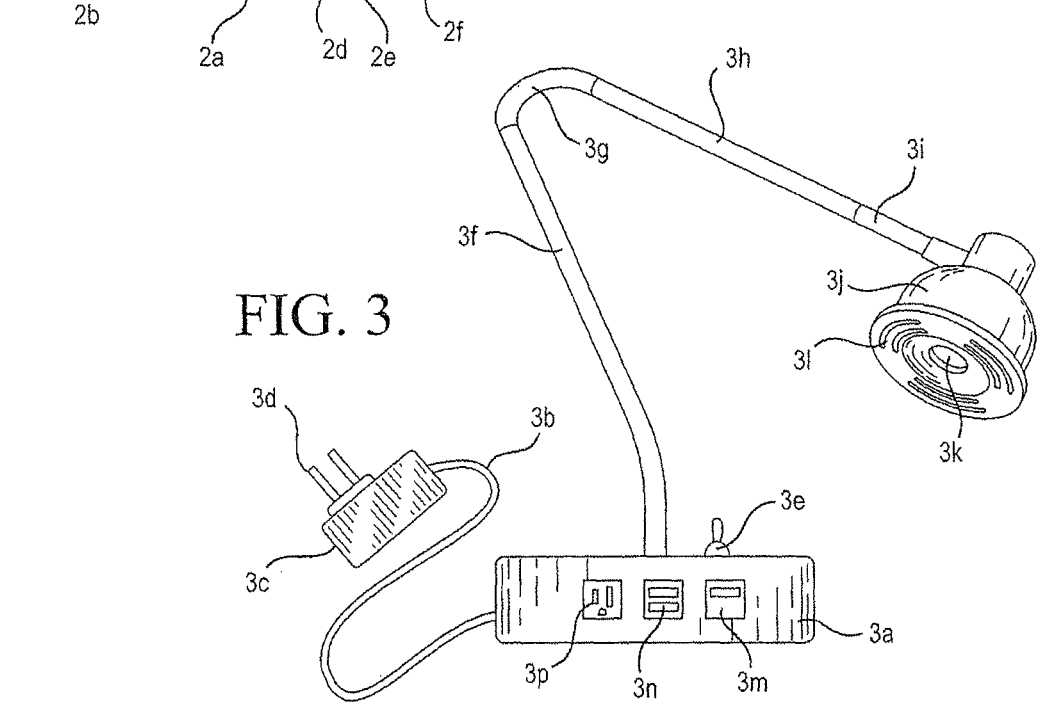
FIG. 3 shows a first design of a second preferred embodiment of the invention having the outside transformer, or adaptor, or invertor AC power source which get power from the any kind of outlet by prongs and the said desk top item having 3 receiving-ends including 2 USB Charging-port(s) USB-unit(s) or one Big USB-Module inside the housing with different power output (2 USB units has 3 USB-ports and 1 outlet-unit has 1 outlet-port) to charge the energy storage unit or assembly by USB Charging-ports or SUPPLY Power by outlet-unit for different electric or digital data device(s), for example 1,000 ma, 2,100 ma (D.C. current output from 2 USB-units has 3 USB charging-ports) and A.C. current output from the 1 outlet-unit to SUPPLY charge different electric or digital data device(s) such as an iPhone™ and iPad™ for DC current by USB-unit's USB Charging-port(s) and other device such as laptop computer for AC current by outlet-unit to get the different requirements for charging DC or SUPPLY AC current. Here of the Desk lamp has the light source available from market place for EL or OEL, LED, and all the light source must install on the inside lamp holder or PCB holder.

FIG. 3 a first design of a second preferred embodiment which has 2 USB-unit(s) (3 m) (3n) has USB charging-port(s) (3n) (3m) to charge the energy-storage units or assembly DC current by the said USB Charging-port(s) has minimum 1.0 Amp and an outlet-unit (3 p) has outlet (3p) to supply the AC current to the prong(s) of the said other electric or digital device. Both have different power type and output to charge or supply different electric or digital data device(s).

The USB-unit(s) has USB charging-port(s) which has minimum DC current charging capacity at 1.0 Amp which equivalent 1,000 ma, or higher Amperage such as 2,100 ma units to charge the rechargeable batteries inside of the different electric or digital data device(s) such as an iPhone™ and iPad™ that have different requirement for charging current.

The Outlet-unit (3p) which get power from the outlet's power source which has unlimited AC current and will go through the conductive material and piece or assembly to supply the power to the outlet-unit (3p) at the desktop items housing to the prongs while the prongs of the other electric or digital device insert into the said desk lamp outlet-unit(s).

FIG. 3 shows a first design of a second preferred embodiment of the invention having the outside transformer (3c), or adaptor (3c), or invertor (3c) power source which get power from the outlet (not shown) by prongs (3d) and the said desk top item (3a) having 2 USB-unit(s) (3m) (3n) with different power output (2 USB units has 3 USB-ports) which has its 3 USB Charging-port(s) and everyone has minimum 1.0 A charging capacity to charge the energy-storage unit or assembly including rechargeable batteries inside of the computer, communication, or consumer electric products including the power bank which has a lot of rechargeable batteries assembly inside. such as an iPhone™ and iPad™ for DC current And 1 outlet-unit has 1 outlet-port has different current and to SUPPLY the AC current into the said other electric or digital data device(s)'s while the prong(s) of other device's insert into the said outlet-unit's receiving port(s). other device such as laptop computer for AC current to get the different requirements Here of the Desk lamp has the light source available from market place for any desire type including or Energy saving light source, EL, OEL, LEDs.

Figure 4:
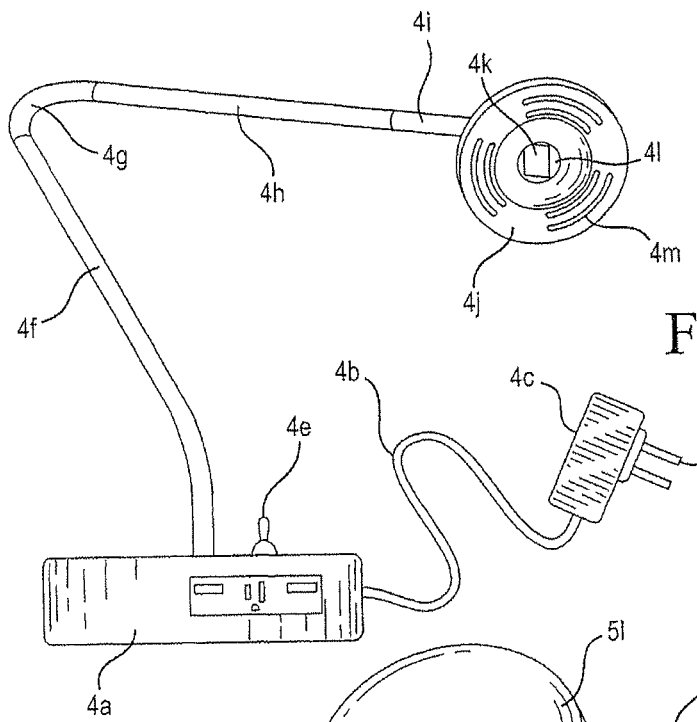
FIG. 4 shows a second design of the second preferred embodiment, which has 2 USB-units has 2 USB charging-ports and 1 outlet-unit has 1 outlet-port to allow people to charge or supply power to, for example, DC current from USB Charging-ports for an iPad™, iPhone™, and AC current from outlet-port for laptop computer or other device which can get power from the outlet-unit. The USB-unit get power from outside transformer, adaptor, inverter to get desired DC current and the outlet-unit get power while prong connect with wall-outlets and directly deliver AC current same as wall outlets current to outlet-unit. Hereof, the Desk lamp is non-LED light source lighting or one-piece super powered LED light source or plurality of LEDs install on PCB.

FIG. 4 shows a second design of the second preferred embodiment which has 2 USB-units and 1 outlet-unit to allow people to charge DC current power to an iPad™ iPhone™ by the USB Charging port(s), or supply power to the laptop computer, or other device by outlet-unit(s) or outlet-Module(s). Both can get power from the USB-unit(s) or outlet-Unit. The drawing also shows the differences between the first and second preferred embodiments. All such alternative designs, and any improvements or devices with an equivalent function or that are replaceable by the preferred items will still fall within the scope of the current invention, including variations disclosed in the inventor's other patents and patent applications may also fall within the scope of the current invention.

The difference or variation or replaceable or alternative or replaceable including following parts for current invention;
(a) Light source
(b) Installation, location
(c) Installation space, compartment, room, housing, construction
(d) USB Charging-port 1.0 A, 2.1 A, 3.1 A, 1.2 A, 2.4 A, 3.6 A, 4.2 A, 4.8 A or any combination for the USB ports
(e) Power source come from: (e-1) AC Plug wire, (e-2) USB plug wire, (e-3) Outside housing Transformer, or invertor, or adaptor, or converter (e-4)
(f) Function of desk top items: as above discussed products.

Figure 5:
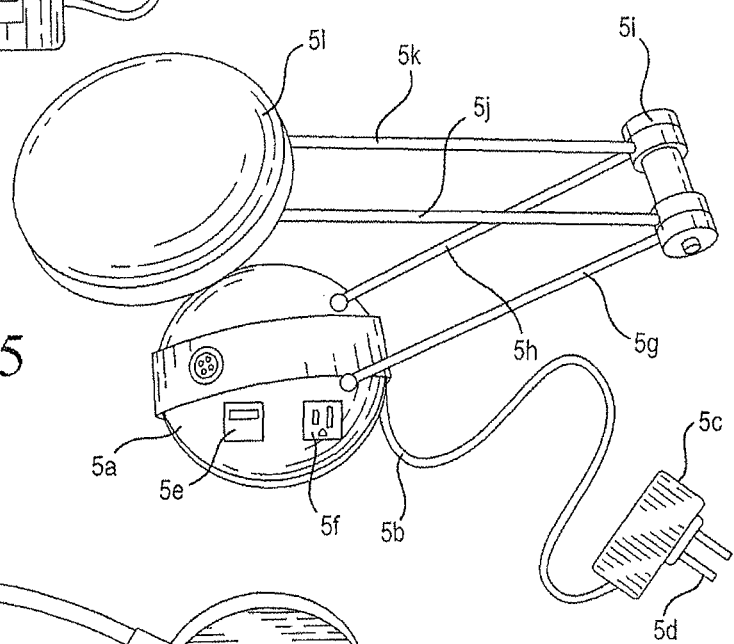
FIG. 5 shows a third preferred embodiment of a desk top item in the form of an LED lighting fixture with adjustable arms to enable adjustment of the height, orientation, direction, and/or angle of the LED lamp to provide the best illumination. The built-in 1 USB-unit has 1 USB charging-port has minimum 1.0 Amp or higher charging capability and 1 outlet-unit has 1 outlet-port has a lower cost than the above-discussed items with a plurality of USB-units and outlet-units, and is powered by a UL listed adaptor OR transformer plugged into a wall outlet that supplies 120 Volt AC current and transfer to DC current for USB-unit has 1 USB charging-port, rather than by a USB plug and wire for out-of-date earlier than USB Charging-ports definition release on 2007 and update on 2010 for charging higher than computer old-USB port only supply 500 ma and had heat issues and problem. The 2007 and 2010 new USB Charging-ports has minimum charging capability 1.0 Amp up to 5 Amp and Not Allow the digital data delivery while Charging the said energy-storage unit or assembly which may is a rechargeable batteries. Any out-of-date before 2007 USB charger is not possibly get safety and steady and quickly charger compare with 2007 release and 2010 update for new USB Charging-ports which has non-over heat and do not do digital data delivery while charging.

FIG. 4 shows a second design of the second preferred embodiment, which has 2 USB-units has 2 USB-ports and 1 outlet-unit has 1 outlet-port to allow people to supply power to, for example, DC current from USB-ports for an iPad™, iPhone™, and AC current from outlet-port for laptop computer or other device which can get power from the USB-units or outlet-unit. The USB-unit get power from outside transformer (4c), adaptor (4c), inverter (4c) to get desired DC current and the outlet-unit get power while prong (4d) connect with wall-outlets and directly deliver AC current same as wall-outlets current to outlet-unit. FIG. 5 shows a third preferred embodiment of a desk top item in the form of an LED lighting fixture (5 a) with adjustable arms (5 g) to (5 j) to enable the LED lamp to be moved to a desired height, orientation, direction, and/or angle to get the best illumination to people. The built-in 1 USB-unit (5 e) and 1 outlet-unit (5 f) have a lower cost than other above-discussed USB-units and outlet-units because they do not need to be made as compact. The desk top item is powered the transformer (5 c) (5 d) or a UL listed adaptor (5 c) (5 d) that receives power from a wall-outlet for 120 Volt AC current rather than the USB plug and wire of the first preferred embodiment. This kind of DC current already changed from AC to DC current can save a lot of work and labor for inner circuit because no need change AC to DC inside the desk top items housing. The inside housing circuit can be a simple or add other functions such as light sensor, photo sensor, motion sensor, blue tooth, infra-red wireless controller, wireless controller with Wi-Fi, APP software controller, or other wired or wireless operation, color changing, brightness changing, timer, time delay, image display, project image display, optics filter to reduce glare for vision improvement or other added functions, features, performance, effects for people eye, nose, mouth, ear, skin, body to make people more convince to use the desktop items has built-in USB-Unit, USB-Module, sealed unit, universal unit, outlet-unit, Outlet-module as above discussed.

Other features are this desktop items become universal model for all over the world so no need to change any inner circuit just change the outside housing transformer, or invertor, or adaptor, or converter specification and prong(s) specification, then, same desktop items with same inner circuit can sell all over the word.

FIG. 5 shows a third preferred embodiment of a desk top item has built-in 1 USB-unit (5a) has 1 USB-port and 1 outlet-unit (5f) has 1 outlet-port has a lower cost than the above-discussed items with a plurality of USB-units and outlet-units, and is powered by a UL listed adaptor OR a transformer plugged into a wall-outlet (not shown) that supplies 120 Volt AC current and transfer to DC current for USB-unit (5e) has 1 USB-port, rather than by a USB plug and wire (2b) (2c) or (1b) (1c). Whenever change the outside housing transformer, or adaptor, or invertor, or convertor and prong(s) specification even no need to change simple inner circuit can sell same function unit to all over the word. It also because the all AC to DC current change is made outside of desktop housing so the base or housing or unit of the said simple inner circuit will reduce to very slim and thin to make more value looking for sales!

Figure 6:
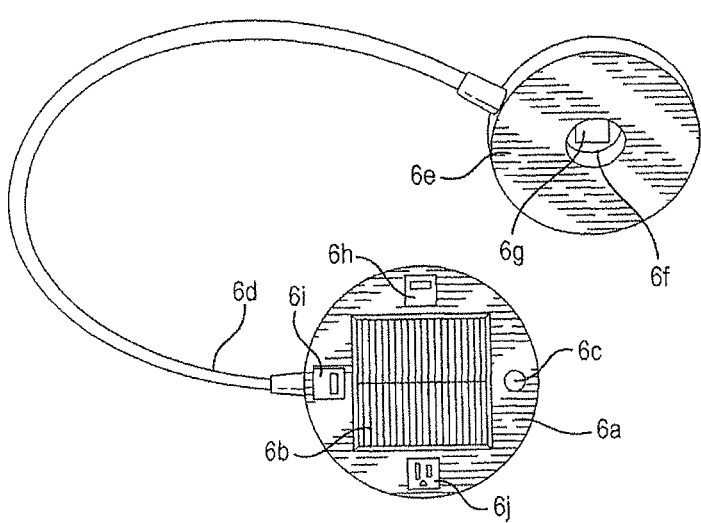
FIG. 6 shows a fourth preferred embodiment which is powered by solar power and stores the solar electricity inside rechargeable batteries to provide enough power to charge other electric or digital data device(s) through built-in USB-unit(s) and outlet-unit(s) incorporated with proper circuit, or controller for quickly charging capacity, or voltage pump-up circuit, means to meet market requirements. The current embodiment, the Solar or chemical powered Desk lamp which get current from Solar or Chemical already is DC current so no need transformer to make the current change from AC to DC.

FIG. 6 shows a fourth preferred embodiment which is powered by a solar power array (6 b) and which stores the solar electricity inside rechargeable batteries that have enough power to charge other electric or digital data device(s) though the built-in USB-unit(s) (6 i) (6 h) and outlet-unit (6 j) having appropriate circuit means to meet market requirements.

It also can incorporate with the co-inventor's pending filing to use the inventor's pump up inner rechargeable batteries output-end voltage so can charge the higher voltage of the desk lamp items' input-current voltage.

FIG. 7 also shows the fourth preferred embodiment, which the desk top items is a desk lamp can also be powered by other available power sources including wind power, chemical power, battery power, a generator, a transformer, adaptors, an inverter, an inductor, etc. FIG. 7 also shows the fourth preferred embodiment, which The big base (7a) of the Desk top item has sufficient space within so can install all kind of USB-unit(s), Outlet-unit(s), USB-module(s), Outlet-module(s), Sealed-unit has number of the said USB-outlet(s) and/or Outlet-unit(s), Universal unit has number of the said USB-outlet(s) and/or Outlet-unit(s) has relatively universal compartment to fit within, The said such big base (7a) of the desk top item can also be powered by wind power, chemical power, battery power, a generator, transformer, adaptor, inverter, inductor from the cable (7e).

FIG. 8 shows that the base of the desk top item of the first preferred embodiment incorporate with different light source application (Light source is not shown) may be made thicker or higher to accommodate bigger size electric parts and accessories to save a lot of the cost of super compact, slim, or cute size electric parts and accessories. Furthermore, the thicker or higher base can also accommodate a rotating USB-unit(s) or USB-module that can be rotated from a first surface to a second surface so that the first surface of the USB-module will look nice when the USB-unit(s) or module is not in use.

Details of the rotating USB module can be understood from FIGS. 18, 19,20, 21, and 22, the details of which are explained in the inventor's co-pending U.S. patent application Ser. No. 13/117,227 (#FFF-11) and (Ser. No. 12/950, 017) (#CCC-10). It will be appreciated that the details disclosed in the co-pending application may be applied to the present embodiments without departing from the scope of the current invention.

All the above discussed the USB Charging-port(s) of current invention as the definition released on 2007 and update 2010 for (AAA) Quickly charger which minimum had 1.0 Amp to 5.0 Amp charging capability (BBB) While quickly charger with higher over 1.0 Amp capacity, not allow for any digital or electric data transit or deliver by same USB-unit or USB-Module or USB Charging-ports (CCC) the out of date earlier than 2006 has limited for charging capacity less than 500 ma or so and has risk for overheat because the USB-ports the specification or construction or conductive cross section is too few to carry bigger current go thought and cause over-heat and has fire risk (DDD) The USB charging ports of current invention only allow one of input current not workable for more than one input current such as sometime is AC and while power fail use DC battery power as input power (EEE) The USB charging ports as current invention only has Charge DC current by USB-port or SUPPLY AC power by Outlet unit. No any digital/electric data delivery or transmit for quickly charger USB-Port as current invention (FFF) The current invention has housing, space, compartment, room to install the said circuit and related electric parts & accessories inside the desktop housing (GGG) The current invention has movable, removable, Universal USB-Charger unit can install, movable, removable, replace feature too. (HHH) The current invention USB-Charging ports incorporate with jump-wire or bridge-wire or USB-wires has 2 male plug and one plug into the Desktop USB charging-ports and one other male-plug into the Other device's USB-Plug receiving ends (device's USB-port) to make the current delivery from Desktop to the other device. (III) The said USB-Wires has 2 mail plugs, the 2 male plug can be any type including Type A, Type B, Type C for construction. (JJJ) The said USB-Wire has 2 male plugs; everyone plug needs to match the USB-female receiving ports for Pins. Maybe the same or different on the size can be standard Type A, Mini, or Micro USB specification if the receiving-end match the Plug-in-end for pins.

FIGS. 9, 10, 11, and 12 show fifth and sixth preferred embodiments which also have a thicker or higher (9h) base for the desk top items with LED means where the LED is an indicator light (9p) for charging status, and to which rotating USB-modules having a plurality of USB-unit(s) and other receiving means (hereafter as other-ports) can be added to increase the number of function(s), feature(s), effects, and/or performance(s). The USB-modules (9 k) to (9 m), (10(g), and (11 e) to (11 j) of these embodiments have more than 1 surface to enable different surfaces to be exposed for different purposes. The more than 1 surface of the USB-module can be any number from 2 to N. From FIG. 9 can see the USB/Outlet module has 2 of the USB-unit(s) (9m) and 3 of Outlet-unit(s) (9n) and one LED charging indicator light (9p) which show people the USB-unit(s) is charging now and one of the marking plate (9l) to show all the 3 outlet-unit(s) max. wattage can use such as 1,650 Watt for all other electric device total rating, but not for 1,850 Watt which is for hair-dryer or heater device. The release (9j) is a locker and also is an elastic-release while touch it the module will automatically rotate from surface (9i) and change to the other surface which has all the USB-Unit (9m) or/and Outlet-unit (9n) or/and other type of receiving means including Wi-Fi, internet, phone, digital data, or any other receiving means for electric or digital data device(s). The switch (9f) turn-on and turn-off the said Bulb or CFL or energy-bulb or fluorescent-tube light source of the top part of the desk top items or the other functions on top of the said desk top item. The said electric wire or code and the plug which has no any transformer or adaptor or invertor inside so the current from the Prong (9d) for 120 Volt Alternative current directly to deliver to the inner circuit means to change from AC to DC for USB-unit(s) and at the same time the prongs (9d) also deliver the 120 Volt AC current to the rotatable module's Outlet-unit(s) to supply the 120 Volt AC current to other electric device. The same time the function of the top part of the desk top item has its own electric arrangement to keep the original predetermined or existing functions.

FIGS. 9, 10, 11, and 12 show fifth and sixth preferred embodiments in which desk top items with LED means as charging status indicator light (9p), It also have a thicker or higher (9h) base, and which can add rotating USB-modules with a plurality of USB-unit(s) (9n) or/and Outlet-unit(s) (9m) or/and a plurality of other receiving means (hereafter as other-ports) to increase the number of function(s), feature(s), effect(s), and/or performance(s), the USB-module having more than 1 surface (9i) and the capability of changing the surface for different purposes (9k).

From the FIG. 9 shown the any kind of light source desk lamp (9a) which has 2 rotatable Module (9K) (9j) and each of rotatable module (9k) (9j) has built-in desire number of the
1. USB-Units (9m) or/and
2. Outlet-unit (9n) or/and
3. USB-Module (combine the 2 USB-units into one piece and in one housing or PCB) or/and
4. Outlet-module (combine the 3 outlet-units into one piece and in one housing or PCB) or/and sealed-unit (has more than one of UBS-unit(s) or/and
5. outlet-unit(s)) or/and
6. universal-unit (at least has one USB-unit or/and outlet-units has housing to fit into uniform compartment which within many of the desk top items housing)

to get desired functions. It also has switch means to turn-on or turn-off the said Light source for desk lamp or top part of desk top item's function as existing. The one LED indicator light (9p) on the one of the rotatable module's surface (9k) to show the charging status.

From the FIG. 10 shown the thicker and curved base for Desk top item which is a desk lamp (10a) has desire light source for illumination. The desk lamp (10a) has wired plug (10b) (10c) to connect with wall-outlet (not shown) and has AC 120 Volt current input into inner circuit (not shown) to transfer the wall-outlet's 120V current into USB-unit(s) needed the DC current and supply the wall-outlet's 120V current to the Outlet-unit(s). The said bulb, incandescent light, florescent light or CFL or energy saving light source is turn-on or turn-off by the switch (10f) or sensor (10f) or remote control (10f) on the base (10a) top or side of the surface.

From the FIG. 11, shown the base (11a) of the said Desk top lighting which may has any type of the light source (not shown on top part) which has the Rotatable module (11f) which has desire number of USB-Unit(s) or/and outlet-unit(s) and optional LED to shown charging status as indicator light. The said base (11a) not only has rotatable module (11f) and but also has additional outlet-unit or outlet-module(s)(11c) (11d) to allow to charge or supply AC power to the other electric or digital device which need AC current input to make operation. It also can have more outlet-unit(s) up to 1 to N number (N can be any number) if the base can fit within the plurality number of the said Outlet-unit(s) so the current invention's desk top items base (11a) can replace the market existing power-strips which lay on the ground to supply the same 120 Volt current.

From the FIG. 12 also shown the preferred embodiment which the said Desk Top item is a lighting has preferred light source may select from bulb, CFL, incandescent, energy saving bulb or tube as light source which has big base (12a) and the rear-side of base has 3 or plurality of the outlet-unit(s) from Number 1 to any number so it can connect with other electric or digital data devices to supply or charge the other devices. The special design for current invention transformer (not shown), adaptor (not shown), inverter (not shown) inside or outside base which not only supply the DC current to the USB-units but also supply AC current to the said plurality of the AC Outlet-unit(s) while the said transformer, inverter, adaptor has special design for 120 Volt current not passing though the current changing circuit for the special model for current invention. From FIG. 12 shown the wired plug (12C) has prong (12d) has no any circuit inside so can deliver the wall-outlet 120 Volt direct to the base (11a) 3 outlets to let people to connect with the desk top laptop, or speaker or lava light or other electric or digital devices which need 120 Volt AC current to operation.

The plurality of outlet-units or Outlet-module can install on rear-ends or sides of base of the lighting device, so it can have nice and net wires arrangement on the surface such as desk top or floor for floor lamp base. This kind of arrangement for base of lighting device will save people to use a lot of power strips or power cords or extension cord which is ugly and occupied too many wall-outlet space and outlets. This is other feature for current invention has a plurality of Outlet-unit or outlet-module on the base of ling device. It can add the surge protection for such more than 3 outlet-unit or 3 Outlet-module so can have 1 more Plus feature of this Outlet-unit on the base of lighting device.

FIG. 13 shows a desk top item (13 a) which has a super big base (13 h) so that a plurality of rotating USB-Modules (13 c) to (13 g) can be installed to enable a group of people to charge their electric or digital device(s) at the same time, such as in a train station, bus station, airport, meeting room, hotel lobby . . . etc.

FIG. 14 shows desk top items with LED means (14c) is a function indicator light to shown the charging status or power-on-off status and USB-unit(s) (14 h) (14 g) (14 p) (14 q), USB-module(s), or outlet-unit(s) (14i) (14 j) (14 n) install on the pole or base or part of the said Desk Top items to allow people to charge other electric or digital device(s), the items has at least one of the functions including a radio (14d), timepiece (FIG. 27), weather station display (FIG. 27), fruit blender, food machine (FIG. 28), liquid machine (FIG. 25), LED lighting (FIG. 1 to FIG. 6), light fixture (FIG. 7 to FIG. 12), projector or image presentation or reflection (FIG. 24), electric fan (FIG. 29), heater or any conventional items (FIG. 28) with LED built-in as indicator light (FIG. 9 to FIG. 11 on module surface) or the said LED is light source to offer the area illumination (FIGS. 1 to 6 as light source), or shown digital time (FIG. 27), or shown image (FIG. 24), or shown the charging status (FIG. 9 to FIG. 11 on module surface). The said other functions or the said USB-unit(s) or Outlet-unit(s) can install on the anywhere of the base, pole, steps, flat areas of the said Desk top items and not limited only on the base one surface as FIG. 14 shown.

FIGS. 15, 16, and 17 show different LEDs arrangement used for LED lighting as light source to offer the areas illumination in the above-discussed preferred embodiments or other LED desk lamp or LED lamp for a desk top.

FIGS. 18, 19, 20, 21, and 22 show details of a USB-Module (18 b) (19 b) with at least one USB-unit (19 g) has 2 USB-Ports and a plurality of an additional receiving means, which may include a USB-unit(s) (19 h), outlet-unit(s) (19 i) (19j), internet-unit(s), adaptor-unit(s), other light means, or another light source with appropriate parts and accessories, or any conventional available receiving means, the USB-module (18 b) (19 b) having at least more than 2 surface(s) (e.g., surface (18 c) on one side and the USB-unit(s) on the other side), each surface with its own special design and its preferred receiving means from above listed type to has desired functions to let people to use.

FIGS. 23, 24, 25, 26, 27, 28, and 29 show all kinds of desk top items which offer function(s), effects(s), performance(s) to people's eyes, nose, mouth, and ears so that people stay nearby for a period as they work, rest, sleep, or stand. The desk top items each have (A) LED (for area illumination or indicator light to shown charging status or create image for time or projection image as above discussed) and (B) have a USB-unit(s) has its own quickly Charging-sport(s) has minimum 1.0 Amp to 5 Amp charging capacity as specification release on 2007 update on 2010 to charge energy-storage unit or assembly including rechargeable-batteries inside of the other electric or digital data device(s) and are arranged to 1. generate, exhibit, or provide light beams, or offer area illumination 2. show or present the image, at least including of a projection, a time display, a clock, 3. Offer or play music, sound, 4. Display photos, digital signals, 5. Create or produce the air flow at a desired temperature, moisture, steam, smells, 6. Offer the liquid, coffee/tea, and/or food, or 7. to serve as any other conventional device For people stay around for period while their other devices are charging.

At least one of the desk top device may include at least one of function(s) for people eye, ears, nose, mouth, skin to feel or sense or eat or smell or see or hear and the device let people to can easily to reach, touch, operate, or manage the said desk top device.

The device has desire number of the USB-Unit or USB-Module or Outlet-unit or Outlet-module or Sealed-unit or Universal-unit are installed or arranged on or within the device's substrate(s), base, pole, LED light housing. And the desk top device is arranged on the location, or place where people will stay for period, such as a desk, table, bed, chair, land, grass, or wherever else people work, rest, sit, stand, sleep or a take nap.

The as noted above, the desk top items may offer electric signals or visible or audio or smell or food or air functions related to people's eyes, ear, nose, mouth, or body, such as illumination, sound, images, brightness, visual effects, smell, water, liquid, food, wind, moisture, airflow or any conventional functions of electric devices, such as LED lighting, a clock, projector machine, image to see, digital photo frame, time display, air freshener, electric perfume freshener, moisturizer, electric fan, electric heater, electric steam spreader, electric cooler, electric air conditioner, or other conventionally available items that can be placed to let people easily reach, touch, operate, or manage the objects.

The desk top items may be powered by a direct current (DC) power source or alternating current (AC) power source having appropriate electric parts and accessories or components, such as circuit, IC, sensor, a motion sensor, timer, time delay, timer, resilient kits, conductive kits, transformer, inverter, adaptor, wire, prongs, UL listed adapter, PIR remote controller, infrared controller, wireless controller, blue-tooth controller, Internet controller, Wi-Fi controller, master power controller, and/or AC power outlet-unit(s) to offer electric power at a voltage (Volt) and amperage (Amp or ma) sufficient to achieve a desired charging time. The USB-unit(s) only serve as a power source for charging energy-storage unit or assembly including rechargeable batteries inside the other electric or digital device(s) and do not have an electric data transfer function. If plurality of USB-unit provided, the USB-units can be arranged to have different output power to charge different electric or digital data device(s). If additional outlet-units are provided the outlet-units may be AC outlet-unit(s) that serve as an AC power source with optional surge protection features.

Electric or digital data device(s) that may be charged by the USB-unit(s) by its USB Charging-ports for quickly charger capacity minimum has 1.0 Amp capacity include an MP3 or MP4 player, smart phone, computer, iPhone™, iPad™, video game, digital visual equipment, communication equipment, and other consumer electric products including the rechargeable batteries application such as Power bank for storage power tank.

The USB-unit or USB-module of the preferred desk top items may be turned on or turned off for a predetermined time by switch, sensor, timer, photo sensor, motion sensor, time delay, and/or master control power controller, infra-red wireless, remote controller, wireless controller, APP software, Wi-Fi or internet or network wireless controller, Z-wave remote controller.

All receiving port(s) in the desk top items, including USB-units or USB modules, may have a removable cover to allow kids or others to safely touch the items and prevent dust, or water from getting into the receiving means.

The USB-unit or USB-module to charge other electric or digital device(s) can be removable from the desk top items and carried with people to use when people leave the desk top items. For this purpose, the USB-unit(s) or USB-module(s) can be disassembled from the desk top items and re-assembled into the said desk top items by quick connector means, adaptor means, assembly means, or fixing means, with each of the USB-unit(s) or USB-module(s) having its own safety certification(s) so that the individual USB-unit(s) or USB-module(s) can be tested by safety authorities and sold separately.

The USB-unit(s) includes USB charging-ports which is an electric charging unit which has a USB-female receiving end to receive a USB-male plug from the USB-wire which has 2 male plugs on 2 ends to deliver electric power from the USB-female receiving means (USB Charging-ports) to the other device's/USB-wire's USB-male plug. The preferred USB charging-ports (USB-female receiving means) gets power from a power source and uses its circuit to convert or transform the electric power to a desired waveform, voltage, and current enough to charge Energy-Storage unit or assembly inside of the other electric or digital device(s) through the USB male plug insert into desktop items USB-female receiving port.

The items of these embodiments may be in the form of lighting, a desk lamp, table lighting, lava light, projection light, time piece, electric fan, air freshener, indicator coffee machine, indicator sound device, and visual device has LED(s).

FIGS. 32-35 show some preferred embodiment for the above discussed for parts as below listed.

FIG. 32 (1) USB-unit: The Unit means it is an individual charger has only charger purpose to have one input-current and passing though inner own circuit to make input current change to one output current to charger other device from its own USB port(s). This unit can be housed or without any hosing and install within the said desk-top housing and all live-wired or electric-carried parts & accessories not touchable by people except the USB-port(s).

The Charger only take 1 and only 1 of the input power or current and passing through inner circuit to come out the DC current on desired voltage and amperage. It cannot have more than one different input current such as AC or DC current as input current or it will be destroying the output current because inner circuit is fixed for one and only one current specification.

FIG. 32 (2) USB-Module: This module is not a single USB-Unit Charger. It will be any combination for any number of the USB-Unit(s) or/and Outlet-unit(s) has its own number of the USB-port(s) or/and Outlet-port(s) to connect with other electric or digital data device's mail prong(s) or Plug(s) to charging or supplying the DC or/and AC current to other devices(s). This unit can be housed or without any hosing and install within the said desk-top housing and all live-wired or electric-carried parts & accessories not touchable by people except the USB-port(s).

FIG. 33 (3) Outlet-unit and Outlet Module: The unit it is an individual POWER SUPPLIER device has outlet-receptacle which can receive the other device's prongs to deliver or supply the AC current from the outlet-unit's power source though the outlet-unit's port(s) to another device's prong to get into other device's circuit to power other device. This unit can be housed or without any hosing and install within the said desk-top housing and all live-wired or electric-carried parts & accessories not touchable by people except the USB-port(s).

FIG. 34 (4) Sealed-unit: This is a unit which has desired combination for any number of USB-unit(s) or/and outlet-unit(s) arrangement or combination and sealed into one piece of the housing and passed all USA required related safety standard(s) and get test labs' certification for this sealed unit only which not including the other housing parts or accessories non-related to the USB or Outlet charger. This sealed unit any live-wire or electric-carried parts & accessories must seal so called sealed unit so can pass the US Safety standard requirement(s).

FIG. 34 (5) Universal Charger: This is charger which has finished housing and electric-contactor such as prong means, or wired, or quickly-connector(s) which not only can incorporate with the said desk-top items, but it also can use for other applications. One of preferred embodiment is market available USB-2.1 Amp Charger has 3 USB-ports with prongs. This can install within the current invention desk-items housing by wired or outlets and it also can take apart from the desk-top item's housing and carry with people to plug-into Wall outlets to charger the computer, communication, consumer electric items or any electric or digital data devices while prong means plug-into outlet on wall or power strip's outlets. This is definition for universal charger for current desk-top items.

From above discussion for the USB Charging-port which has minimum 1.0 Amp to 5.0 Amp or higher amperage to allow people to get short time charger without any digital or electric data delivery is different with out of date 500 ma slow charger and has digital data delivery which will cause the overheat and fire risk. The current invention also has one and only one power source which is not like has AC input or Battery power pack to supply more than one power source into to make to the USB port which is not practical and increase a lot of trouble for construction and expensive. In addition to the foregoing, the current invention may include the following features:

1. A Quick USB charging-ports assembly for lighting device, consist of;

At least one of USB charging ports has minimum 1.0 A up to 5.0 Amp charging capacity and specification released on 2007 and update on 2010.

The USB charging ports only has charging function without any electric or digital data transmit or delivery.

At least one of circuit incorporate with the said USB charging port(s) and only has one input power-source and the said circuit supply DC current to charge the energy storage unit or assembly including battery, batteries, rechargeable battery inside the said other electric or digital data product(s) though outside hous ing's USB-wire has at least 2 male plugs to connect with USB charging-ports and be-charged product's USB receiving-ports to deliver the DC current.

The said USB charging-port(s) is universal type can fit for all different USB-Wire at least one of plug(s) so can charge all different be-charged device (s).

A lighting device and its parts has base for desk, surface, floor, wall installation and has housing space with opening to install the USB charging port(s).

2. The Quick USB charging ports assembly for lighting device, the said power source is from outside the light device housing's AC to DC transformer, adaptor, converter, invertor which has circuit-kits inside to change the AC current to DC current.
3. The Quick USB charging ports assembly for lighting device, the said power source is from AC wall or extension cord or other's outlet and get power by the AC plug and wire to the light device inner-circuit which has transformer, invertor, adaptor, converter assembly inside and change the input AC current to DC current.
4. The Quick USB charging ports assembly for lighting device, the said light device has LED or LEDs to offer at least one function select from illumination, area illumination, indicator light, lighted image, project image, time display, charging status, date or/and calendar display, temperature display, message display.
5. The Quick USB charging ports assembly for lighting device, the said light device has non-LED light source to offer illumination.
6. The Quick USB charging ports assembly for lighting device, the said light device housing space including light device's base, pole, bar, stationary organizer, compartment, construction, stand, clip base, or other housing space.
7. The Quickly USB charging ports assembly for lighting device, the said circuit has more than one circuit-kits or circuit-inner which for transformer, invertor, adaptor, converter inside the outside or light device's housing, and the said more than one circuit is circuit-inside that make device not only supply the DC current to the USB charging-ports but also arrange the power or electric functions to the other functions including light source, LED(s), time display, message display, wireless communication, image display, timer, date/calendar/weather display, other added functions, temperature/humility display, remote controller, Wi-Fi controller, image controller, IP cam, infra-red controller, wireless communication controller.
8. The Quick USB charging ports assembly for lighting device, the said lighting device is one of desk lamp, floor lamp, wall lamp, outdoor lighting, night light.
9. The Quick USB charging ports assembly for lighting device, the said other electric or digital products is a communication equipment, computer equipment, consumer electric products which has the DC energy storage unit or assembly inside the products and can be rechargeable.
10. The Quick USB charging ports assembly for lighting device, the said USB charging-port is a type A construction which same as majority of laptop computer USB port but has minimum 1.0 A up to 5 Amp or higher charging capacity.
11. The Quick USB charging ports assembly for lighting device, the said USB receiving-port of the said be-charged products which can be any kind of construction and size has its custom-pin which need as compact as possible including compact USB, Mini USB, Micro USB for compact size so can make be-charged device thinner, smaller, slim as much as possible.
12. The Quickly USB charging ports assembly for lighting device, the said USB charging-port(s) number from 1 to N (any number) and has relative number of the AC to DC circuit-kits of outside device's housing or AC to DC circuit-inner to match the desire charging capacity to have 1.0 A, 2.1 A, 3.1 A, 4.2 A, 1.5 A, 2.4 A, 3.4 A, 4.8 A, 6.2 A, 6.8 A or higher combination and charging capacity.
13. The Quickly USB charging ports assembly for lighting device, the said USB charging-port(s) has different circuit including (1) outside device's housing transformer, adaptor, invertor, converter's is circuit-kit (2) inside the device's housing to change AC to DC current is circuit-inner (3) inside the device's housing for other added functions is circuit-inside and all these different circuits has number 1 to N (any number) depend on functions, performance, effects needed.
14. The Quick USB charging ports assembly for lighting device, the said only one input power source, the said USB charging-port(s) only take output-end's DC current from
    (1) the circuit-inner while without the outside device's housing transformer; or
    (2) circuit-kits while has the outside device's housing transformer.
15. The Quick USB charging ports assembly for lighting device, the said light device further incorporate with Outlet-unit or Outlet-Module to SUPPLY the AC current directly though only conductive-kits or assembly from the outlet receiving port(s) to the other electric or digital device's has conductive prongs and the said Outlet-unit or outlet-module install within or on anywhere the light device.
16. The Quick USB charging ports assembly for lighting device, the said USB charging-port(s) and outlet-unit has desire combinations to assembly together to form the said USB-Module or Outlet-Module or Universal Unit or Sealed-Unit which has desire number or USB Charging-ports and Outlet-unit has ground pin or without ground pin.
17. The Quick USB charging ports assembly for lighting device, the said light device has added outlet-unit which has number 1 to N (any number) and has surge-protection for number over the 3 or more to offer the more safety.
18. The Quick USB charging ports assembly for lighting device, the said USB charging-ports or/and Outlet-units can arrange on any parts of the said lighting device including base, pole, bar, stand, stationer-organizer, added housing construction, clips.
19. The Quick USB charging ports assembly for lighting device, the said lighting device light source is a built-in LED(s), CFL, Power saving bulb, separated LED bulb, Florescent tube, LED tube, EL, OEL or other market available light source.
20. The Quick USB charging ports assembly for lighting device, the said lighting device optional add more other electric parts & accessories to make more useful items including timer, remote controller, dimmer, color changing, remote controller, wireless controller, APP controller, Wife communication, Wife controller, motion sensor, switch, remote controller, master power controller, Anti-Glare filter prevent from reflective effects.
21. The Quickly USB charging ports assembly for lighting device, the said lighting device is a floor lamp has the USB charging-port on the anywhere of housing, base, added desk, bar, stand, pole and has number of outlets on the base or stand number from 1 to N (any number) so work as power strip has outlets up to N with optional surge protection and has only one wire with AC-Plug to plug-into Wall 22. A Quick USB charging-ports assembly for digital alarm clock or time related device, consist of;
    At least one of USB charging-ports has minimum 1.0 A up to 5.0 Amp charging capacity and specification released on 2007 and update on 2010.
    The said USB charging-ports only has charging function without any electric or digital data transmit or delivery.
    A circuit incorporate with the said USB charging-port(s) and only has one input power source and the said circuit supply DC current to charge the energy storage unit or assembly including battery, batteries, rechargeable battery inside the said other electric or digital data product(s) though an outside housing's USB-wire has at least 2 male plugs to connect with USB charging-ports and be-charged product's USB receiving-ports to deliver the DC current.
    The said USB charging-port(s) is universal type can fit for all different USB-Wire at least one of plug(s) so can charge all different be-charged device(s).
    A digital alarm clock or time related device has housing with opening to install the USB charging port(s).
23. The Quick USB charging ports assembly for digital alarm clock or time related device, the said power source is from outside the digital alarm clock or time related device housing's AC to DC transformer, adaptor, converter, invertor which has circuit-kits inside to change the AC current to DC current.
24. The Quick USB charging ports assembly for digital alarm clock or time related device, the said power source is from outside digital alarm clock or time related device housing's AC wall outlet and get power by the AC plug and wire to the light device inner-circuit which has transformer, invertor, adaptor, converter assembly inside and change the input AC current to DC current.
25. The Quick USB charging ports assembly for digital alarm clock or time related device, the said device has LED or LEDs to offer at least one function select from illumination, indicator light, lighted image, project image, time display, charging status, date or/and calendar display, temperature display, message display.
26. The Quick USB charging ports assembly for digital alarm clock or time related device, the said device has non-LED light source to offer illumination indicator light, lighted image, project image, time display, charging status, date or/and calendar display, temperature display, message display.
27. The Quick USB charging ports assembly for digital alarm clock or time related device, the said light device housing including light device's base, stationary construction, compartment, organizer, holder for phone or iPad or power-bank, be-charged products, or other housing arrangement has space.
28. The Quickly USB charging ports assembly for digital alarm clock or time related device, the said circuit has more than one circuit-inside for transformer, invertor, adaptor, converter inside the light device's housing that not only supply the DC current to the USB charging-ports but also arrange the power to the other functions including light source, LED, time display, message display, wireless communication, image display, timer, date/calendar/weather display, temperature/humility display, radio, music, audio device, alarm device, speaker device, remote controller, Wi-Fi controller, image controller, IP cam, infra-red controller, wireless communication controller.
29. The Quickly USB charging ports assembly for digital alarm clock or time related device, the said digital alarm clock or time piece device is one of clock, LED time piece, LED segments has 8 construction, time piece has audio parts & accessories, wall clock, night light time piece, desktop item has time display products, desktop time piece, digital alarm time piece, alarm clock, digital or analog time piece.
30. The Quick USB charging ports assembly for digital alarm clock or related piece, the said other electric or digital products is a communication equipment, computer equipment, consumer electric products which has the DC energy storage unit or assembly inside the products and can be rechargeable.
31. The Quick USB charging ports assembly for digital alarm clock or time related device, the said USB charging-port is a type A construction which same as majority of laptop computer USB port but has minimum 1.0 A up to 5 Amp or higher charging capacity.
32. The Quick USB charging ports assembly for digital alarm clock or time related device, the said USB receiving-port of the said be-charged products which can be any kind of construction and size has its custom-pin which need as compact as possible including compact USB, Mini USB, Micro USB for compact size so can make be-charged device thinner, smaller, slim as much as possible.
33. The Quickly USB charging ports assembly for digital alarm clock or time related device, the said USB charging-port(s) number from 1 to N (any number) and has relative number of the AC to DC circuit-kits of outside device's housing or AC to DC circuit-inner to match the desire charging capacity to have 1.0 A, 2.1 A, 3.1 A, 4.2 A, 1.5 A, 2.4 A, 3.4 A, 4.8 A, 6.2 A, 6.8 A or higher combination and charging capacity.
34. The Quickly USB charging ports assembly for digital alarm clock or time related device, the said USB charging-port(s) has different circuit including (1) outside device's housing transformer, adaptor, invertor, converter's is circuit-kit (2) inside the device's housing to change AC to DC current is circuit-inner (3) inside the device's housing for other added functions is circuit-inside and all these different circuits has number 1 to N (any number) depend on functions, performance, effects needed.
35. The Quick USB charging ports assembly for digital alarm clock or time related device, the said only one input power source, the said USB charging-port(s) only take output-end's DC current from
    (3) the circuit-inner while without the outside device's housing transformer; or
    (4) circuit-kits while has the outside device's housing transformer.
36. The Quick USB charging ports assembly for digital alarm clock or time related device, the said device further incorporates with Outlet-unit or Outlet-Module to SUPPLY the AC current directly though only conductive-kits or assembly from the outlet to the other electric or digital device has conductive prongs equipment and the said Outlet-unit or outlet-module install within or on anywhere the device.
37. The Quick USB charging ports assembly for digital alarm clock or time related device, the said USB charging-port(s) and outlet-unit has desire combinations to assembly together to form the said USB-Module or Outlet-Module or Universal Unit or Sealed-Unit which has desire number or USB Charging-ports and Outlet-unit has ground pin or without ground pin.

38. The Quick USB charging ports assembly for digital alarm clock or time related device, the said device has added outlet-unit which has number 1 to N (any number) and has surge-protection for number over the 3 or more to offer the more safety.

39. The Quickly USB charging ports assembly for digital alarm clock or time related device, the said USB charging-ports or/and Outlet-units can arrange on any parts of the said device including housing, body, stationer-organizer, added housing construction, holder for communication or computer or consumer products, holder for power-bank which offer the DC power from its output end to be charged products and power-bank can be-charged by said USB charging-ports at input end.

40. The Quick USB charging ports assembly for digital alarm clock or time related device, the said device light source is a built-in LED(s), liquid crystal display, CFL, Power saving bulb, separated LED bulb, Florescent tube, LED tube, EL, OEL or other market available light source.

41. The Quickly USB charging ports assembly for digital alarm clock or time related device, the said device optional add more other electric parts & accessories to make more useful items including timer, remote controller, dimmer, color changing, remote controller, wireless controller, APP controller, Wife communication, Wife controller, motion sensor, switch, remote controller, master power controller, Anti-Glare filter prevent from reflective effects, audit device, speaker, equalizer, temperature display, weather display, music, alarm, or other functions which available from market place for all kind of time piece.

42. The Quickly USB charging ports assembly for digital alarm clock or time related device, the said device is a time related product has the USB charging-port on the anywhere of housing, base and has number of outlets on the base or housing with number from 1 to N (any number) so work as power strip has outlets up to N with optional surge protection and has only one wire with AC-Plug to plug-into Wall.

43. Quickly USB charging ports assembly for lighting device, consist of;
    A USB charging ports has minimum 1.0 A up to 5.0 Amp charging capacity and specification released on 2007 and update on 2010.
    The USB charging ports only has charging function without any electric or digital data transmit or delivery.
    A circuit incorporate with USB charging port(s) and only has one input power source and supply DC current to charge the energy storage unit or assembly including battery, batteries, rechargeable battery inside the said other electric or digital data product(s).
    The circuit incorporate with an outside housing's USB wire has at least 2 male plugs to connect with USB charging-ports and be-charged product's USB receiving-ports to deliver the DC current and one of two male plug is compact, thin, narrow, cute, small size to connect with be-charged products USB receiving-ports prefer select from mini-USB, micro-USB, Type C USB or market place for smaller, thinner, compact size so to match thinner be-charged products.
    A lighting device has housing and bar, stand, base, pole, clipper, holder with opening to install the USB charging port(s) for quickly charging.

44. Quickly USB charging ports assembly for lighting device, the said device housing, bar, stand, base, pole, base, clipper, holder has opening to install the Outlet-unit(s) or Outlet-Module(s) or USB-unit(s) or USB-Module(s) or USB universal kits or USB sealed-unit.

45. Quickly USB charging ports assembly for lighting device, the said USB-unit, USB-module, Outlet-unit, Outlet-module, USB Universal kits, USB sealed-unit can have number from 1 to N (any number).

46. Quickly USB charging ports assembly for lighting device, the said clipper has spring device so can clip the variety desk, table, bed, tube, bar, post, edge so can install the desktop lighting device on many place where has the thickness equal or less than clipper's two arms opening width.

47. Quickly USB charging ports assembly for lighting device, the said lighting device which has at least one of light source select from built-in LED(s), Screw in or snap-in or fit tight LED bulb, CFL, Energy Saving Bulb, Florescent tube, LED tube, EL, OEL, Organic EL elements or light panel or light piece.

48. Quickly USB charging ports assembly for lighting device, the said lighting device for desk, floor, wall, ceiling, landscape, ground, table, bed, moving table, bed cushion table, or any flat surface can put lighting device without vibration to make the lighting device to fall.

49. Quickly USB charging ports assembly for lighting device, the said USB charging-port(s) of USB-unit or USB-Module or Outlet-Module or Universal unit or Sealed-unit is type A or the type to incorporate with USB-wire which has at least one male plug out of at least two male plug is Type A.

50. Quickly USB charging ports assembly for lighting device, the said USB wire has at least two male plugs one prefers TYPE A and the other prefer is mini-USB or micro-USB or Type C USB has smaller, compact, thin, narrow USB construction but quickly charging and bigger charging capacity.

51. Quickly USB charging ports assembly for lighting device, the said light device has optic film added to prevent reflection from the LED, LEDs, LED Bulb or other light source.

52. Quickly USB charging ports assembly for lighting device, the said outlet-unit or outlet-module has added surge protection, or master controller or wireless communication by Wife, APP, remote controller, infra-red, RF remote, timer, time delay, dimmer, color changing, brightness controller functions or features.

53. Quickly USB charging ports assembly for lighting device, the said lighting device incorporate with switch, sensor, motion sensor, timer, to turn on and turn off the lighting device.

54. A Quick USB charging-ports assembly for lighted cosmetic mirror device, consist of;
    At least one of USB charging-ports has minimum 1.0 A up to 5.0 Amp charging capacity and specification released on 2007 and update on 2010.
    The said USB charging-ports only has charging function without any electric or digital data transmit or delivery.
    A circuit incorporate with the said USB charging-port(s) and only has one input power source and the said circuit supply DC current to charge the energy storage unit or assembly including battery, batteries, rechargeable battery inside the said other electric or digital data product(s) though outside housing and individual USB-wire has at least 2 male plugs to connect with USB charging-ports and be-charged product's USB receiving-ports to deliver the DC current.

The said USB charging-port(s) is universal type can fit for all different USB-Wire at least one of plug(s) so can charge all different be-charged device (s).

A lighted cosmetic mirror device has image related function including magnify, reflective face, reflective body, reflect objects with light source to see under dark environment has housing with opening to install the USB charging port(s).

55. The Quick USB charging ports assembly for lighted cosmetic mirror device has image related function, the said power source is from outside the device housing's AC to DC transformer, adaptor, converter, invertor which has circuit-kits inside to change the AC current to DC current.

56. The Quick USB charging ports assembly for lighted cosmetic mirror device has Image related function, the said power source is from outside Image related device housing's AC wall outlet and get power by the AC plug and wire to the device inner-circuit which has transformer, invertor, adaptor, converter assembly inside and change the input AC current to DC current.

57. The Quick USB charging ports assembly for lighted cosmetic mirror device has Image related function, the said device has LED or LEDs to offer at least one function select from illumination, indicator light, lighted image, project image, time display, charging status, date or/and calendar display, temperature display, message display, color changing, brightness changing, dimmer the light brightness.

58. The Quick USB charging ports assembly for lighted cosmetic mirror device has Image related function, the said device has non-LED light source to offer illumination, indicator light, lighted image, project image, time display, charging status, date or/and calendar display, temperature display, message display, different color of light, different brightness, dimmer the light brightness.

59. The Quickly USB charging ports assembly for lighted cosmetic mirror device has Image related function, the said light device housing has at least one parts or desire combination select from light device's mirror, reflective surface, reflective and magnify kits or assembly, magnify lens, optics lens, optics assembly, base, bar, stand, pole, hook, stationary construction, compartment, compartment for the install all electric parts & accessories, organizer, holder for phone or iPad or power-bank, be-charged products, or other housing arrangement has space.

60. The Quickly USB charging ports assembly for lighted cosmetic mirror device has Image related function, the said circuit has more than one of circuit-kits, or circuit-inner, there has other circuit-inside which beside the said transformer, invertor, adaptor, converter fit inside of the light device's housing or outside-housing so that the device is not only supply the DC current to the USB charging-ports but also arrange the power to the other functions including light source, LED, time display, message display, wireless communication, image display, timer, date/calendar/weather display, temperature/humility display, radio, music, audio device, alarm device, speaker device, remote controller, Wi-Fi controller, image controller, IP cam, infra-red controller, wireless communication controller.

61. The Quickly USB charging ports assembly for lighted cosmetic mirror device has Image related function, the said lighted cosmetic mirror device has image related function is one device has desire combination select from desktop mirror, wall mounted mirror, time piece, LED segments has 8 construction, time piece has audio parts & accessories, clock, night light, desktop item has reflective mirror-like surface and functions, desktop time piece, digital alarm time piece, alarm clock, digital or analog time piece, weather station, radio.

62. The Quick USB charging ports assembly for lighted cosmetic mirror device has Image related function, the said other electric or digital products is a communication equipment, computer equipment, consumer electric products which has the DC energy storage unit or assembly inside the products and can be rechargeable.

63. The Quick USB charging ports assembly for lighted cosmetic mirror device has Image related function, the said USB charging-port is a type A construction which same as majority of laptop computer USB port(s) but has minimum 1.0 A up to 5 Amp or higher charging capacity and do not allow has data delivery.

64. The Quick USB charging ports assembly for lighted cosmetic mirror device has image related function, the said USB receiving-port of the said be-charged products which can be any kind of construction and size has its custom-pin which need as compact as possible including compact USB, Mini USB, Micro USB for compact size so can make be-charged device thinner, smaller, slim as much as possible.

65. The Quickly USB charging ports assembly for lighted cosmetic mirror device has Image related function, the said USB charging-port(s) number from 1 to N (any number) and has relative number of the AC to DC circuit-kits of outside device's housing or AC to DC circuit-inner to match the desire charging capacity to have 1.0 A, 2.1 A, 3.1 A, 4.2 A, 1.5 A, 2.4 A, 3.4 A, 4.8 A, 6.2 A, 6.8 A or higher combination and charging capacity.

66. The Quickly USB charging ports assembly for lighted cosmetic mirror device has Image related function, the said device has different circuit including (1) outside device's housing transformer, adaptor, invertor, converter's is circuit-kit (2) inside the device's housing to change AC to DC current is circuit-inner (3) inside the device's housing for other added functions is circuit-inside and all these different circuits has number 1 to N (any number) depend on functions, performance, effects needed.

67. The Quick USB charging ports assembly for lighted cosmetic mirror device has Image related function, the said only one input power source, the said USB charging-port(s) only take output-end's DC current from
(5) the circuit-inner while without the outside device's housing transformer; or
(6) circuit-kits while has the outside device's housing transformer.

68. The Quick USB charging ports assembly for lighted cosmetic mirror device has Image related function, the said device further incorporates with Outlet-unit or Outlet-Module to SUPPLY the AC current directly though only conductive-kits or assembly from the outlet to the other electric or digital product(s) has conductive prongs equipment(s) and the said Outlet-unit or outlet-module install within or on anywhere the device.

69. The Quickly USB charging ports assembly for lighted cosmetic mirror device has Image related function, the other electric or digital product(s) for AC outlet-unit or AC Outlet-module is one of the cosmetic related kits including but not limited from listed items including a hair-dryer, hair-related tools with electricity to drive, curing hair heater, electric fan, skin repair of polisher equipment, moisture machine, humility machine, or any machine, tools, kits, equipment for people to make cosmetic purpose for face, hair, body, skin, hand, foot, leg, arms which need to use AC power source all belong to cosmetic related kits.

70. The Quickly USB charging ports assembly for lighted cosmetic mirror device has Image related function, the said outlet-unit or outlet-module or universal unit or sealed units has Outlet receiving ports which may drive different cosmetic related kits and supply the AC current up to 1,850 Watt for hair dryer, 1,650 Wall for normal electric device or any other bigger or lower Watt needed for people while people use the Lighted cosmetic mirror device.

71. The Quick USB charging ports assembly for lighted cosmetic mirror device has Image related function, the said USB charging-port(s) and outlet-unit has desire combinations to assembly together to form the said USB-Module or Outlet-Module or Universal Unit or Sealed-Unit which has desire number or USB Charging-ports and Outlet-unit has ground pin or without ground pin.

72. The Quick USB charging ports assembly for lighted cosmetic mirror device has Image related function, the said device has added outlet-unit which has number 1 to N (any number) and has surge-protection for number over the 3 or more to offer added surge protection circuit or the over-heat breaker circuit or the said over-load circuit, current leakage circuit for the more safety.

73. The Quickly USB charging ports assembly for lighted cosmetic mirror device has Image related function, the said USB charging-ports or/and Outlet-units can arrange on any parts of the said device including housing, body, stationer-organizer, added housing construction, holder for communication or computer or consumer products, holder for power-bank which offer the DC power from its output end to be charged products and power-bank can be-charged by said USB charging-ports at input end.

74. The Quickly USB charging ports assembly for lighted cosmetic mirror device has Image related function, the said device light source is a built-in LED(s), CFL, Power saving bulb, separated LED bulb, Florescent tube, cold cathode tube, LED tube, EL, OEL or other market available light source.

75. The Quickly USB charging ports assembly for lighted cosmetic mirror device has Image related function, the said device optional add more other electric parts & accessories to make more useful items including timer, remote controller, dimmer, color changing, remote controller, wireless controller, APP controller, Wife communication, Wife controller, motion sensor, switch, remote controller, master power controller, Anti-Glare filter prevent from reflective effects, audit device, speaker, equalizer, temperature display, weather display, music, alarm, or other functions which available from market place for all kind of time piece.

76. The Quickly USB charging ports assembly for lighted cosmetic mirror device has Image related function, the said device is a lighted cosmetic mirror product has the USB charging-port on the anywhere of housing, base and has number of outlets on the base or housing with number from 1 to N (any number) so work as power strip has outlets up to N with optional surge protection and has only one wire with AC-Plug to plug-into Wall.

77. Quickly USB charging ports assembly for lighting device, consist of;

A USB charging ports has minimum 1.0 A up to 5.0 Amp charging capacity and specification released on 2007 and update on 2010.

The USB charging ports only has charging function without any electric or digital data transmit or delivery.

A circuit incorporate with USB charging port(s) and only has one input power source and supply DC current to charge the energy storage unit or assembly including battery, batteries, rechargeable battery inside the said other electric or digital data product(s).

The said circuit incorporate with an outside housing's and separated USB wire has at least 2 male plugs to connect with USB charging-ports and be-charged product's USB receiving-ports to deliver the DC current and one of two male plug is compact, thin, narrow, cute, small size to connect with be-charged products USB receiving-ports prefer select from mini-USB, micro-USB, Type C USB or market place for smaller, thinner, compact size so to match thinner be-charged products.

A lighting device has housing and bar, stand, base, pole, clipper, holder with opening to install the USB charging port(s) for quickly charging.

78. Quickly USB charging ports assembly for lighting device, the said device housing, bar, stand, base, pole, base, clipper, holder has opening to install the Outlet-unit(s) or Outlet-Module(s) or USB-unit(s) or USB-Module(s) or USB universal kits or USB sealed-unit.

79. Quickly USB charging ports assembly for lighting device, the said USB-unit, USB-module, Outlet-unit, Outlet-module, USB Universal kits, USB sealed-unit can have number from 1 to N (any number).

80. Quickly USB charging ports assembly for lighting device, the said clipper has spring device so can clip the variety desk, table, bed, tube, bar, post, edge so can install the desktop lighting device on many place where has the thickness equal or less than clipper's two arms opening width.

81. Quickly USB charging ports assembly for lighting device, the said lighting device which has at least one of light source select from built-in LED(s), Screw in or snap-in or fit tight LED bulb, CFL, Energy Saving Bulb, Florescent tube, LED tube, EL, OEL, Organic EL elements or light panel or light piece.

82. Quickly USB charging ports assembly for lighting device, the said lighting device for desk, floor, wall, ceiling, landscape, ground, table, bed, moving table, bed cushion table, or any flat surface can put lighting device without vibration to make the lighting device to fall.

83. Quickly USB charging ports assembly for lighting device, the said USB charging-port(s) of USB-unit or USB-Module or Outlet-Module or Universal unit or Sealed-unit is type A or the type to incorporate with USB-wire which has at least one male plug out of at least two male plug is Type A.

84. Quickly USB charging ports assembly for lighting device, the said USB wire has at least two male plugs one prefers TYPE A and the other prefer is mini-USB or micro-USB or Type C USB has smaller, compact, thin, narrow USB construction but quickly charging and bigger charging capacity.

85. Quickly USB charging ports assembly for lighting device, the said light device has optic film added to prevent reflection from the LED, LEDs, LED Bulb or other light source.

86. Quickly USB charging ports assembly for lighting device, the said outlet-unit or outlet-module has added surge protection, or master controller or wireless communication by Wife, APP, remote controller, infra-red, RF remote, timer, time delay, dimmer, color changing, brightness controller functions or features.

87. Quickly USB charging ports assembly for lighting device, the said lighting device incorporate with switch, sensor, motion sensor, timer, to turn on and turn off the lighting device.

88. A Quickly USB charging-ports assembly for desktop power station device, consist of;
    At least one of USB charging-ports has minimum 1.0 A up to 5.0 Amp charging capacity and specification released on 2007 and update on 2010.
    The said USB charging-ports only has charging function without any electric or digital data transmit or delivery.
    A circuit incorporate with the said USB charging-port(s) and only has one input power source and the said circuit supply DC current to charge the energy storage unit or assembly including battery, batteries, rechargeable battery inside the said other electric or digital data product(s) though outside housing and separated USB-wire which has at least 2 male plugs to connect with USB charging-ports and be-charged product's USB receiving-ports to deliver the DC current.
    The said USB charging-port(s) is universal type can fit for all different USB-Wire at least one of plug(s) so can charge all different be-charged device (s).
    A desktop power station device has more than one power charging or-and supplying function including more than one receiving-port(s) to connect different other products' plug or insert-end or prongs or add extra function(s) select from lighting, LED(s), illumination, controller, wireless communication, motion detection, surge protection, leakage current function, overheat function and device, charging status indicator and device has housing with opening to install the USB charging port(s) and other receiving-ports for other functions.

89. The Quickly USB charging ports assembly for desktop power station device, the said power source is from outside the device housing's AC to DC transformer, adaptor, converter, invertor which has circuit-kits inside to change the AC current to DC current.

90. The Quickly USB charging ports assembly for desktop power station device, the said power source is from outside device housing's AC wall outlet and get power by the AC plug and wire to the device inner-circuit which has transformer, invertor, adaptor, converter assembly inside and change the input AC current to DC current.

91. The Quickly USB charging ports assembly for desktop power station device, the said device has LED or LEDs to offer at least one function select from illumination, indicator light, lighted image, project image, time display, charging status, date or/and calendar display, temperature display, message display, color changing, brightness changing, dimmer the light brightness.

92. The Quickly USB charging ports assembly for desktop power station device, the said device has extra lighting which is a non-LED light source to offer illumination, indicator light, lighted image, project image, time display, charging status, date or/and calendar display, temperature display, message display, different color of light, different brightness, dimmer the light brightness.

93. The Quickly USB charging ports assembly for desktop power station device, the said device housing has at least one parts or desire combination select from device's plurality of AC outlets, female receiving-ports for mail plug, insert-end, prong, connector, adaptor to build the electric signal delivery, audio connector, video connector, wireless communication receiver or transmitter, Bluetooth sets, wife set, base, bar, stand, stationary construction or organizer, compartment, compartment for the install all electric parts & accessories, organizer, holder for phone or iPad or power-bank, be-charged products, or other housing arrangement has space.

94. The Quickly USB charging ports assembly for desktop power station device, the said circuit has more than one of circuit-kits, or circuit-inner, there has other circuit-inside which beside the said transformer, invertor, adaptor, converter fit inside of the device's housing or outside-housing so that the device is not only supply the DC current to the USB charging-ports but also arrange the power to the other functions including light source, LED, time display, message display, wireless communication, image display, timer, date/calendar/weather display, temperature/humility display, radio, music, audio device, alarm device, speaker device, remote controller, Wi-Fi controller, image controller, IP cam, infra-red controller, wireless communication controller.

95. The Quickly USB charging ports assembly for desktop power station device, the said desktop power station device has power charging or-and supplying function is one device has desire combination select from USB charger, AC Power supplier, time piece, LED segments has 8 construction, time piece has audio parts & accessories, clock, night light, working light, digital alarm time piece, alarm clock, digital or analog time piece, weather station, radio, temperature, fan, video device, wireless communication equipment such as wife, APP, screen, TV.

96. The Quickly USB charging ports assembly for desktop power station device, the said other electric or digital products is a communication equipment, computer equipment, consumer electric products which has the DC energy storage unit or assembly inside the products and can be rechargeable.

97. The Quickly USB charging ports assembly for desktop power station device, the said USB charging-port is a type A construction which same as majority of laptop computer USB port(s) but has minimum 1.0 A up to 5 Amp or higher charging capacity and do not allow has data delivery.

98. The Quickly USB charging ports assembly for desktop power station device, the said USB receiving-port of the said be-charged products which can be any kind of construction and size has its custom-pin which need as compact as possible including compact USB, Mini USB, Micro USB for compact size so can make be-charged device thinner, smaller, slim as much as possible.

99. The Quickly USB charging ports assembly for desktop power station device, the said USB charging-port(s) number from 1 to N (any number) and has relative number of the AC to DC circuit-kits of outside device's housing or AC to DC circuit-inner to match the desire charging capacity to have 1.0 A, 2.1 A, 3.1 A, 4.2 A, 1.5 A, 2.4 A, 3.4 A, 4.8 A, 6.2 A, 6.8 A or higher combination and charging capacity.

100. The Quickly USB charging ports assembly for desktop power station device, the said device has different circuit including (1) outside device's housing transformer, adaptor, invertor, converter's is circuit-kit (2) inside the device's housing to change AC to DC current is circuit-inner (3) inside the device's housing for other added functions is circuit-inside and all these different circuits has number 1 to N (any number) depend on functions, performance, effects needed.

101. The Quickly USB charging ports assembly for desktop power station device, the said only one input power source, the said USB charging-port(s) only take output-end's DC current from
   (7) the circuit-inner while without the outside device's housing transformer; or
   (8) circuit-kits while has the outside device's housing transformer.
102. The Quickly USB charging ports assembly for desktop power station device, the said device further incorporates with Outlet-unit or Outlet-Module to SUPPLY the AC current directly though only conductive-kits or assembly from the outlet to the other electric or digital product(s) has conductive prongs equipment(s) and the said Outlet-unit or outlet-module install within or on anywhere the device.
103. The Quickly USB charging ports assembly for desktop power station device, the other electric or digital product(s) for AC outlet-unit or AC Outlet-module is one of the cosmetic related kits including but not limited from listed items including a hair-dryer, hair-related tools with electricity to drive, curing hair heater, electric fan, skin repair of polisher equipment, machine, electric tools, or any machine, tools, kits, equipment for people to work which need to use AC power source.
104. The Quickly USB charging-ports assembly for desktop power station device, the said outlet-unit or outlet-module or universal unit or sealed units has Outlet receiving ports which may drive different machine, tools, kits and supply the AC current up to 1,850 Watt, 1,650 Wall for normal electric device or any other bigger or lower Watt needed for people while people use the equipment, machine, electric products.
105. The Quickly USB charging ports assembly for desktop power station device, the said USB charging-port(s) and outlet-unit has desire combinations to assembly together to form the said USB-Module or Outlet-Module or Universal Unit or Sealed-Unit which has desire number or USB Charging-ports and Outlet-unit has ground pin or without ground pin.
106. The Quickly USB charging ports assembly for desktop power station device, the said device has added outlet-unit which has number 1 to N (any number) and has surge-protection for number over the 3 or more to offer added surge protection circuit or the over-heat breaker circuit or the said over-load circuit, current leakage circuit for the more safety.
107. The Quickly USB charging ports assembly for desktop power station device, the said USB charging-ports or/and Outlet-units can arrange on any parts of the said device including housing, body, stationer-organizer, added housing construction, holder for communication or computer or consumer products, holder for power-bank which offer the DC power from its output end to be charged products and power-bank can be-charged by said USB charging-ports at input end.
108. The Quickly USB charging ports assembly for desktop power station device, the said device light source is a built-in LED(s), CFL, Power saving bulb, separated LED bulb, Florescent tube, cold-cathode tube, LED tube, EL, OEL or other market available light source.
109. The Quickly USB charging ports assembly for desktop power station device, the said device optional add more other electric parts & accessories to make more useful items including timer, remote controller, dimmer, color changing, remote controller, wireless controller, APP controller, Wife communication, Wife controller, motion sensor, switch, remote controller, master power controller, Anti-Glare filter prevent from reflective effects, audit device, speaker, equalizer, temperature display, weather display, music, alarm, or other functions which available from market place for all kind of time piece.
110. The Quickly USB charging ports assembly for desktop power station device, the said device has the USB charging-port on the anywhere of housing, base and has number of outlets on the base or housing with number from 1 to N (any number) so work as power strip has outlets up to N with optional surge protection and has only one wire with AC-Plug to plug-into Wall.
111. Quickly USB charging ports assembly for lighting device, consist of;
   A USB charging ports has minimum 1.0 A up to 5.0 Amp charging capacity and specification released on 2007 and update on 2010.
   The USB charging ports only has charging function without any electric or digital data transmit or delivery.
   A circuit incorporate with USB charging port(s) and only has one input power source and supply DC current to charge the energy storage unit or assembly including battery, batteries, rechargeable battery inside the said other electric or digital data product(s).
   The said USB charging-ports incorporate with an outside housing's USB wire has at least 2 male plugs to connect with USB charging-ports and be-charged product's USB receiving-ports to deliver the DC current and one of two male plug is compact, thin, narrow, cute, small size to connect with be-charged products USB receiving-ports prefer select from mini-USB, micro-USB, Type C USB or market place for smaller, thinner, compact size so to match thinner be-charged products.
   A lighting device has housing and bar, stand, base, pole, clipper, holder with opening to install the USB charging port(s) for quickly charging.
112. Quickly USB charging ports assembly for lighting device, the said device housing, bar, stand, base, pole, base, clipper, holder has opening to install the Outlet-unit(s) or Outlet-Module(s) or USB-unit(s) or USB-Module(s) or USB universal kits or USB sealed-unit.
113. Quickly USB charging ports assembly for lighting device, the said USB-unit, USB-module, Outlet-unit, Outlet-module, USB Universal kits, USB sealed-unit can have number from 1 to N (any number).
114. Quickly USB charging ports assembly for lighting device, the said clipper has spring device so can clip the variety desk, table, bed, tube, bar, post, edge so can install the desktop lighting device on many place where has the thickness equal or less than clipper's two arms opening width.
115. Quickly USB charging ports assembly for lighting device, the said lighting device which has at least one of light source select from built-in LED(s), Screw in or snap-in or fit tight LED bulb, CFL, Energy Saving Bulb, Florescent tube, LED tube, EL, OEL, Organic EL elements or light panel or light piece.
116. Quickly USB charging ports assembly for lighting device, the said lighting device for desk, floor, wall, ceiling, landscape, ground, table, bed, moving table, bed cushion table, or any flat surface can put lighting device without vibration to make the lighting device to fall.
117. Quickly USB charging ports assembly for lighting device, the said USB charging-port(s) of USB-unit or USB-Module or Outlet-Module or Universal unit or Sealed-unit is type A or the type to incorporate with USB-wire which has at least one male plug out of at least two male plug is Type A.
118. Quickly USB charging ports assembly for lighting device, the said USB wire has at least two male plugs one prefers TYPE A and the other prefer is mini-USB or micro-USB or Type C USB has smaller, compact, thin, narrow USB construction but quickly charging and bigger charging capacity.
119. Quickly USB charging ports assembly for lighting device, the said light device has optic film added to prevent reflection from the LED, LEDs, LED Bulb or other light source.
120. Quickly USB charging ports assembly for lighting device, the said outlet-unit or outlet-module has added surge protection, or master controller or wireless communication by Wife, APP, remote controller, infra-red, RF remote, timer, time delay, dimmer, color changing, brightness controller functions or features.
121. Quickly USB charging ports assembly for lighting device, the said lighting device incorporate with switch, sensor, motion sensor, timer, to turn on and turn off the lighting device.
122. Quickly USB charging ports assembly for lighting device, consist of;
   At least one of USB charging-ports has minimum 1.0 A up to 5.0 Amp around DC 5 Volt or has desire combination for 1.0 A, 2.1 A, 1.2 A, 2.4 A, 3.1 A, 3.6 A, 4.2 A, 4.8 A or other combination for Big Amperage output-current to get quickly charger function and not overheat caused high voltage from transformer output-end to charge the battery.
   The USB charging ports only has charging function without any electric or digital data transmit or delivery.
   At least one of circuit-kits inside the outside housing or circuit-inner inside the lighting device housing and both incorporate with the said USB charging port(s) and only has one input power-source and the said circuit supply DC current to charge the energy storage unit or assembly including battery, batteries, rechargeable battery inside the said other electric or digital data product(s) though outside housing's USB-wire has at least 2 male plugs to connect with USB charging-ports and be-charged product's USB receiving-ports to deliver the DC current.
   The $2^{nd}$ or more circuit-inside which inside the Light device's housing to supply the power to the said added functions beside the USB Charging-ports and the said $2^{nd}$ or more circuit-inside has electric parts & accessories or $2^{nd}$ transformer to get enough electric current which current needed is bigger than USB Charger needed to said plurality LEDs or plurality different color LEDs or other light source, dinner, switch, motion sensor, remote controller, PIR sensor, or Time display, alarm, controller, wireless communication device, wireless controller, IR photo diode, IP cam, or other market available electric functions to prevent from overheat by one of the transformer to supply the Big Amperage of current to Quickly USB Charging-port and the Plurality of different colors LEDs.
   The said USB charging-port(s) is universal type can fit for all different USB-Wire at least one of plug(s) so can charge all different be-charged device (s).
   The circuit incorporate with an outside housing's USB wire has at least 2 male plugs to connect with USB charging-ports and be-charged product's USB receiving-ports to deliver the DC current and one of two male plug is compact, thin, narrow, cute, small size to connect with be-charged products USB receiving-ports prefer select from mini-USB, micro-USB, Type C USB or market place for smaller, thinner, compact size so to match thinner be-charged products.
   A lighting device has housing and bar, stand, base, pole, clipper, holder with opening to install the USB charging port(s) for quickly charging.

The above 122 features for different MAIN DEVICE are fall within the PARENT Filing for desktop items definition which has functions as description as below:
   desk top item function means in said desk top item housing for providing at least one of the following functions: a display of light beams from the LED, projection, an image, projection of a time image, clock functions, illumination of an area, playing of music, serving as a source of power or electric signals, display of photos, transmission of digital signals, providing air flow at a desired temperature, generating moisture, steam, or smells, dispensing liquid, brewing coffee/tea, preparing food, and displaying charging status;

To enable people to easily reach, touch, operate, or manage the desk top items, the USB-unit(s) or USB-module(s) are installed on or within the item or a substrate(s). The items may be positioned at a location where people will stay for a period, such as a desk, table, bed, chair, land, grass, or wherever else people work, rest, or take a nap. For example, people use a computer, laptop computer, iPhone™, iPad™, or iCloud™ on a substrate(s), location, or place such as a table, desk, bed, laptop stand, laptop supporter, laptop cushion or any similar surface(s) which allows people to work, sleep, or lay down for a period while charging other electric or digital data device(s).

In all such places where people will stay for period of time, the nearby desk top items with LED means and built-in USB-units easily offer electric power to all other electric or digital data device(s), so people do not need to bend the body to find a power source under the table, which normally is farther away than the desk top items having LED means. Hence, this arrangement offers good convenience for people while they work, rest, or even take a nap, so that they can easily use the USB-unit(s) or USB-module of the desk top items with LED means to charge their small phone, computer, iPad™, or any other electric or digital data device(s) while they work, rest, sleep or take a nap.

It is appreciated all the above discussion, background, brief, details description or alternative, replaceable, equal function, similar concept for quickly USB Charing-port which has initial public specification to overcome the overheating, overcome problem cause while had electric or digital data delivery, overcome only can charge one certain be-charged device because the USB port has male plug with custom-pin arrangement which not fit for variety of the be-charged device(s) so cause big return for not universal, or the more than 2 power source input to the same USB port which will make cost increased and consumer confused with expensive circuit board, so the current inventions same as the parent filing cases as above listed and has the minimum 1.0 Amp to 5 Amp or higher with safety USB charging-ports which can allow Big current passing though without heat problems to prevent overheating and cause the unit risk to fire and quickly charging capacity to save people waiting time is the most important than the charger from out-of-date 500 ma slow charger. The desktop items, lighting items, image items, lighted cosmetic mirror items, digital alarm clock, power station on desk top or any other more application as the parent filing case covered should be still fall within the current invention.

I claim:

1. A desktop LED light having a power station, comprising:
   at least one LED;
   at least one built-in, non-detachable USB charging port having a charging current output capacity of 2.1 A up to at least 10.0 A, wherein the at least one USB charging port outputs a charging current only without any data signal;
   a circuit having only one input power source for supplying DC current to the at least one USB charging port to charge an energy storage unit or assembly of another electrical or digital data product to be charged through a USB wire which has at least two male plugs to connect with USB charging port and a USB receiving port of said another electrical or digital data product;
   wherein the at least one USB charging port is one of a type A or Type C USB charging port that can fit said male plugs to charge different said electrical or digital data products,
   wherein the LED light has at least one function selected from:
   (i) LED lighting having a white-color range for area illumination or backlighting,
   (ii) LED lighting having at least one of red, green, and blue color LEDs for accent, indicator, or night lighting,
   (iii) color changing or color mixing,
   (iv) IC control of light function setting or selection, and
   (v) brightness adjustment, and
   wherein the LED light has a housing with at least one opening to permanently install the at least one USB charging port.

2. The desktop LED light having a power station as claimed in claim 1, wherein the input power source is an external AC-to-DC transformer adaptor, or converter for changing AC to DC current.

3. The desktop LED light having a power station as claimed in claim 1, wherein the input power source includes a power cord and plug connected to an AC outlet and at least one of an internal AC-to-DC and DC-to-DC circuit.

4. The desktop LED light having a power station as claimed in claim 1, wherein the at least one LED is a white, red, green, or blue LED, but not an infrared or violet LED, so as to provide at least one of the following lighting effects:
   (i) a white-color range LEDs for reading or working illumination,
   (ii) different colors to show charging status or provide other indicator functions,
   (iii) a white-color range for reflecting and magnifying a lighted image,
   (iv) a white-color range for projection of an image through a colorful film or slide,
   (v) a white or colorful LED time display, date display, calendar display, temperature display, or message display,
   (vi) controllable colors and brightness.

5. The desktop LED light having a power station as claimed in claim 1, wherein the LED light has extra LEDs to provide indicator functions.

6. The desktop LED light having a power station as claimed in claim 1, wherein the housing is arranged to house at least one of the following extra function components or devices:
   (i) a plurality of AC outlets,
   (ii) female receiving-ports for receiving a male plug, insert-end, prong, connector, or adaptor to provide electric signal delivery, audio, video, speaker output, or micro-phone input,
   (iii) a wireless communication or signal transceiver,
   (iv) a base, bar, stand, or adjustable arms,
   (v) an organizer, compartment, or holder.

7. The desktop LED light having a power station as claimed in claim 1, further comprising circuitry that not only supplies the DC current to the USB at least one charging ports, but that also provides power, electric signals or control signals for at least one additional function selected from an AC power supply, time piece, digital LED segment display, audio device, clock, night light, working light, alarm, weather station, radio, temperature display, fan, video device, speaker, microphone, and wireless communication equipment.

8. The desktop LED light having a power station as claimed in claim 7, wherein the power station supplies power for said at least one additional function.

9. The desktop LED light having a power station as claimed in claim 1, wherein said another electrical or digital product is communication equipment, computer equipment, or a consumer electric product having a rechargeable DC energy storage unit or assembly inside the product.

10. The desktop LED light having a power station as claimed in claim 1, wherein the said USB charging-port is a type-A USB charging port.

11. The desktop LED light having a power station as claimed in claim 1, wherein the USB receiving port of the another electrical or digital product is one of a compact USB, Mini USB, and Micro USB receiving port.

12. The desktop LED light having a power station as claimed in claim 1, wherein a number of said at least one USB charging port number is greater than one, and further comprising circuitry for providing DC currents selected from 1.0 A, 2.0 A, 3.1 A, 4.2 A, 1.5 A, 2.4 A, 3.4 A, 4.8 A, 6.2 A, 6.8 A or higher charging capacities.

13. The desktop LED light having a power station as claimed in claim 1, wherein said circuit AC-to-DC and/or one or more DC-to-DC circuits assembled on a one piece circuit board.

14. The desktop LED light having a power station as claimed in claim 1, wherein the USB charging port receives power from internal circuitry or an external transformer.

15. The desktop LED light having a power station as claimed in claim 1, further comprising at least one AC outlet and at least one conductive piece for supplying AC current directly from an AC input to the AC outlet, and from the AC outlet to an AC product through conductive male prongs plugged into the AC outlet.

16. The desktop LED light having a power station as claimed in claim 15, wherein the AC product is one of a hair-dryer, hair styling product, electric fan, skin repair or polisher equipment, or electric power tool.

17. The desktop LED light having a power station as claimed in claim 15, wherein the AC outlet supplies an AC current up to 1,850 Watt.

18. The desktop LED light having a power station as claimed in claim 15, wherein the at least one USB charging-port and the at least one AC outlet are assembled together to form a USB-module or outlet-module or universal unit or sealed-unit having a desired number of USB charging-ports and outlet-units without or without a ground pin.

19. The desktop LED light having a power station as claimed in claim 15, further comprising at least one additional power outlet-unit having surge-protection.

20. The desktop LED light having a power station as claimed in claim 1, wherein the at least one USB charging port and/or at least one AC outlet-unit is arranged on parts of the device selected from a housing, body, stationery-organizer, added housing construction, holder for communication, computer or consumer products, holder for a power-bank which offers DC power from its output end to products to be charged, and power-bank that can be-charged by the USB charging port at an input end.

21. The desktop LED light having a power station as claimed in claim 1, wherein the at least one LED is a built-in LED or included in an LED bulb or LED tube.

22. The desktop LED light having a power station as claimed in claim 1, further comprising additional electric parts and accessories to provide additional functions selected from functions of a timer, remote controller, dimmer, color changing device, APP controller, Wi-Fi communication device, Wi-Fi controller, motion sensor, switch, master power controller, anti-glare filter, audit device, speaker, equalizer, temperature display, weather display, music, alarm, and other timepiece functions.

23. The desktop LED light having a power station as claimed in claim 1, wherein the at least one USB charging port is included in a power strip having a plurality of power outlets located on the housing and connected to an AC outlet by an AC power cord with an AC plug.

24. A desktop LED light device, comprising;
at least one built-in, non-detachable USB charging port having a charging capacity of 2.1 A to 10.0 A or multiple USB charging ports having a desired charging capacity selected from one or more of at least the following charging capacities: 2.1 A, 3.1 A, 4.2 A, 1.5 A, 2.4 A, 3.4 A, 4.8 A, 6.2 A, 6.8 A, for providing a quick charging function
at least one of a separate outside transformer or built-in AC-to-DC circuitry for supplying power to the at least one built-in, non-detachable USB charging port or multiple USB-ports to charge a battery of another device through a wire plugged into the built-in, non-detachable USB charging port or multiple USB ports, wherein the at least one built-in and non-detachable USB charging port or multiple USB charging ports only have a charging function without electric or digital data transmission or delivery,
wherein (a) the multiple USB charging ports have different internal DC-to-DC circuits to supply different operating voltages, or (b) an output power of the at least one built-in, non-detachable USB charging port or the multiple USB charging ports is 10.5 to 50 watts, or (c) an output power of the at least one built-in, non-detachable USB charging port or the multiple USB charging ports is greater an a power needed for an LED illumination function of the light device,
wherein at least one or multiple USB charging ports are installed on or in a housing, bar, stand, movable or detachable compartment wall, base, pole, clip, and/or holder of the LED light device, and
wherein the LED light further has a USB quick charging function provided by the at least one built-in, non-detachable USB charging port or the multiple USB charging ports and at least one illumination function selected from:
(i) LED lighting having a white-color range for area illumination or LCD backlighting,
(ii) LED lighting having at least one of red, green, and blue color LEDs for accent, indicator, or night lighting,
(iii) color changing or color mixing,
(iv) IC control of light function setting or selection, and
(v) time, date, calendar, temperature, or message display.

25. A desktop LED light device as claimed in claim 24, wherein the LED lighting device includes an opening in which is installed at least one non-detachable outlet unit, outlet-module, USB-unit, USB-module, USB universal kit, or USB sealed-unit.

26. A desktop LED light device as claimed in claim 25, wherein a number of said at least one outlet unit, outlet-module, USB-unit, USB-module, USB universal kit, or USB sealed-unit is greater than one.

27. A desktop LED light device as claimed in claim 24, wherein the clip has a spring device to enable the assembly to be clipped onto any desk, table, bed, tube, bar, post, or edge having a thickness equal to or less than an opening width of the clip.

28. The desktop LED light having a power station) A desktop LED light device as claimed in claim 24, wherein the light device is a built-in LED, screw-in, snap-in or press-fit LED bulb, or LED tube.

29. The desktop LED light having a power station) A desktop LED light device as claimed in claim 24, wherein the said lighting device is arranged to be placed on a desk, table, bed, moving table, bed cushion table, or any flat surface by a strong attachment kit or heavy weight to overcome vibrations or the light device's wire weight that would otherwise cause the light device to fall down.

30. A desktop LED light device as claimed in claim 24, wherein the at least one USB charging port is a type A, type C, or combined Type A and Type C USB charging port.

31. A desktop LED light device as claimed in claim 30, wherein the USB charging port is arranged to receive a wire with a male Type A USB plug at one end, or a wire with, at one end, a Type C, Micro USB, or Mini USB plug having a compact construction and charging capacity that is larger than a Type A USB plug.

32. A desktop LED light device as claimed in claim 24, further comprising an anti-reflection optic film.

33. A desktop LED light device as claimed in claim 24, further comprising an outlet unit or outlet-module having at least one of surge protection, a master controller, wireless communication, a timer, a time delay, a dimmer, color changing, and brightness control functions.

34. A desktop LED light device as claimed in claim 24, wherein the said lighting device incorporates a switch, sensor, motion sensor, timer, wireless controller, APP controller, of WiFi controller to turn the light device on and off.

* * * * *